United States Patent [19]

Slaughter et al.

[11] Patent Number: 4,959,802

[45] Date of Patent: Sep. 25, 1990

[54] VIDEO BUS FOR A VISION SYSTEM

[75] Inventors: John E. Slaughter, Richardson; Robert B. Terrell, Garland, both of Tex.

[73] Assignee: Texas Instruments Incorporated, Dallas, Tex.

[21] Appl. No.: 771,545

[22] Filed: Aug. 30, 1985

[51] Int. Cl.[5] .................. G06F 15/20; G06F 15/46
[52] U.S. Cl. ..................... 364/521; 340/724; 364/424.01; 901/46
[58] Field of Search ............ 364/518, 521, 512, 513, 364/424, 431, 424.01, 424.02; 340/703, 724, 747; 901/1, 46, 47

[56] References Cited

U.S. PATENT DOCUMENTS

| | | | |
|---|---|---|---|
| 4,061,017 | 12/1977 | Sloane et al. | 364/512 X |
| 4,550,376 | 10/1985 | Maciejczak | 364/512 |
| 4,589,144 | 5/1986 | Namba | 364/518 X |
| 4,613,269 | 9/1986 | Wilder et al. | 364/478 |
| 4,628,453 | 12/1986 | Kamejima et al. | 364/424 |
| 4,636,858 | 1/1987 | Hague et al. | 364/518 X |
| 4,638,445 | 1/1987 | Mattaboni | 364/424 X |
| 4,646,134 | 2/1987 | Komatsu et al. | 364/521 X |

Primary Examiner—Gary V. Harkcom
Assistant Examiner—H. R. Herndon
Attorney, Agent, or Firm—Gary C. Honeycutt; Melvin Sharp; N. Rhys Merrett

[57] ABSTRACT

A vision system provides an apparatus and method for obtaining an image of a manufacturing apparatus that is electrically controllable. The vision system has a video bus that transmits the actual pixel value synchronized with a pixel clock, frame and line strobes which are used to synchronized each unit of the vision system, a field index bit, and provision for a pixel valid bit are included. A gray scale image of the manufacturing apparatus is obtained and is used to generate control commands that control the manufacturing apparatus.

9 Claims, 73 Drawing Sheets

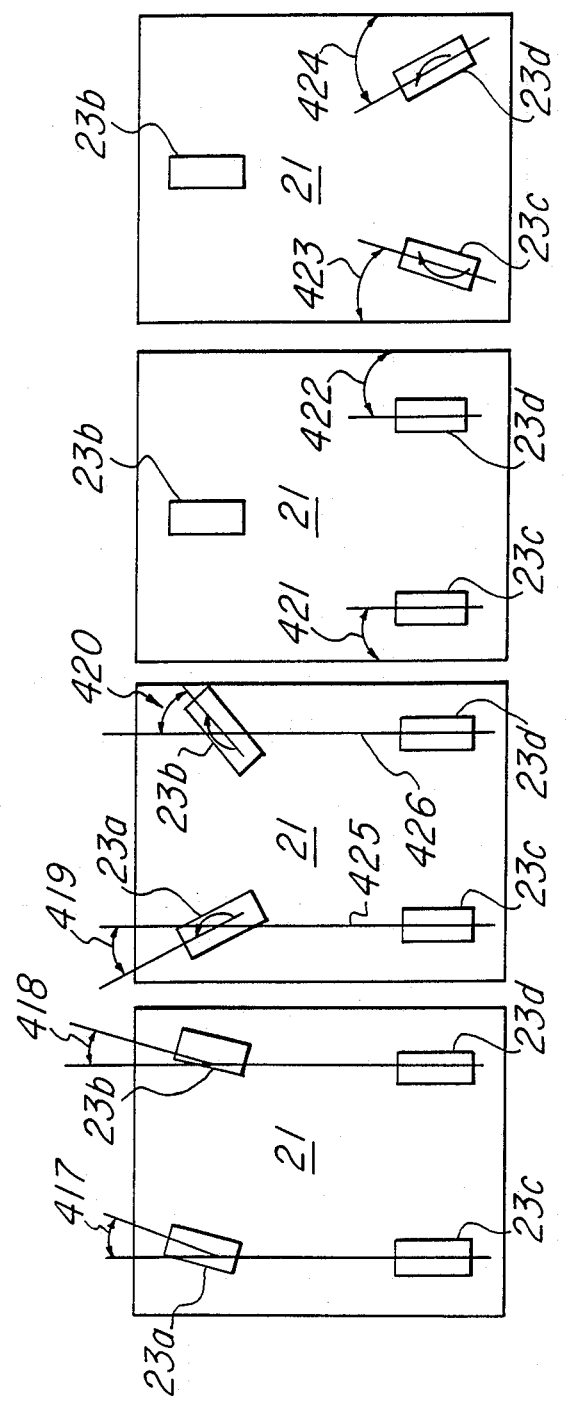

| NODES | | RULES |
|---|---|---|
| 701 | [ ][ ][R1][ ][ ][ ] | • ROBOT 1 (R1) HAS NO RULES |
| 702 | [R2][R2][ ][ ][ ][ ] | • ROBOT 2 (R2) HAS NO RULES |
| 703 | [ ][R1][R2][ ][ ][ ] | • ROBOT 1 (R1) MUST ARRIVE BEFORE ROBOT 2 (R2)<br>• ROBOT 2 (R2) MUST ARRIVE AFTER ROBOT 1 (R1) |
| 704 | [ ][R1][R2][ ][ ][ ] | • ROBOT 1 (R1) MUST ARRIVE BEFORE ROBOT 2 (R2)<br>• ROBOT 2 (R2) MUST ARRIVE AFTER ROBOT 1 (R1) |
| 705 | [ ][ ][ ][ ][ ][ ] | |
| 706 | [ ][ ][R1][R2][ ][ ] | • ROBOT 1 (R1) MUST ARRIVE BEFORE ROBOT 2 (R2)<br>• ROBOT 2 (R2) MUST ARRIVE AFTER ROBOT 1 (R1) |
| 707 | [ ][ ][ ][R1][R1][ ] | • ROBOT 1 (R1) HAS NO RULES |
| 708 | [ ][ ][ ][ ][ ][R2] | • ROBOT 2 (R2) MUST ARRIVE AFTER ROBOT 3 (R3) |

TIME (t): 1 2 3 4 5 6

Fig. 47

| NODES | | | | | | | RULES |
|---|---|---|---|---|---|---|---|
| 721 | R1 | | | | | | • ROBOT 1 (R1) HAS NO RULES |
| 722 | R2 | R2 | | | R3 | R3 | • ROBOT 2 (R2) HAS NO RULES<br>• ROBOT 3 (R3) MUST ARRIVE AFTER ROBOT 2 (R2) |
| 723 | | R1 | R2 | R3 | | | • ROBOT 1 (R1) MUST ARRIVE BEFORE ROBOT 2 (R2)<br>• ROBOT 2 (R2) MUST ARRIVE AFTER ROBOT 1 (R1)<br>• ROBOT 3 (R3) MUST ARRIVE AFTER ROBOT 2 (R2) |
| 724 | | | R1 | R2 | | | • ROBOT 1 (R1) MUST ARRIVE BEFORE ROBOT 2 (R2)<br>• ROBOT 2 (R2) MUST ARRIVE AFTER ROBOT 1 (R1) |
| 725 | | | | R3 | | | • ROBOT 3 (R3) HAS NO RULES |
| 726 | R3 | | R1 | R2 | | | • ROBOT 1 (R1) MUST ARRIVE BEFORE ROBOT 2 (R2)<br>• ROBOT 2 (R2) MUST ARRIVE AFTER ROBOT 1 (R1)<br>• ROBOT 3 (R3) MUST ARRIVE BEFORE ROBOT 1 (R1) |
| 727 | | | | R1 | R1 | | • ROBOT 1 (R1) HAS NO RULES |
| 728 | R3 | | | | | R2 | • ROBOT 2 (R2) MUST ARRIVE AFTER ROBOT 3 (R3)<br>• ROBOT 3 (R3) HAS NO RULES |
| | 1 | 2 | 3 | 4 | 5 | 6 | |
| | | | TIME (t) | | | | |

Fig. 49

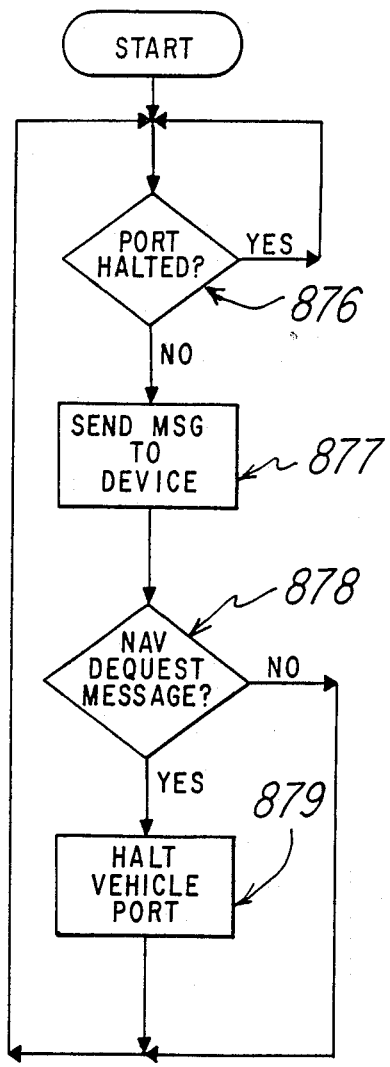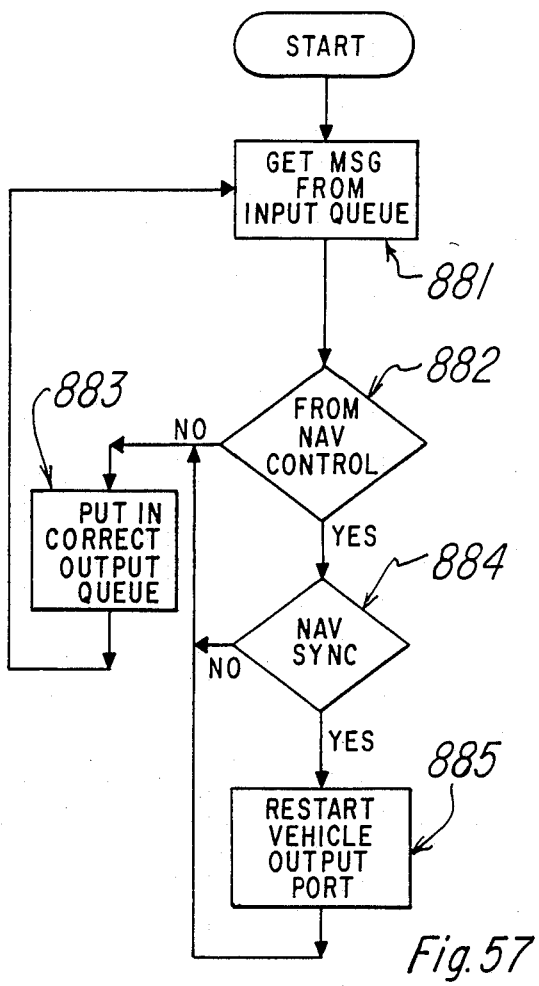
Fig. 56
Fig. 57

EQUATION 4

$$d_{line} = \frac{[(R_x - P_x)(-V_y)] + [(R_y - P_y) \cdot V_x]}{\sqrt{-V_y^2 + V_x^2}}$$

- - - - - - - - - - - - - - - - - - - -

EQUATION 5

$$d_{radius} = \sqrt{V_x^2 + V_y^2} + K \text{ (904) OF FIGURE 59}$$

*Fig. 62d*

TABLE OF EQUATIONS

EQUATION 1

BASIC EQUATIONS OF MOTION:

$$\begin{bmatrix} x_i^1(0) \\ y_i^1(0) \end{bmatrix} + \int_0^t \begin{Bmatrix} -\sin[\theta_i^2(t) + \Phi(t)] \\ \cos[\theta_i^2(t) + \Phi(t)] \end{Bmatrix} \begin{bmatrix} \frac{d}{dt} d_i(t) \end{bmatrix} dt = \begin{bmatrix} x_\phi(t) \\ y_\phi(t) \end{bmatrix} + \begin{bmatrix} \cos\Phi(t) & -\sin\Phi(t) \\ \sin\Phi(t) & \cos\Phi(t) \end{bmatrix} \begin{bmatrix} x_i^2 \\ y_i^2 \end{bmatrix}$$

where

- $x_i, y_i$ = LOCATION OF WHEEL i
- SUPERSCRIPT 1 = GLOBAL REFERENCE FRAME
- SUPERSCRIPT 2 = VEHICLE REFRENCE FRAME
- $\theta_i$ = STEERING ANGLE OF WHEEL i
  $\begin{bmatrix} 0° \text{ POINTS ALONG VEHICLE Y AXIS} \\ + = CCW \end{bmatrix}$
- $\Phi$ = VEHICLE ANGLE IN GLOBAL REFERENCE FRAME
  $\begin{bmatrix} 0° \text{ POINTS ALONG VEHICLE Y AXIS} \\ + = CCW \end{bmatrix}$
- $d_i$ = DRIVE ANGLE OF WHEEL i
- $x_\phi, y_\phi$ = LOCATION OF VEHICLE IN GLOBAL REFERENCE FRAME

*Fig. 62a*

WHEEL COORDINATION:

$$\begin{bmatrix} \dot{d}_i \\ \theta_i \end{bmatrix}_{DESIRED} = f \begin{bmatrix} \dot{x}_\phi \\ \dot{y}_\phi \\ \Phi \\ \dot{\Phi} \end{bmatrix}_{COMMAND}$$

$$\theta_i(t) = -\Phi(t) + TAN^{-1} \left\{ \frac{\dot{x}_\phi(t) - [x_i^2 \sin \Phi(t) - y_i^2 \cos \Phi(t)] \dot{\Phi}(t)}{\dot{y}_\phi(t) + [x_i^2 \cos \Phi(t) - y_i^2 \sin \Phi(t)] \dot{\Phi}(t)} \right\}$$

$$\dot{d}_i(t) = \frac{\dot{y}_\phi(t) + [x_i^2 \cos \Phi(t) - y_i^2 \sin \Phi(t)] \dot{\Phi}(t)}{\cos [\theta_i(t) + \Phi(t)]}$$

EQUATION 2

COMPUTE FOR EACH WHEEL

Fig. 62b

EQUATION 3

DEAD RECKONING:

$$\begin{bmatrix} x_\phi \\ x_\phi \\ \Phi \end{bmatrix}_{COMPUTED} = f \begin{bmatrix} \dot{d}_i \\ \theta_i \end{bmatrix}_{MEASURED}$$

$$\Phi(t) = \Phi(0) + \int_0^t \frac{\dot{d}_i(t) \sin \theta_i(t) - \dot{d}_j(t) \sin \theta_j(t)}{y_j^2 - y_i^2} dt$$

WHERE $i \neq j$ AND i AND j ARE SELECTED SUCH THAT $y_j^2 \neq y_i^2$ $$\begin{bmatrix} x_\phi(t) \\ y_\phi(t) \end{bmatrix} = \begin{bmatrix} x_\phi(0) \\ y_\phi(0) \end{bmatrix} + \int_0^t \left\{ \begin{bmatrix} -\sin \theta_i(t) & -\cos \theta_i(t) \\ \cos \theta_i(t) & -\sin \theta_i(t) \end{bmatrix} \dot{d}_i(t) + \begin{bmatrix} y_i^2 & x_i^2 \\ -x_i^2 & y_i^2 \end{bmatrix} \dot{\Phi}(t) \right\}$$

$$\begin{bmatrix} \cos \Phi(t) \\ \sin \Phi(t) \end{bmatrix} * dt$$

Fig. 62c

VIDEO BUS FOR A VISION SYSTEM

BACKGROUND AND SUMMARY OF THE INVENTION

Background of the Invention

This invention relates to a vision system having a generalized digital video bus for use in a manufacturing apparatus that utilizes automation for the control of the manufacturing process. In particular the invention relates to a vision system that converts images of the manufacturing apparatus's controllable components into gray scale representation of light intensity for processing by a digital computer.

RELATED U.S. PATENT APPLICATIONS

This invention is related to the following U.S. Patents and patent applications.

| U.S. Pat. No. |
| --- |
| 4,779,203 |
| 4,706,120 |
| 4,789,940 |
| 4,754,402 |
| 4,745,551 |
| 4,750,123 |
| 4,926,103 |

| | U.S. Pat. applications | |
| --- | --- | --- |
| Ser. No. | Filing Date | Status |
| 771,442 | 8-30-85 | Abandoned |
| 772,061 | 8-30-85 | Abandoned |
| 771,431 | 8-30-85 | Abandoned |
| 772,280 | 8-30-85 | Abandoned |
| 771,379 | 8-30-85 | Abandoned |
| 771,329 | 8-30-85 | Abandoned |
| 265,206 | 10-31-88 | Pending Application |
| 265,068 | 10-31-88 | Pending Application |
| 265,207 | 10-31-88 | Pending Application |

In the last ten years considerable efforts have been spent in automating manufacturing operations especially in the area of parts inspection and process control. Part of the efforts is concentrated in the vision area that uses television cameras. Axis alignment for minute components through enlargement of the components with television is beneficial to semi-automated operation. However, operations that are fully automatic and implemented with computers are limited and need a way to transform a video image to a digital signal that can the utilized by the computer.

In co-pending application Ser. No. 707,116, now U.S. Pat. No. 4,696,047, Filed on Feb. 28, 1985, there was disclosed a vision system that converts images to a digital signal wherein the light intensity above a predetermined threshold is assigned a first logic state and intensity below the predetermined threshold is assigned the second logic state. The use of windows provided for reduction of the amount of data that required processing.

The use of digital video buses requires may conductors especially when it is necessary to provide for a pixel address bus.

SUMMARY OF THE INVENTION

A vision system provides an apparatus and method for obtaining an image of a manufacturing apparatus that is electrically controllable. A gray scale image of the manufacturing apparatus is obtained and is used to generate control commands that control the manufacturing apparatus.

The vision system obtains a gray scale image of the manufacturing apparatus by utilizing highlighted points associated with the manufacturing apparatus.

The vision system includes a raster scan camera that converts light from the highlighted points to an electrical signal in the form of a waveform that represents light intensity in relationship to raster scan position of the raster scan camera. The raster scan position being identified by frame, row and column coordinates.

The waveform from the camera is applied to a processor for identifying the position of each cluster of light from the waveform and a comparison is made that compares each position of each cluster of light to an expected position of each cluster of light to identify the highlighted points.

The identification process includes transforming the waveform from an analog signal in the temporal domain to digital signal in the spatial domain. A snap shot A to D converter is provided and is used in the transformation by digitizing the waveform to obtain a first digital signal and a divider is provided for dividing the first digital signal into a row digital signal and a column digital signal that corresponds to the raster scan coordinates. A summation device performs a vector summation of the row and column digital signals to obtain a first and second integrated signal.

A comparison is made of the first and second integrated signals to a predetermined threshold to obtain a first ordinate signal and second ordinate signal thereby. The first and second ordinate signals are used to locate the centroids that represent the clusters of light from the first and second ordinates and a comparison is made of a pattern created by the centroids to a pattern of the lighted points. The centroids are than transform on to a linear spatial plane.

It is the object of the invention to provide a vision system the provides a gray scale image of a manufacturing apparatus for processing of the image so that control of the apparatus may be implemented.

These and other objects and advantages of may be apparent from a reading of the specification in conjunction with the figures in which:

BRIEF DESCRIPTION OF THE FIGURES

FIG. 1 is a block diagram of a manufacturing system according to the invention;

FIGS. 23 through 26A-26B illustrate a braking system for the mobile apparatus of FIG. 18;

FIG. 27 is a block diagram of a wireless communication system for communicating between the control and navigation circuits and the mobile apparatus;

FIGS. 42 through 49A-49G are figures which illustrate the generation of rules for a multimode mobile apparatus system;

FIGS. 54A-54B through 56 are flow diagrams illustrating the navigation and control of multiple apparatus using a single control and navigation circuit 15;

FIGS. 57 through 60 provide a collision avoidance system for the multiple apparatus according to the invention.

DETAILED DESCRIPTION OF THE EMBODIMENTS

Figure 2:
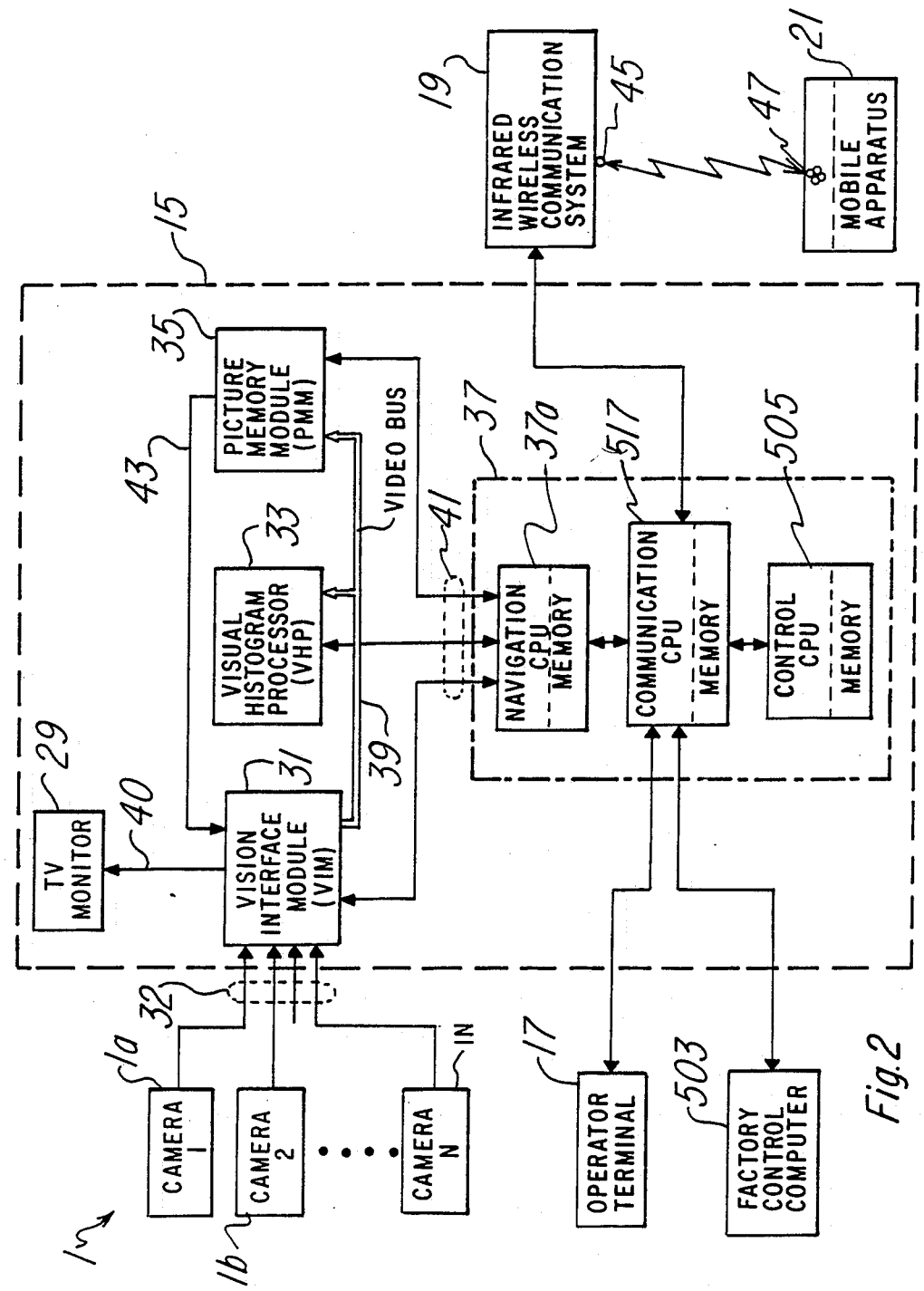
FIG. 2 is a block diagram of the control and navigation circuit of FIG. 1.

FIG. 1, to which reference should now be made, there is shown a simplified diagram of a control and navigation system 2A and mobile apparatus 21 according to the invention. The control and navigation system 2A includes a plurality of cameras 1, control and navigation circuit 15, a communication system 19 and a terminal 17. Each member of the plurality of cameras 1 in the illustrated embodiment are raster scan TV cameras and converts light that is emitted from beacons 3, 5 and 7 to video signals. Beacons 3, 5 and 7 are mounted on the mobile apparatus 21 and in the embodiment of FIG. 1 are light-emitting diodes operating in the infrared region. The light represents visual information about the position and orientation of the mobile apparatus 21 that is transmitted to the plurality of cameras 1 via an optical lens 11 which in the illustrated embodiment has an infrared filter 9 mounted over the optical lens 11. The infrared filter 9, although not necessary, attenuates the noise caused by other lights in a factory environment by limiting the light that is applied to the cameras 1 to light that is in the infrared portion of the light spectrum.

The plurality of cameras 1 convert the visual information to a video signal that is applied via a conductor 13 to the control and navigation circuit 15 which receive operator inputs from a terminal 17 and converts the video signals to location commands and apply the location commands that contain information as to the mobile apparatus's 21 position and orientation to a communication system 19 which can be a radio transmitter or in a factory environment more preferably light or an infrared wireless communication system. The infrared wireless communication system through the use of light emitting diodes and light sensitive diodes is able to communicate between the control and navigation circuit 15 and the mobile apparatus 21 on which the light sources 3, 5 and 7 are mounted. The mobile apparatus 21 compares its position with its commanded position and will provide motion commands to its wheels or legs 23 for relocating its position and/or additionally move a robot arm 25 to perform a commanded task. The position of the arm 25 may be determined by an optional beacon 27 or by internal references within the mobile apparatus 21.

CONTROL AND NAVIGATION CIRCUIT 15

In FIG. 2, to which reference should now be made, there is shown a simplified block diagram of the control and navigation circuit 15. The plurality of TV cameras 1A through 1N provide visual information to the control and navigation circuit 15 and more particularly to a Vision Interface Module (VIM) 31. The vision interface module 31 selects a predetermined TV camera 1S which is a member of the group of TV cameras 1A through 1N and as such not specifically identified in FIG. 2. The vision interface module 31 converts the visual information that is in the form of an analog signal having a waveform that corresponds to light intensity versus raster scan position of the selected TV camera 1S into a digital signal that provides a gray scale digital representation of the analog waveform that is provided by the selected TV camera 1S.

The gray scale digital representation of the analog waveforms is processed by and stored in a Picture Memory Module (PMM) 35 as a two-dimensional array so that the intensity of the light by its position within the memory array corresponds to a position of the raster scan of the selected TV camera 1S. Additionally, bus 39 conveys the digital to a Visual Histogram Processor (VHP) 33 where the digital signal is converted to a signal (herein after called a spatial domain signal) that represents the spatial domain position of the light sources 3, 5 and 7 and thus the mobile apparatus 21. From the spatial domain signal, the centroids of the more intense light that is received by the selected TV camera 1S are identified.

A host CPU and memory 37 that includes a navigation CPU and memory 37a, a Communication CPU and memory 517, and a control CPU and memory 505 and in particular the navigation CPU and memory 37a compares the centroids of the light sources to an expected pattern stored within the navigation CPU and memory 37a of the light sources 3, 5 and 7 that are mounted on the mobile apparatus 21. Once the pattern has been identified, then the position including location and orientation of the mobile apparatus 21 is transmitted to the mobile apparatus 21 via the communication CPU and memory 517 an an infrared wireless communication system 19.

The infrared wireless communication system 19 includes an array of infrared light emitting diodes 45 for transmitting light to an infrared light receiving diode 47 and conveys information and commands to the mobile apparatus 21 based upon its location. Commands are also provided from a factory control computer 17 or a terminal to the host CPU and memory 37 for transmitting to the mobile apparatus 21 via the communication CPU and memory 517 and infrared wireless communication system 19. An operator may monitor the movement of the mobile apparatus 21 via a TV monitor 29 that is connected to the vision interface model 31. The operator terminal 17 may also be used to input commands directly to the mobile apparatus 21 for purposes of testing or for manual control.

Vision Interface Module 31

Figure 3:
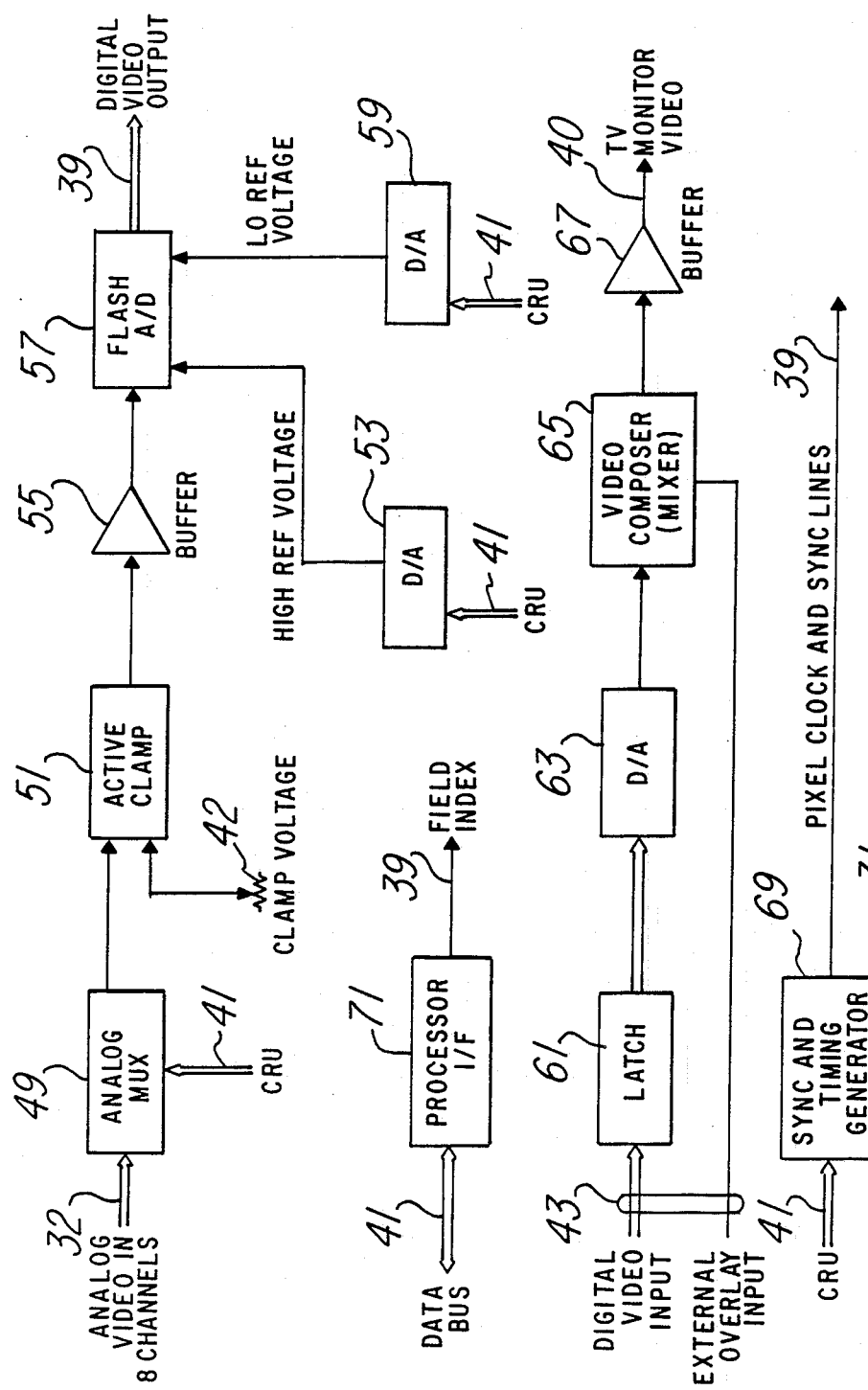
FIG. 3 is a block diagram of the interface module of FIG. 2.

FIG. 3 to which reference should now be made is a block diagram of the vision interface module 31 of FIG. 2. The video signals from the plurality of TV cameras 1A through 1N are brought into the vision interface module 31 via conductor bundle 32. The video signals are analog signals and are applied to an analog multiplexer 49 which based upon an output from the navigation CPU and memory 37a via Control Register Unit (CRU) output lines 41 selects the predetermined TV camera's 1S video signal for processing. The navigation CPU and memory 37a selects the camera's 1S video signal based upon its predeterminability that is established primarily by the criteria of the camera that has the best view of the mobile apparatus 21 given its last known position and its expected direction of motion after the execution of the last move command. The video signal is multiplexed by the analog multiplexer 49 and applied to a video clamp or active clamp 51 for clamping of the video signal to a reference voltage that is established by the clamp voltage potentiometer 42. The clamped video signal is applied to amplifier 55 and then to a flash A to D converter 57 which takes a digital snap shot of the clamped and amplified video signal.

References voltages from D to A converters 53 and 59 depending on the commands present on data bus 41 from the control register unit of the navigation CPU and memory 37a compensate for input video signal range variations.

The vision interface module 31 also provides on conductor 40 a video signal to the TV monitor 29 where an operator may monitor the progress of the mobile apparatus 21. This is handled by taking a frame of the digital video information from the picture memory module 35 via data bus 43 and applying it to a latch 61 for conversion to an analog signal by a digital to analog converter 63. The analog signal is applied to a video composer or mixer 65 for mixing with a video overlay signal to reproduce a replica of the previously stored video signal. A buffer amplifier 67 buffers the reproduced video signal prior to application to the TV monitor 29.

The mixer 65 mixes the converted analog signal with external overlay inputs that are provided from the picture memory module 35 and the navigation CPU and memory 37a to obtain an accurate representation of the video image. Additionally, provide in the vision interface module 31 is a synch and timing generator 69 that provides the pixel clocks, the horizontal synch pulses and the vertical synch pulses for ensuring proper synchronization of the video signals.

An interface is provided by the processor interface 71 which interfaces the output of the control register unit from the navigation CPU and memory 37a to the vision interface module 31. The processor interface 71 provides line receivers so that the control register unit signals are received properly before application to the appropriate modules within the vision interface module 31.

Visual Histogram Processor 33

Figure 4:
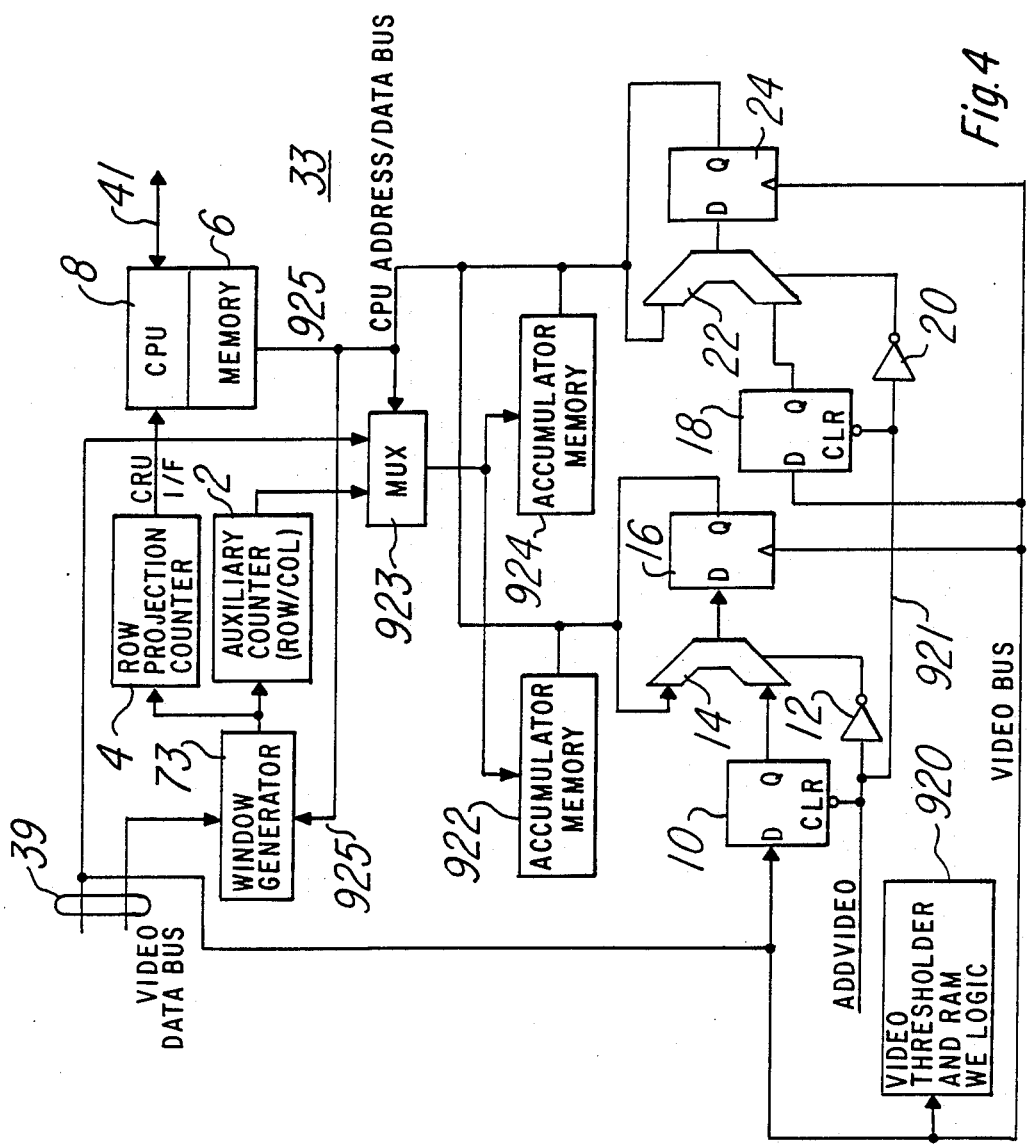
FIG. 4 is a block diagram of the visual histrogram processor of FIG. 2.
Figure 8A:
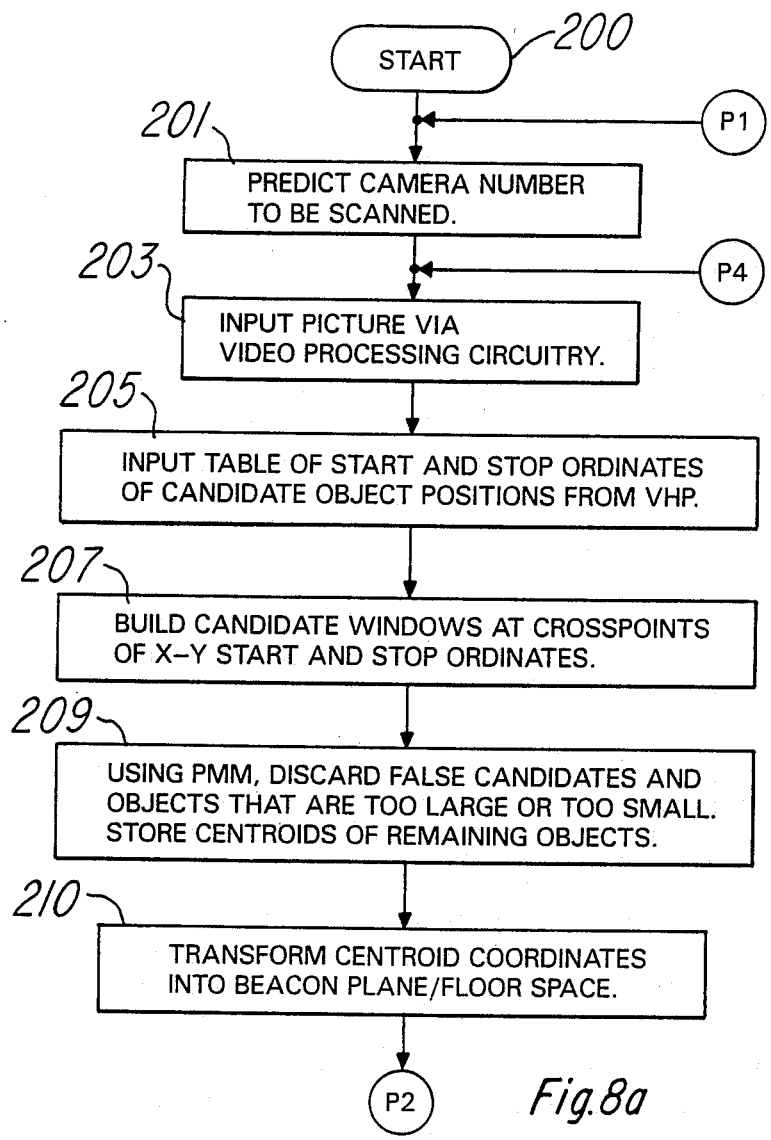
FIG. 8A-8C are flow diagrams of the centroidification of the images according to the invention.

FIG. 4 is a block diagram of the visual histogram processor 33. The digital video signal is applied from the vision interface module 31 via data bus 39 to the visual histogram processor 33. The portion of the digital video signal which carries synch and reference clock data is applied to the window generator 73. The window generator 73 generates a window around the images that are predicted to be the images of the light sources or beacons 3, 5 and 7 to reduce the area of examination for identifying the objects, such as light sources or beacons 3, 5, and 7. Once a window is generated the output of the window generator is applied in combination with data from a video threshold circuit 920 to a row projection counter 4 that is used to perform a row vector summation for each row with the summation stored by the fly control software executed by the CPU 8 and stored in memory 6. FIGS. 8 provide a more detailed instruction of the functions implemented by the CPU 8. Similarly the output of the window generator 73 is applied to a column address counter 2 that generates the memory addresses (herein after referred to as column address data) corresponding to the raster column positions.

The column address data is split into two parallel paths and applied to a first and second accumulator processing circuits reducing thereby the accumulator processing rate to one half the input pixel rate. During the active window area, memory locations corresponding to the position of the raster scan of the selected camera 1S are recalled and selectively incremented as a function of the processed video signal from the video threshold circuit 920. The first accumulator processing circuit includes an accumulator 922, an adder 14 and a "D" type latch 16. The second accumulator processing circuit includes an accumulator 924 an adder 22 an a "D" type latch 24. The first and second accumulator circuits work in tandem and process all columns data that occurs within the window that is generated by the window generator 73. Under command of the CPU 8, D type latch 10 and D type latch 18 are held in a reset condition during this mode of operation (the accumulation of data within the generated window) and the carry in pins of adders 14 and 22 are held at a logic high by the action of inverters 12 and 22. When control line 921 is held low by the action of CPU 8 the accumulator adds the gray scale value of each pixel in the corresponding columns.

Video histograms are performed by the action of CPU 8 on a multiplexer 923 which directs the digital video signal into the accumulator address bus. Through the same action as above the accumulator generates a histogram in the accumulator memory.

The information contained within the accumulators 922 and 924 is compiled within the CPU 8 and is stored within its memory 6 as well as conveyed to the navigation CPU and memory 37a via data bus 41.

Window Generator 73

Figure 5:
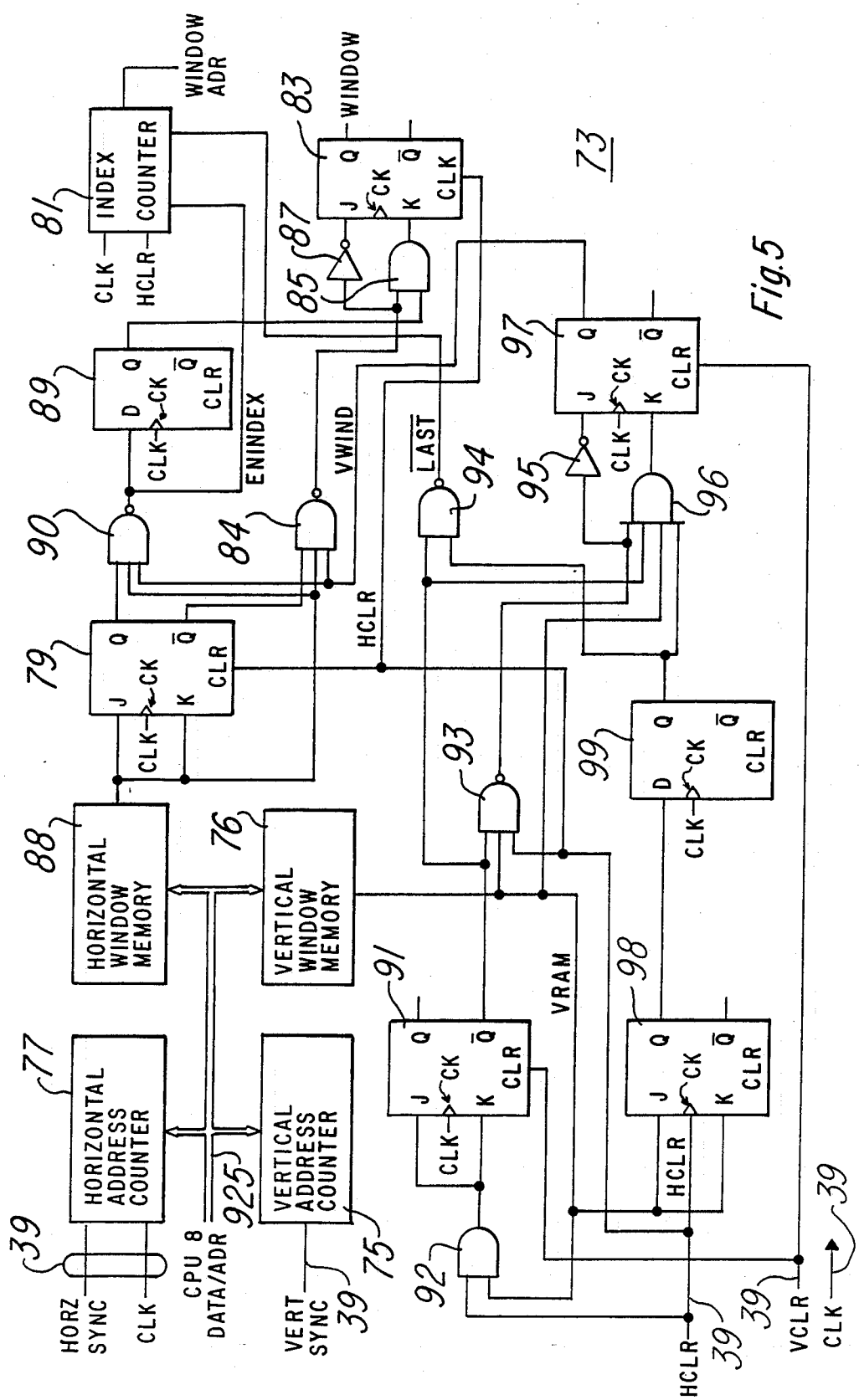
FIG. 5 is a block diagram of the window generator of FIG. 4.

The window generator 73 is illustrated in FIG. 5, to which reference should now be made, and includes a horizontal address counter 77 and a vertical address counter 75. The horizontal address counter 77 and the vertical address counter 75 receive horizontal synch, vertical synch, and pixel clock from the synch and timing generator 69 that is contained within the vision interface module 31 and generates a count that corresponds to the scan position of the selected raster scan TV camera 1S. The horizontal address counter 77 provides a horizontal address to a horizontal window memory 88 which has a memory size that corresponds to the number of horizontal addresses of the pixels of the members of the plurality of cameras 1. As the horizontal address counter 77 cycles through its capacity it will address all of the memory locations contained in the horizontal window memory 88 that correspond to the pixel location of the raster scan cameras 1. Similarly, the vertical address counter 75 addresses the vertical window memory 76 which memory size correspond to the vertical addresses of the pixels of the members of the plurality of cameras 1. CPU 8 via data bus 925 sets up an approximate location of each window that is to be generated by storing in the horizontal and vertical window memories 88 and 76 a logic state at the start and stop addresses that will toggle J-K flip-flops 79 and 91 to generate the windows at the desired locations. Additionally, using this technique allows for generating as many windows as needed, only being limited by the memory sizes.

The windows are used to provide the vector summation of the video signal. The window is generated according to the coordinates of the position of the raster scan of the selected TV camera 1S as provided by the CPU 8.

The data provided includes a start coordinate and an end coordinate and each coordinate has a horizontal and vertical position. The horizontal start position is encoded by CPU 8 setting a bit in the horizontal window memory 88 corresponding to the start position. The coordinate of the stop or end of the window is encoded by setting a bit at the address just previous to the address corresponding to the stop position in horizontal window memory 88. This permits the inclusion of an additional start bit at a position corresonding to a window which is exactly adjacent to the previous window. The output of the horizontal window memory 88 appears as two pulses, one occurring at scan position corresponding to the start and one at the stop of the window. Additional start stop pairs may be set to produce multiple window areas.

J-K flip-flop 79 is reset to the Off state by the action of the horizontal synch. Corresponding to the screen coordinates, the start/stop pulses toggle J-K flip-flop 79.

Index counter 81 produces a unique index for each window to direct results of each vector summation into a separate portion of accumulator 922 and 924.

Similarly, the start coordinate for the vertical position is stored in vertical window memory 76 and locations corresponding to the start and stop positions are encoded by setting a bit in the vertical window memory 76 corresponding to the start and stop positions. Compensation for adjacent windows and vector sum memory index generation is provided.

A composite of the vertical window VWIND, and the horizontal window is produced by the action of timing signals generated by horizontal window memory 88 and vertical window memory 76. J-K flip-flop 83 is set into the On condition by the presence of the horizontal start pulse, vertical window and the absence of a previous window. The previous function is performed by the action of inverter 87 and NAND gate 84. J-K flip-flop 83 is reset on the condition of the presence of the horizontal and vertical window and the stop bit from the horizontal window memory 88. This action is delayed one clock period and is inhibited by the presence of an adjacent window which has the effect of keeping flip-flop 83 in the set condition. The previous function is performed by the action of flip-flop 79 which registers the presence of a horizontal window period and NAND gate 90. Flip-flop 89 performs the one clock delay. AND gate 85 inhibits the action in the presence of an overriding adjacent window represented by the presence of an additional start pulse.

The vertical window or VWIND signal is generated by the action of vertical address counter 75 and vertical window memory 76 as described above. The start/stop pulses are applied to J-K flip-flop 91 by the action of AND gate 92 which combines the vertical window start pulse with the HCLR signal. HCLR is a one clock period wide reset pulse occurring once per line and generated from the HORZ SYNC signal described above the generated in the synch and timing generator 69. This has the effect of toggling J-K flip-flop 91 On. The output of J-K flip-flop 91 is applied in combination with the vertical start signal VRAM and horizontal timing signal HCLR. Logic gates 93, 96 and 95 control the action of J-K flip-flop 97 which defines the vertical window period. The action of J-K flip-flop 98, D type latch 99 and NAND gate 94 produce a last active line flag, which is used to resynchronize index counter logic 81.

Picture Memory Module 35

The video bus 39 transmits the video signal from the vision interface module 31 to the picture memory module 35 which is controlled by a CPU and memory combination 46. The CPU and memory combination 46 provides CRU control to the logic that is contained within the picture memory module 35 and also provides interface to the navigation CPU and memory 37a of FIG. 1.

Figure 6:
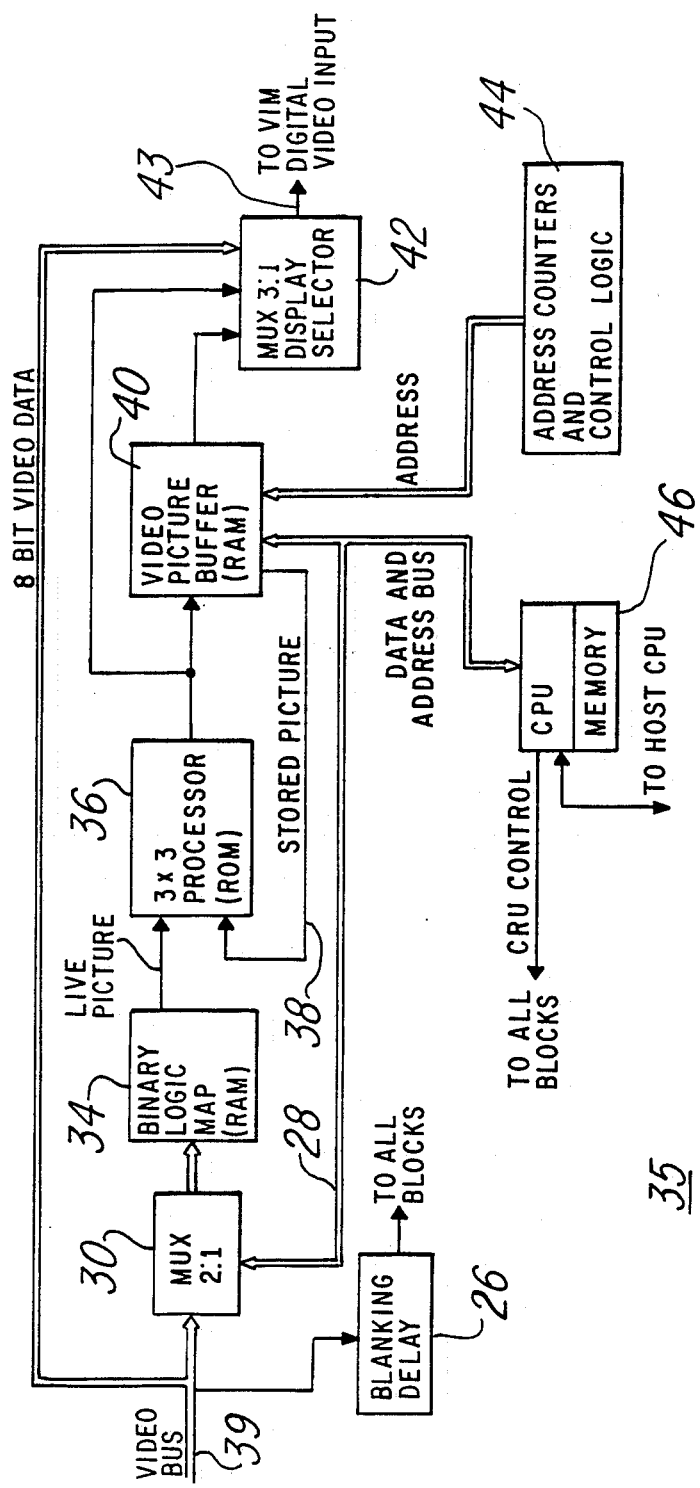
FIG. 6 is a block diagram of the picture memory module of FIG. 2.

Referring to FIG. 6, a multiplexer 30 will select either the output from a video picture buffer ram 40 or the input on the video bus 39 for processing as instructed by a CPU and memory combination 46. The selected digitized video signal is applied to a binary logic map 34 which is a RAM that is coded to convert the information coded in the digitized video signal from gray scale to black and white coded information. The function performed by the binary logic map is usually a threshold comparison. The comparison is such that when the light intensity level that is coded in the digitized video signal is above the threshold a first logic state is obtained and when below the threshold a second logic state is obtained as an output from the binary logic map 34.

The black and white digitized video signal that is provided on the output of the binary logic map 34 is applied to 3×3 processor 36 which compares a 3×3 matrix of logic states. This 3×3 processor uses a digital filtering technique which eliminates noise by comparing a 3×3 matrix of pixel information coded in the digitized video signal, and if the center pixel is one state and its adjacent members are different states, then the state of the center pixel is changed to be in agreement with the adjacent state of the surrounding pixels. The output of the 3×3 processor 36 is applied to a video picture buffer 1140 which is a random access memory and is stored under control of the CPU and memory combination 46 and an address counter control logic 44.

If selected for display via the TV monitor 29 through the vision interface module 31 a multiplexer 1142 enables the display to be the output of the video picture buffer 1140, the processed data from the 3×3 processor 36 or alternatively the video data that is provided on the video bus 39. A blanking delay 26 compensates for processing delays incurred within the picture memory module 35.

Theory of Operation

The theory of operation may be understood by referring to FIG. 7 in combination with FIGS. 1 through 6. FIG. 7A is a graphic representation of the analog signal from the selected camera 1S that after being multiplexed by the analog multiplexer 49 of FIG. 3 is applied to the active clamp 51. As was discussed earlier in the specification, the TV cameras 1 are raster scan cameras in which scans are made over the field of view to obtain a picture 100 that is comprised of a plurality of scans 101. In the case where light intensity is different than the background then an image 103 is depicted in the picture 100. Multiple images as in scan 105 are additionally depicted. Each scan as it occurs is multiplexed and applied to the active clamp 51 the output of which is illustrated in FIG. 7B in which the scan 105 has two blips 107 and 109 that represent light intensity.

Figure 7A:
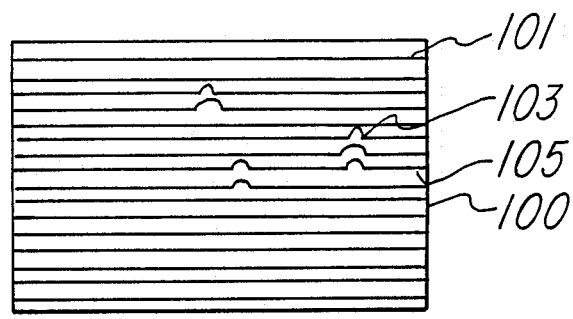
FIG. 7A-7F are waveform diagrams illustrating the operation of the control and navigation circuit 15 of FIG. 1.
Figure 7B:
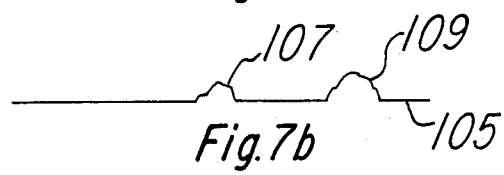
Figure 7C:
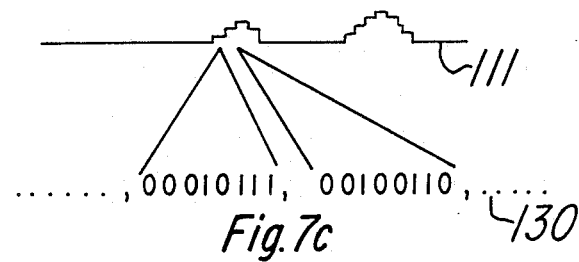
Figure 7E:
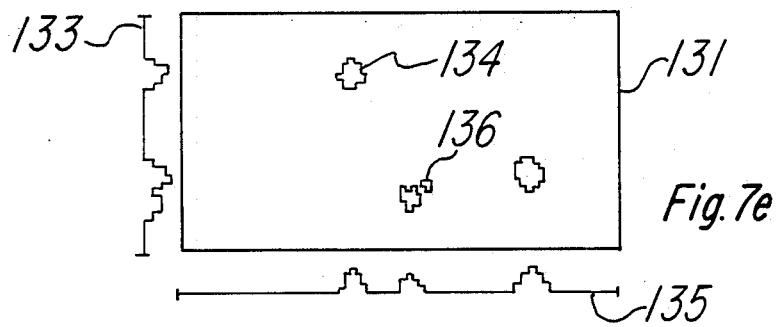

The output of the active clamp 51 is illustrated in FIG. 7C in which a time discrete digitization operation is illustrated by waveform 111. Waveform 111 is an illustration of the time discrete digitization of waveform 105 which is the input signal to the active clamp 51. Each discrete segment in the illustrated embodiment is referenced to a voltage that is provided by the clamp voltage potentiometer 42. The time discrete digitization operation is in synch with the pixel clock. The output of the active clamp 51 is applied via buffer 55 to the flash A to D converter 57 which at the occurrence of every pixel clock converts the sampled video signal to a digital signal an example of which is illustrated by waveform 130 of FIG. 7C. The time discrete digitization voltages provided by the D to A converters 53 and 59 are used to set the background of the image that is being quantized.

Figure 7F:
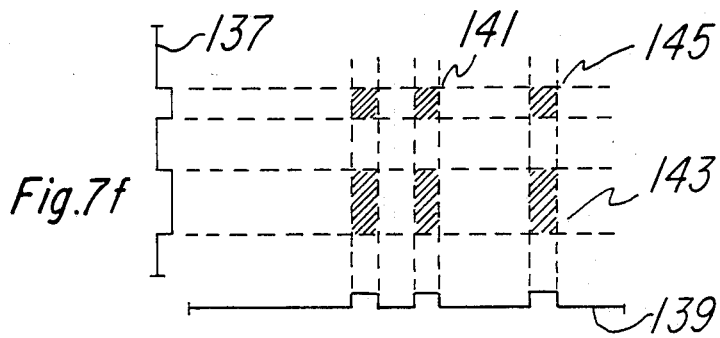
Figure 7D:
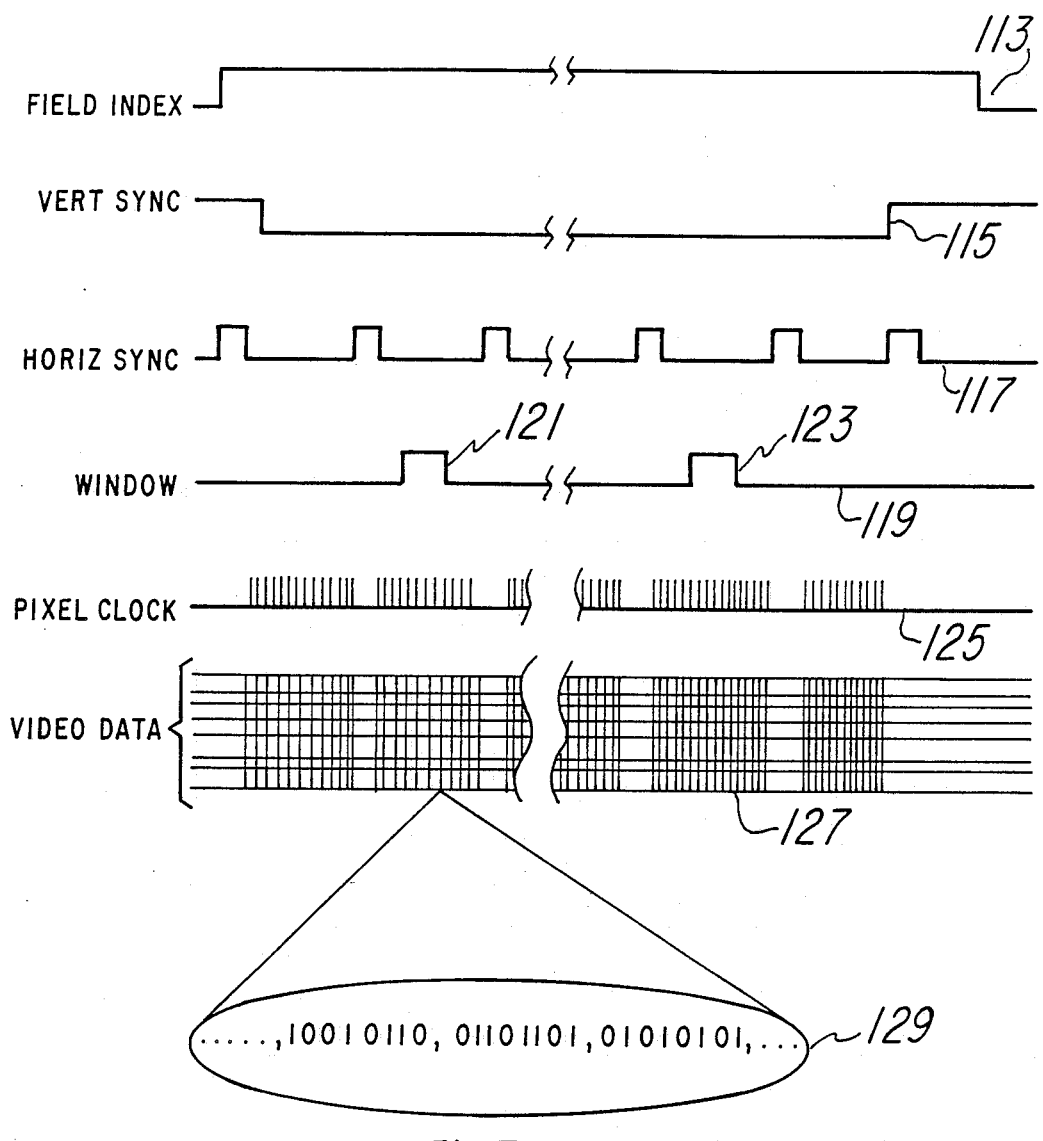

In FIG. 7D, the synch and timing generator 69 output is illustrated and includes a field index signal 113 and is generated by a request from the navigation CPU and memory 37a via the control register unit to the synch and timing generator to indicate or to strobe a particular frame of interest for the navigation CPU and memory 37a. Additionally, the synch and timing generator 69 provides a vertical synch pulse that is represented by waveform 115 which is the vertical synch for a frame, and a horizontal synch signal is provided and represented by waveform 117 which shows the horizontal synch pulses that are necessary to develop a frame such as that shown in FIG. 7A.

FIG. 7D also illustrates the number of conductors on the data bus 39 of FIG. 2. Central to the group of circuits that includes the vision interface module 31, the visual historgram processor 33 and the picture memory module 35 is the concept of a generalized video bus, digital bus 39. The most important feature of the video bus, 39, is there is not a requirement for a pixel address bus. The vertical synch as represented by waveform 115 and horizontal synch as represented by waveform 117, synchronizes each of the three modules. A field index waveform 113 and the window waveform, 119, which can be also used as a pixel valid address is also illustrated. With this configuration, the video bus 39 can be reduced in size and handle a large variety of possible imagers, video cameras, without hardware changes. With this reduced number of pins, modules can be configurated easily to select multiple digital inputs. The window generator 73 of FIG. 4 provides windows as are illustrated by waveform 119 and in particular by output pulses 121 and 123. The pixel clock is provided by the synch and timing generator 69 and is represented by waveform 125 and the video data is represented by waveform 127 with the output of the flash A to D converter 57 being illustrated by diagram 129.

As the selected frame of reference is being digitized, the area within the window that is generated by the window generator 73 is processed by the visual histogram processor 33. The resulting image (diagram 131 of FIG. 7E) is also stored in the video picture buffer 1140. The images that represent the beacons, because of the processing, are identified as perturbations such as at location 134. A ghost image which can be attributed to reflection or to other phenomena such as quantization error is illustrated at 136.

Horizontal and vertical vector summations are performed on the digital data that is shown at diagram 130 to obtain a horizontal vector summation that is represented by waveform 133 and a vertical vector summation that is represented by waveform 135. The vector summation is performed with the accumulator processing circuits that are a part of the visual histogram processor 33 illustrated in FIG. 4 and discussed therewith.

The vector summations are thresholded by the operation of the CPU 8 and memory 6 and projected by the operation of the circuits within the picture memory module 35. The resulting waveforms are illustrated in FIG. 7F where waveform 137 illustrates a normalized projection of the waveform 133 and waveform 139 illustrates the normalized projection of the waveform 135. The waveforms are combined and areas of coincidence such as at area 141 and 143 or the shaded areas represent areas of high probability of containing a beacon image. Based upon the intensities of the areas of each image within a candidate box, a decision can be made as to the exact position of the beacons of the mobile apparatus 21. Thus from the information illustrated in FIG. 7E, the location of the mobile apparatus 21 is achieved.

FIG. 8 is a flow diagram of the sequences that are programmed in the navigation CPU and memory 37a, the CPU 8 and memory 6 of the visual histogram processor 33 and the CPU and memory combination 46 as contained within the picture memory module 35.

Beacon Centroidification and Transformation

Upon initialization, (FIG. 8A) the control and navigation system 2A is in a starting state 200. A pediction is made to select one of the cameras 1A–1N for scanning at block 201. After selection of the selected camera 1S the picture is applied via a video signal from the selected TV camera 1S to the vision interface module 31 at block 203. At block 205, the window information is provided to the window generator 73 of candidate object positions from the CPU 8. At block 207 windows are built around the coordinates of the suspected location of the mobile apparatus 21. The picture memory module 35 is used to discard false candidates and objects which are too large and to calculate the centroids of the candidates which were illustrated in FIG. 7E at areas 134 and 136 and store into the CPU and memory 37a at block 209. The centroid coordinates are transformed into a beacon plane/floor space at block 210.

No Beacon Number and Chord Length Acquisition

After the transformation of the centroid coordinates onto the floor space, a count of the objects' centroids is made to determine how many objects are visible. This is performed at decision block 211 of FIG. 8B via tie point P2. The image is discarded at block 212 if there is only 0 or 1 centroid identified and returns to start point 200 via tie point P1. If there are two images visible, then this may indicate that there is a presence of a mobile apparatus 21 and one of the beacons, either 3, 5 or 7 is blocked by an object such as the robot arm 25 and the third images needs to be synthesized. This occurs at block 213 and will be discussed in conjunction with FIGS. 14 through 18. If four or more images are present, then a decision is made as to whether or not there is a reflected image, and if there is a reflected image, then the reflected image is discarded and only the primary image of the mobile apparatus 21 is used. This occurs at block 215 and will be discussed later in conjunction with FIGS. 11, 12, and 13.

In the situations where as is expected, three of the images are visible, the hidden image coordinate has been obtained or the reflected image filtered out then the three chord lengths between the images are obtained at block 215. At decision block 217, a decision is made to ensure that the lengths of the chords are in proper proportions. If the lengths are not in proper proportions, then the control and navigation system 2a returns to tie point P1 and start position 200 to repeat the process. If the chord lengths are in proper proportions then a clockwise ordering of the chords from the hypotenuse is obtained at block 219. The chords are then arranged in order of decreasing length at block 221 or if this arrangement can not be made at block 221, then the control and navigation system 2a returns via tie point P1 to starting point 200.

Figure 8B:
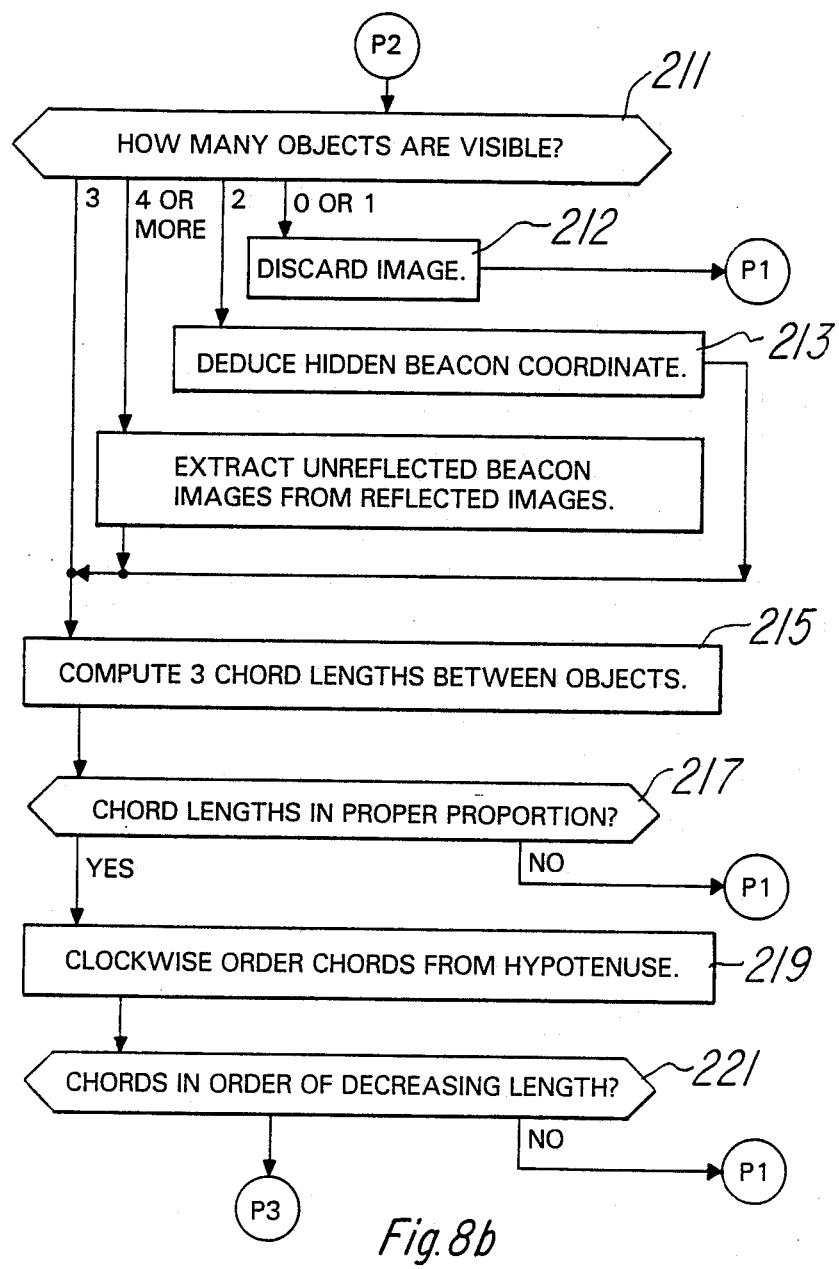
Figure 8C:
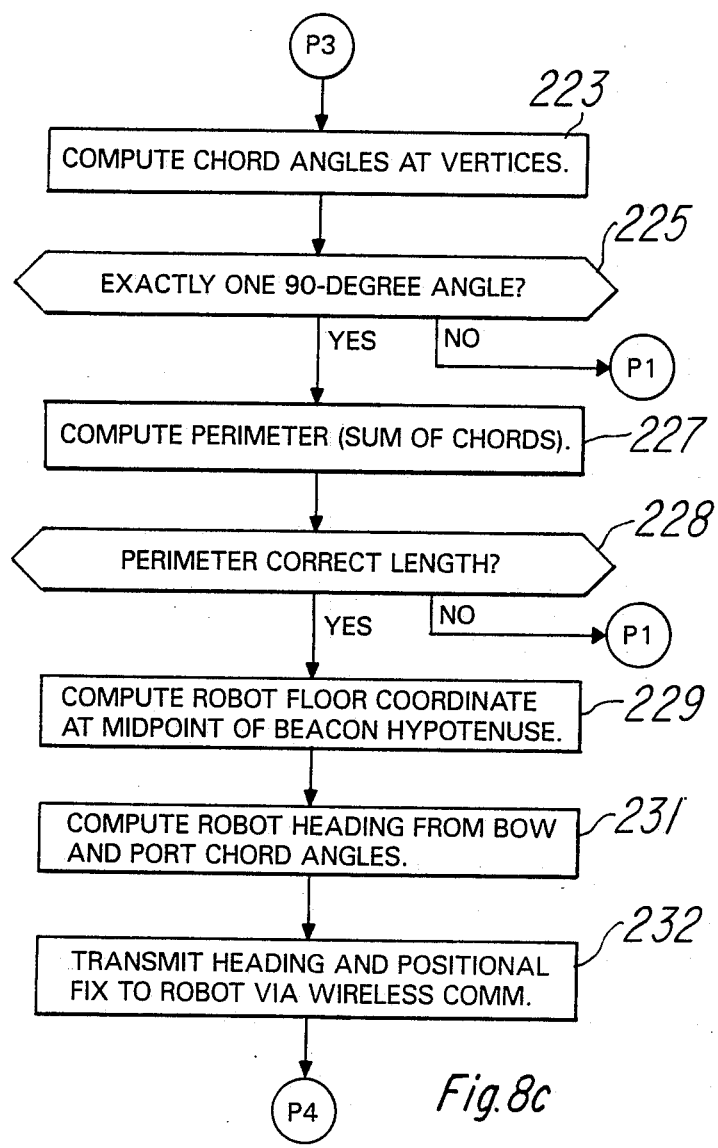

Tie point P3 connects FIG. 8C with 8B and reference should now be made to FIG. 8C.

Acquiring Mobile Apparatus Position and Heading

At block 223, the angle of the chords is computed and a decision is made at decision block 225 to ascertain if one of the chord angles is 90 degrees, or any other predefined degree angle. If the chord angles are correct, the perimeter or sum of the chords is computed at block 227. If not, then through tie point P1, the control and navigation system 2a returns to start point 200. If the perimeter is the correct length, then the floor coordinate of the midpoint of the beacon hypotenuse is computed at block 229. If the perimeter is not the expected length, then via tie point P1, the control and navigation system 2a returns to the start position 200.

The mobile apparatus' 21 heading is computed from bow and port chord angles at block 231. The bow chord is rotated 90 degrees and the mean of the port chord and the rotated bow chord is used as the final mobile apparatus heading. Communication of the heading and positional fix to the mobile apparatus 21 is performed at block 232.

To ensure heading and positioning of the mobile apparatus 21 it is obvious from the discussion of the flow diagram that at least one angle has to be at a particular degree that is different from the other two angles. In the case of the embodiment of FIG. 1, the angle is 90 degrees and given the 90 degrees angle then the heading of the mobile apparatus 21 and its relationship to the position of a raster belonging to an identifiable camera that is a member of the group of cameras 1A through 1N and consequently its position on a surface can be obtained. Thus, the process is repeated via connect point P4 to obtain a sequence of positions and the mobile apparatus 21 is guided across a factory floor or warehouse floor or any other location of its assigned duties through its internal guidance system and the sequential updating of its position.

It should be noted that the angular relationship of the beacons to one another should provide an image of an asymmetrical triangle and the optimum triangle is a 30, 60 and 90 degree triangle.

Figure 9:
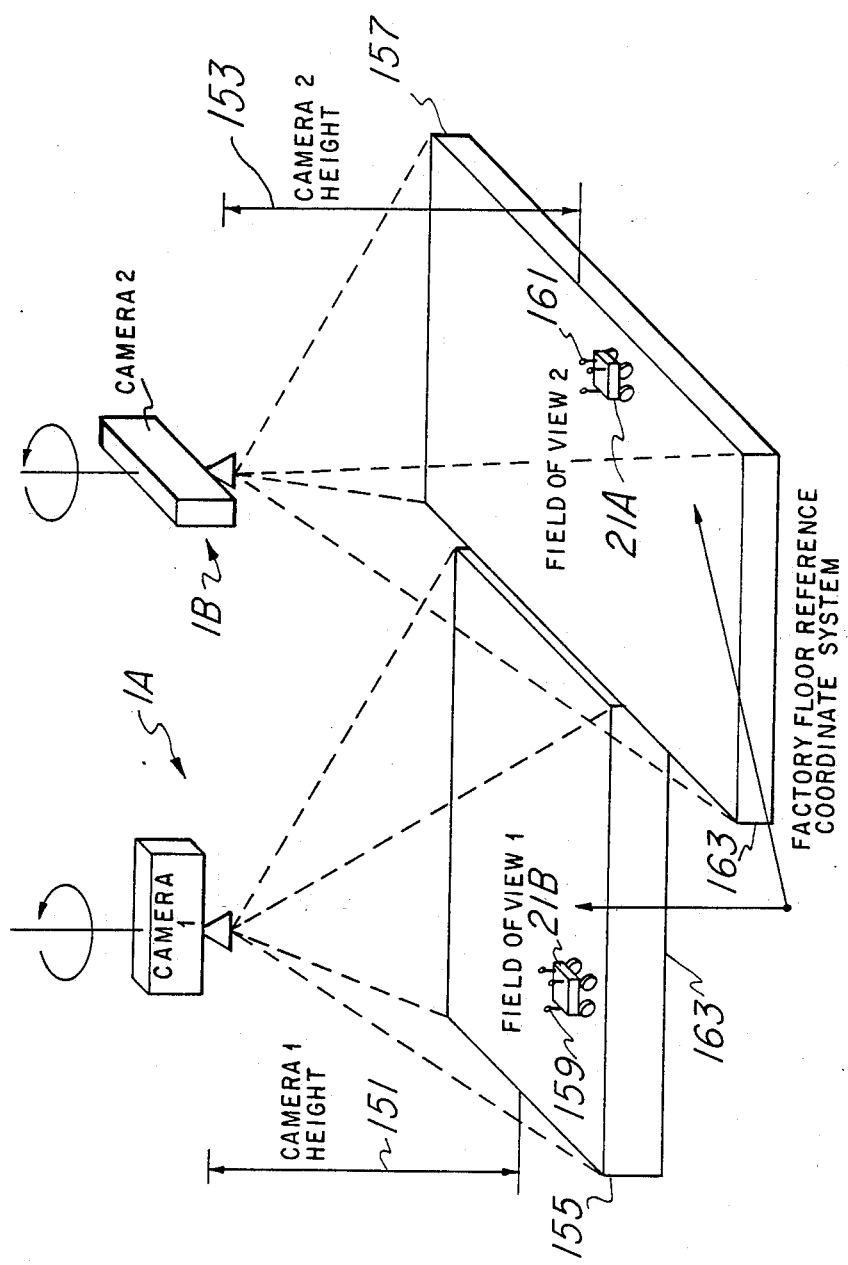
FIG. 9 is an isometric illustration of a manufacturing facility according to the invention.

FIG. 9 illustrates the beacon identification and transformation steps visually by showing a plurality of cameras 1A and 1B. Each camera has a field of view that is projected at a height that is illustrated by dimension lines 151 and 153. The field of view covers a plane that is illustrated by the plane 155 for camera 1A and for camera 1B the plane 157. These planes are calculated to be at the height of the beacons 159 and 161. However, the height of the beacon plane is different than the floor 163. Therefore, after the beacon plane at 155 or 157 is calculated, the plane is then transformed to the floor space (block 210 of FIG. 8A) to coincide with the plane 163.

Reflected Image Filtering

Figure 10:
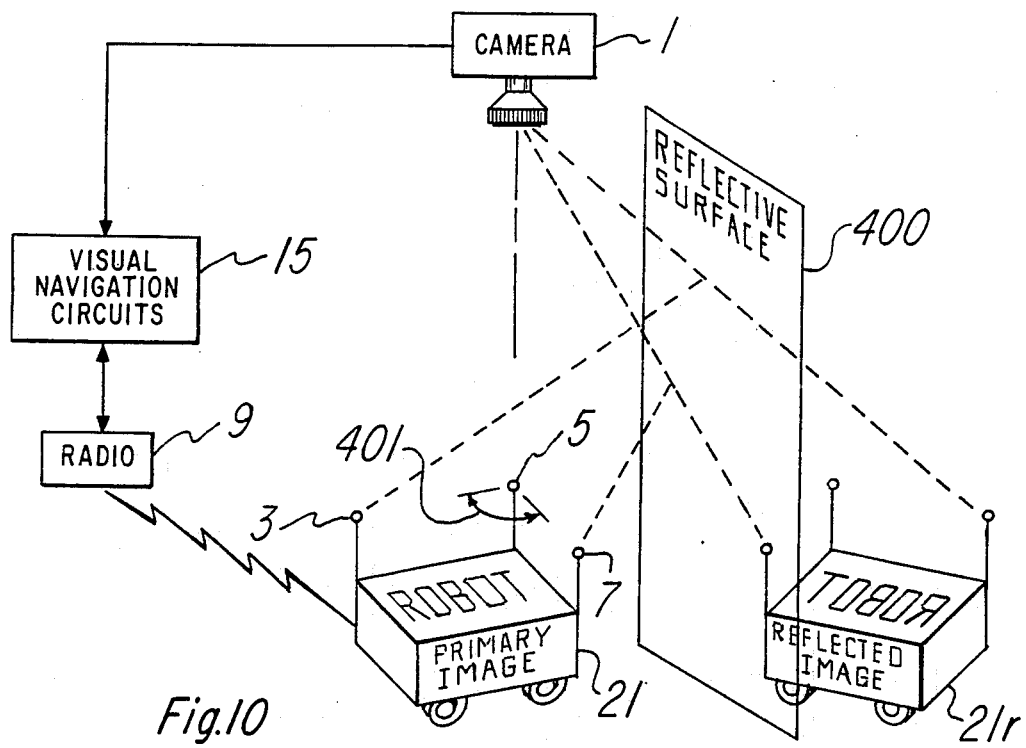
FIGS. 10 and 11 illustrate the problem encountered with reflective images.
Figure 11:
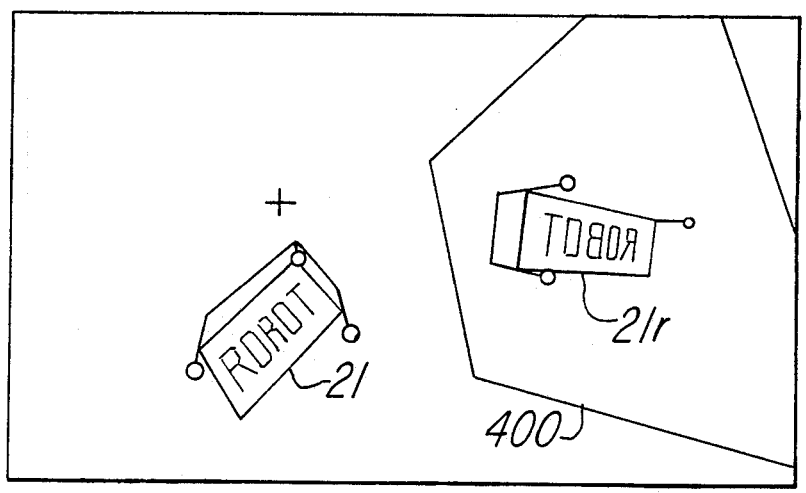

In the discussion of FIG. 8 and in particular with FIG. 8B, at step or block 214 that is implemented by the control and navigation system 2a that was disclosed in FIG. 1 the step of discarding of reflected images when there are more than the expected number of images received and processed was identified. This step is necessitated by the operation of the mobile apparatus 21 in environments such as that normally encountered in a manufacturing facility. A reflecting surface such as a window 400 (FIG. 10) reflects the image of the mobile apparatus 21 to the camera 1 so that the camera 1 visualizes an image that is illustrated in FIG. 11, i.e. two mobile apparatuses 21 and 21R. The control and navigation circuit 15 determine which image is the primary image and which image is the reflected image and discards the information that pertains to the reflected image. To implement this reflected image filtering technique in the embodiment shown in FIG. 10, the beacons 3, 5 and 7 are arranged in an asymmetrical triangle configuration having as indicated by dimension lines 401 a 90 degrees angle between a line that is drawn from beacon 3 to 5 as compared to a line that is drawn from 5 to 7. The three beacons make a right handed asymmetrical 90 degrees triangle. The reflected image is an asymmetrical left handed 90 degrees triangle and by knowing this information, the control and navigation circuit 15 will disregard the reflected image 21R.

Figure 12:
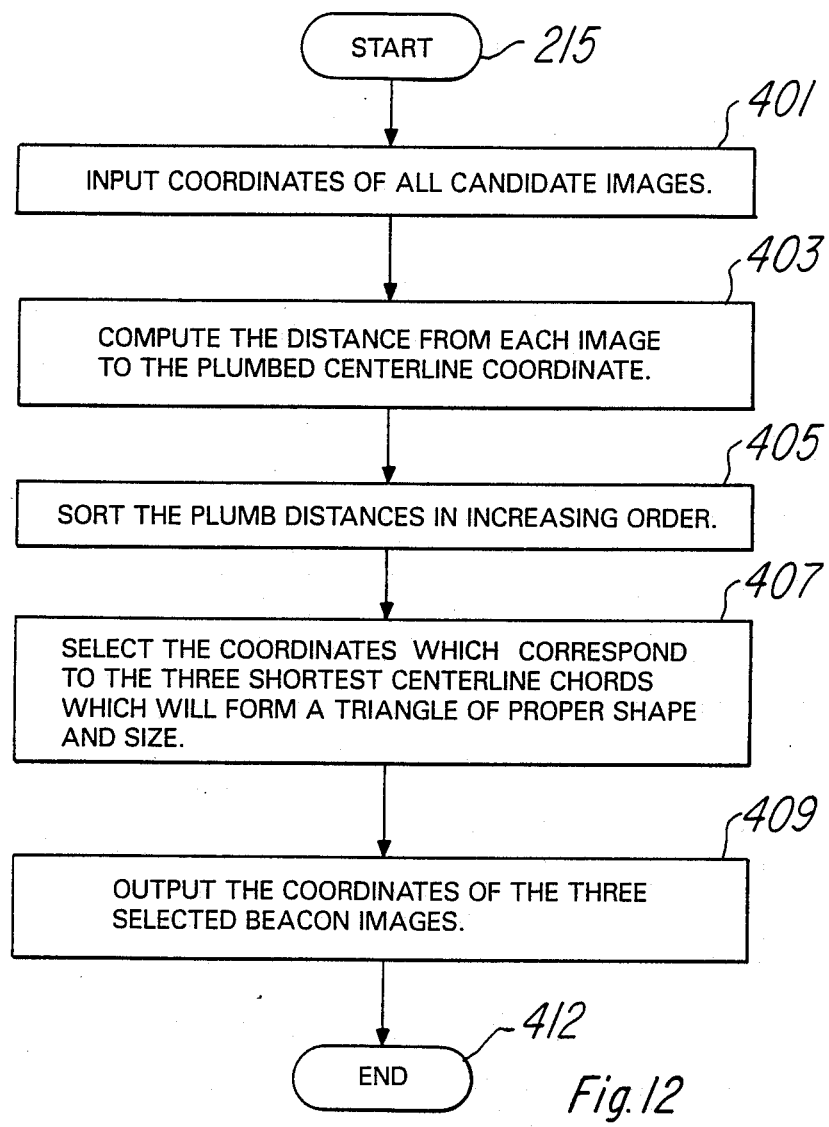
FIG. 12 is a flow diagram of the program implemented when reflected images are encountered.

The process that is utilized is illustrated in FIG. 12 and begins at a start point at block 214 which is also the reference point from FIG. 8B. All of the centroids of the images are obtained at block 402. The distances from each image centroid to a plumbed center point coordinate is obtained at block 403, and at block 405 a sort is made of the plumb point to centroid chords in order of lengths. At block 407, the images corresponding to the shortest center line chords which form a triangle of correct shape and size are identified and the coordinates of the three selected beacons are obtained at block 409. At the end block 412 the microprocessor returns to the execution of the next step which occurs at step 214 of FIG. 8B.

Hidden Beacon Identification Procedure

Figure 13:
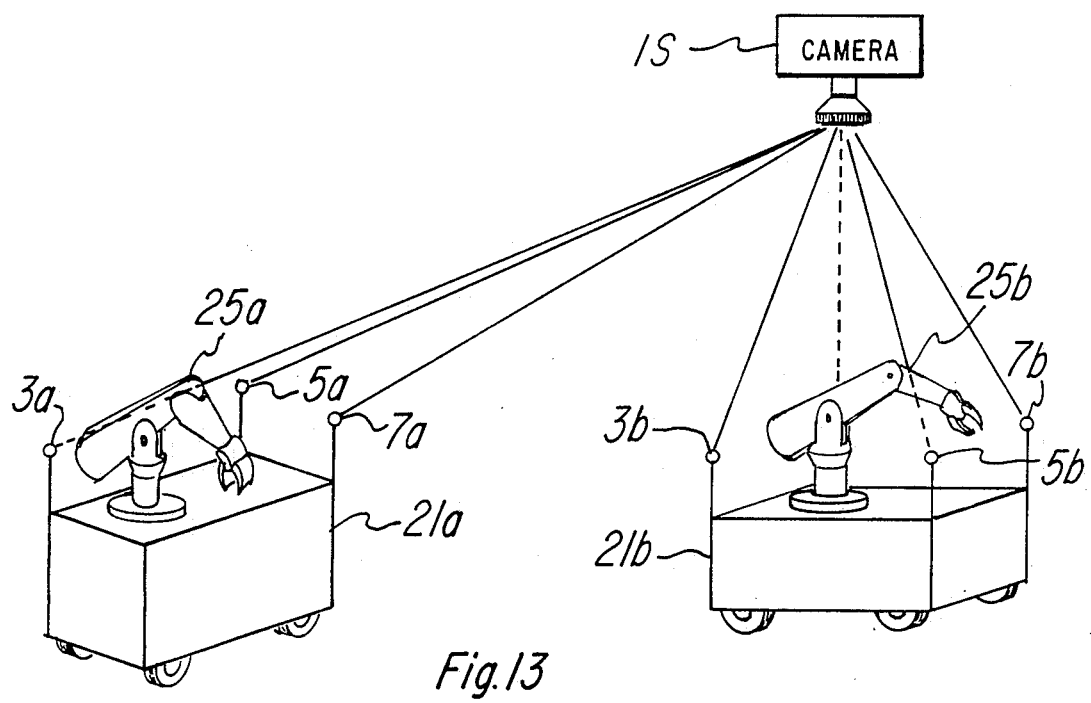
FIGS. 13, 14 and 15 indicate the problem encountered when a guidance beacon is obstructed from view of a camera according to the invention.
Figure 14:
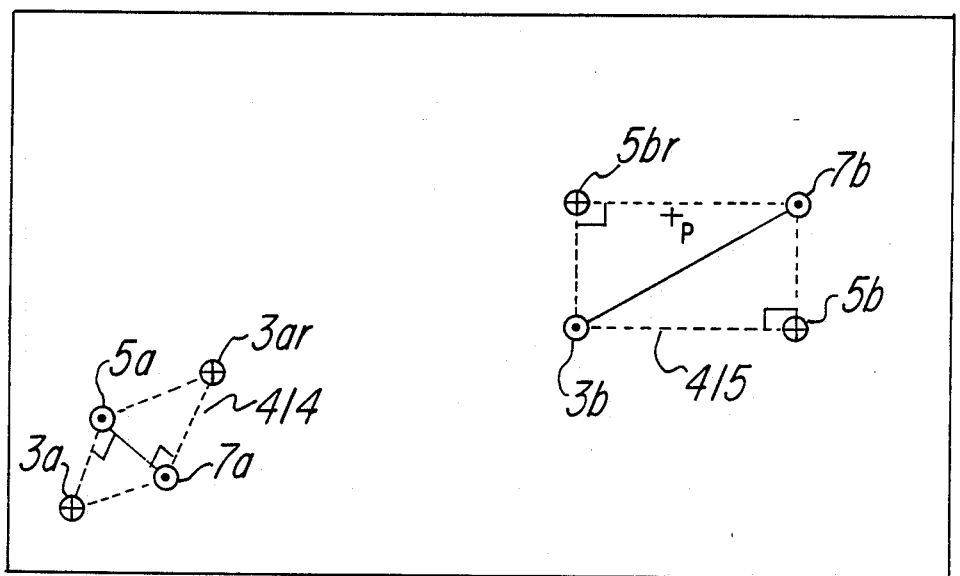

In FIG. 13 there is illustrated a manufacturing arrangement wherein two mobile apparatuses 21A and 21B are operating under the field of view of a selected TV camera 1S. Each moblie apparatus 21 be it 21A or 21B has three navigational beacons 3, 5, and 7 and a robot arm 25. In both cases illustrated in FIGS. 13 and 14 one of the three beacons per mobile apparatus is obstructed from the field of view of the selected video camera 1S. The condition occurs when the view of one of the beacons to the selected camera 1S is obstructed and the control and navigation circuit 15 will implement at block 213 of FIG. 8B the hidden beacon procedure.

Figure 16A:
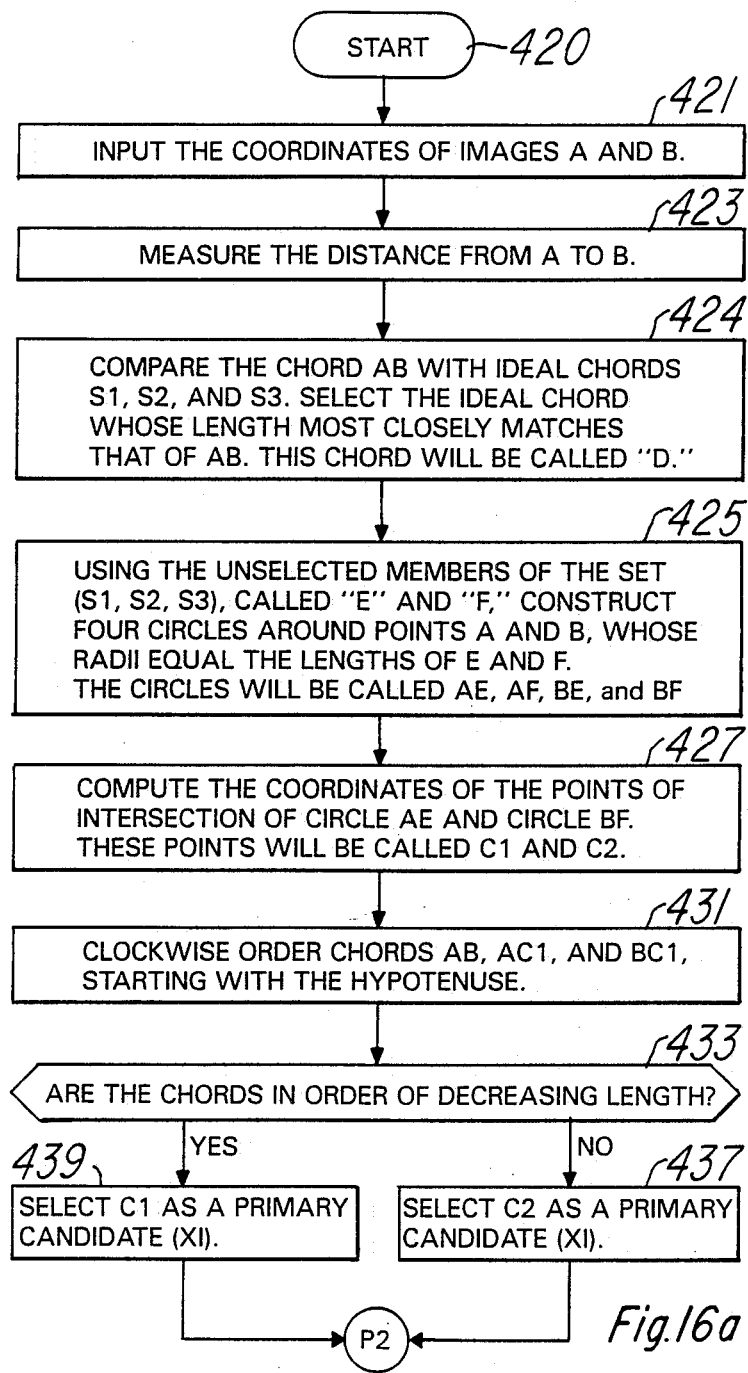
FIGS. 16A, 16B and 17 illustrate the determination of an obstructed image.
Figure 16B:
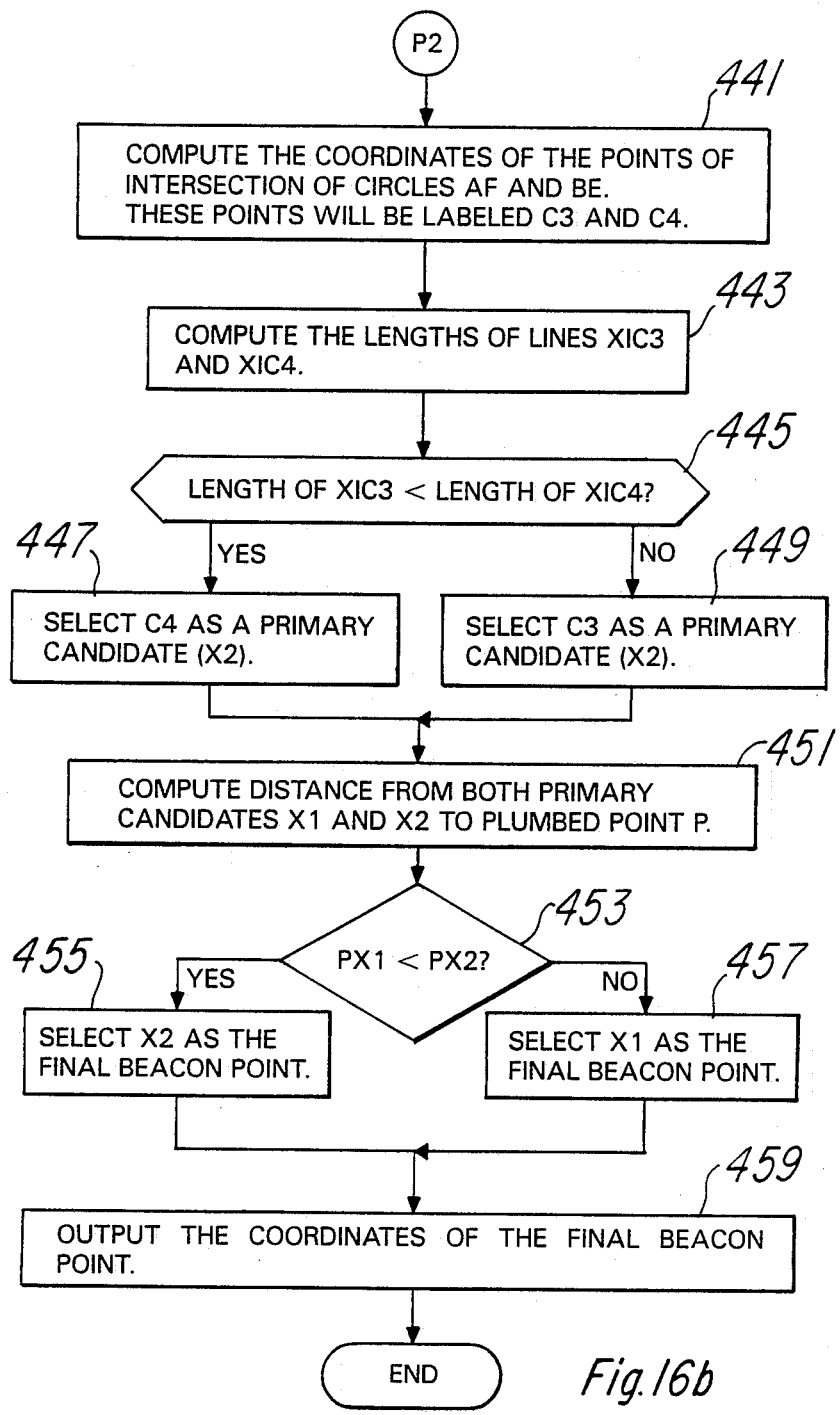
Figure 17:
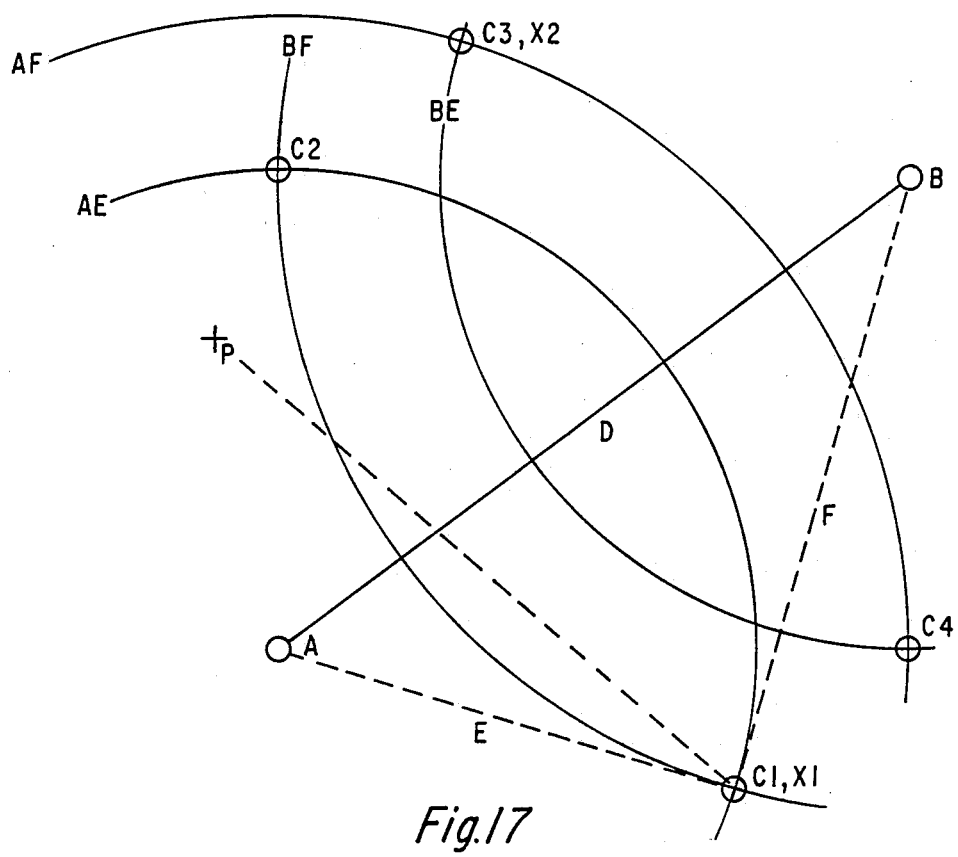

The problems that are solved by the hidden beacon procedure are illustrated in FIGS. 14 through 17 which should be used in conjunction with FIG. 13. The view of the beacons as seen by the selected TV camera 1S is shown by the field of view 416. FIG. 17 is a detailed view in which two beacons are visible and a third beacon is blocked. In both FIGS. 14 and 17, the plumb point is marked "P". Image 414 shows how the blocking of beacon 3A raises two distinct possibilities: it can be either where beacon 3A is illustrated or where beacon 3AR is illustrated. Image 415 illustrates when one of the other two beacons is obstructed from view of the selected TV camera 1S. In the case of image 415 the robot arm 25B obstructs beacon 5B. The control and navigation system 2a must decide the exact location of the beacon and the choices are at the location of beacon 5B or the location of beacon 5BR.

Figure 15:
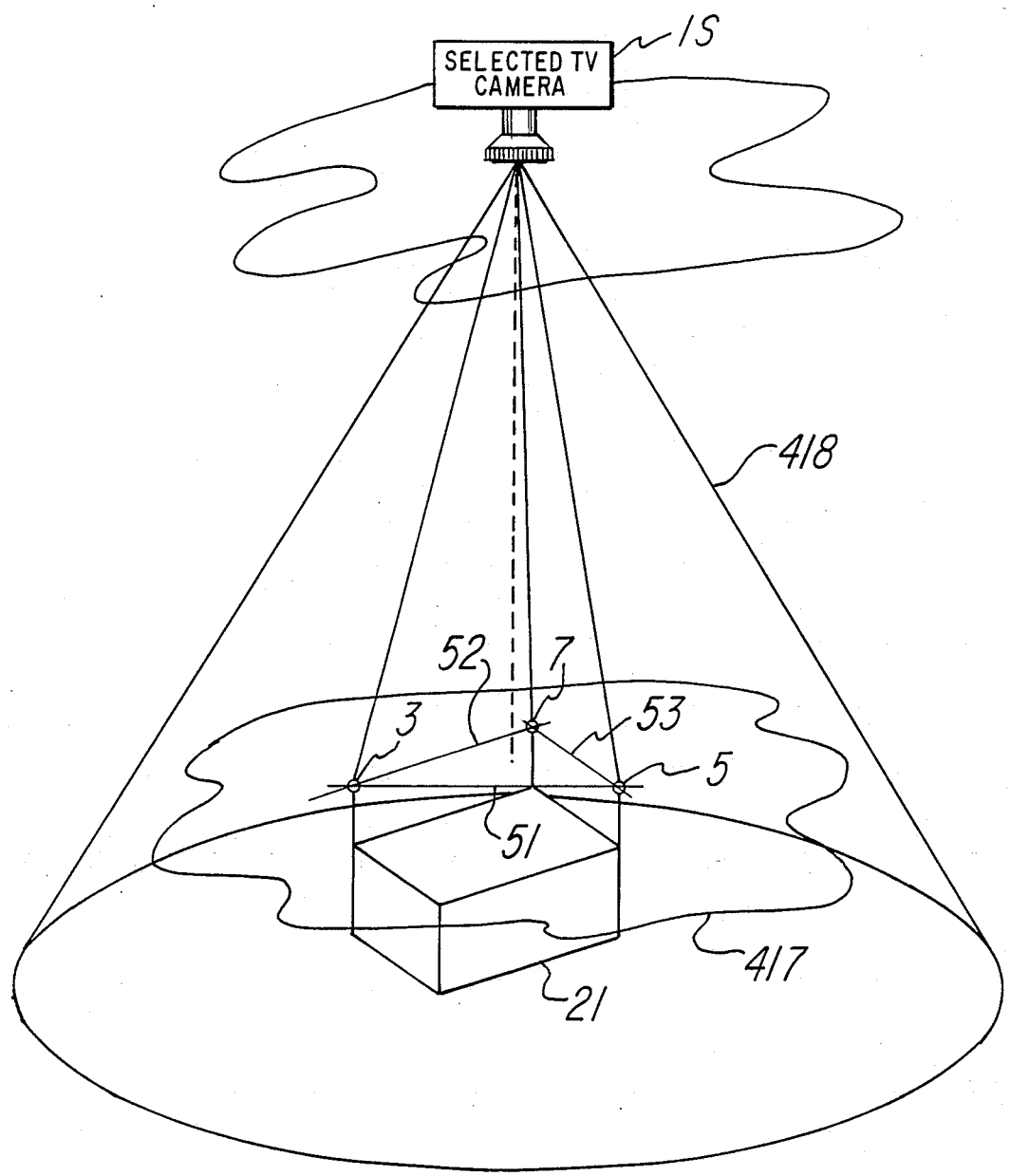

The solution to the above discussed problem may be understood by referring to the geometry of the image that is viewed by the selected TV camera 1S. This is illustrated in FIG. 15 where there is a triangle with three sides s1, s2, and s3 and where side s1 is the chord between beacons 3 and 5, side s2 is the chord that connects beacons 3 and 7 and side s3 connects beacons 5 and 7. The triangle is in a plane 417 that contains beacons 3, 5, and 7.

Procedures for Identifying Hidden Images

FIG. 16 are flow diagrams of the procedures for identifying hidden images such as those shown in FIG. 13. If as shown in FIG. 17 the images of the two beacons are identified as "A" and "B", the control and navigation circuit 15 is initiated at block 420. The coordinates of images A and B are supplied to the control and navigation circuit 15 at block 421. The distance between images A and B is obtained at block 423. The control and navigation circuit 15 has stored therein the lengths of the chords s1, s2, and s3. At block 424 the control and navigation circuit 15 compares the distance between images A and B with the length of each chord s1, s2 and s3 and selects the chord which has a length that closely matches the length of the distance between images A and B and assigns the selected chord the reference notation "D" as is illustrated in FIG. 17. As is indicated in FIG. 16a a block 425, the unselected chords are designated by the reference letters "E" and "F". A first circle AE of a radius E is constructed around A and a second circle BE of equal radius is constructed around B. A third circle AF having a radius of length F is constructed around A and a fourth BF of equal radius around B.

The next step is to obtain the coordinates of candidate points C1 and C2 at the intersections of circles AE and BF. This step is implemented at block 427. A clockwise ordering of the chords AB, AC1, and BC1 is performed at block 431. A decision is made at block 433 as to whether the length of the chords is increasing in length or decreasing in length starting with the hypotenuse. If the clockwise arrangement of the chords produces an arrangement which begins with the hypotenuse and decreases in length then the control and navigation system 2a goes to block 439 and coordinate C1 becomes the first primary candidate and is designated as X1. Otherwise, the control and navigation system 2a goes to block 437 where C2 is designated as the first primary candidate X1.

At block 441 of FIG. 16B, the coordinates of the points of intersection of circles AF and BE are obtained and designated C3 and C4 repectively. The lengths of the chords (X1, C3) and (X1, C4) are obtained at block 443. A decision is made at block 445 to ascertain if chord (X1, C3) is shorter than (X1, C4). If (X1, C3) is shorther than (X1, C4) then C4 is selected as the second primary candidate X2 at block 447; if not, C3 is selected as the second primary candidate X2 at block 449.

The distance is computed between the coordinates of the first and second primary candidates X1 and X2 and plumb point P at block 451. If the length of the chord PX1 is less than PX2 which decision is made at block 453 then X2 is the third beacon point. Otherwise, X1 is the third beacon point as indicated at block 457. The results of the indentification are provided at block 459 to complete the hidden beacon procedure and the control and navigation system 2A returns to block 215 of FIG. 8B.

The Mobile Apparatus 21

Figure 18:
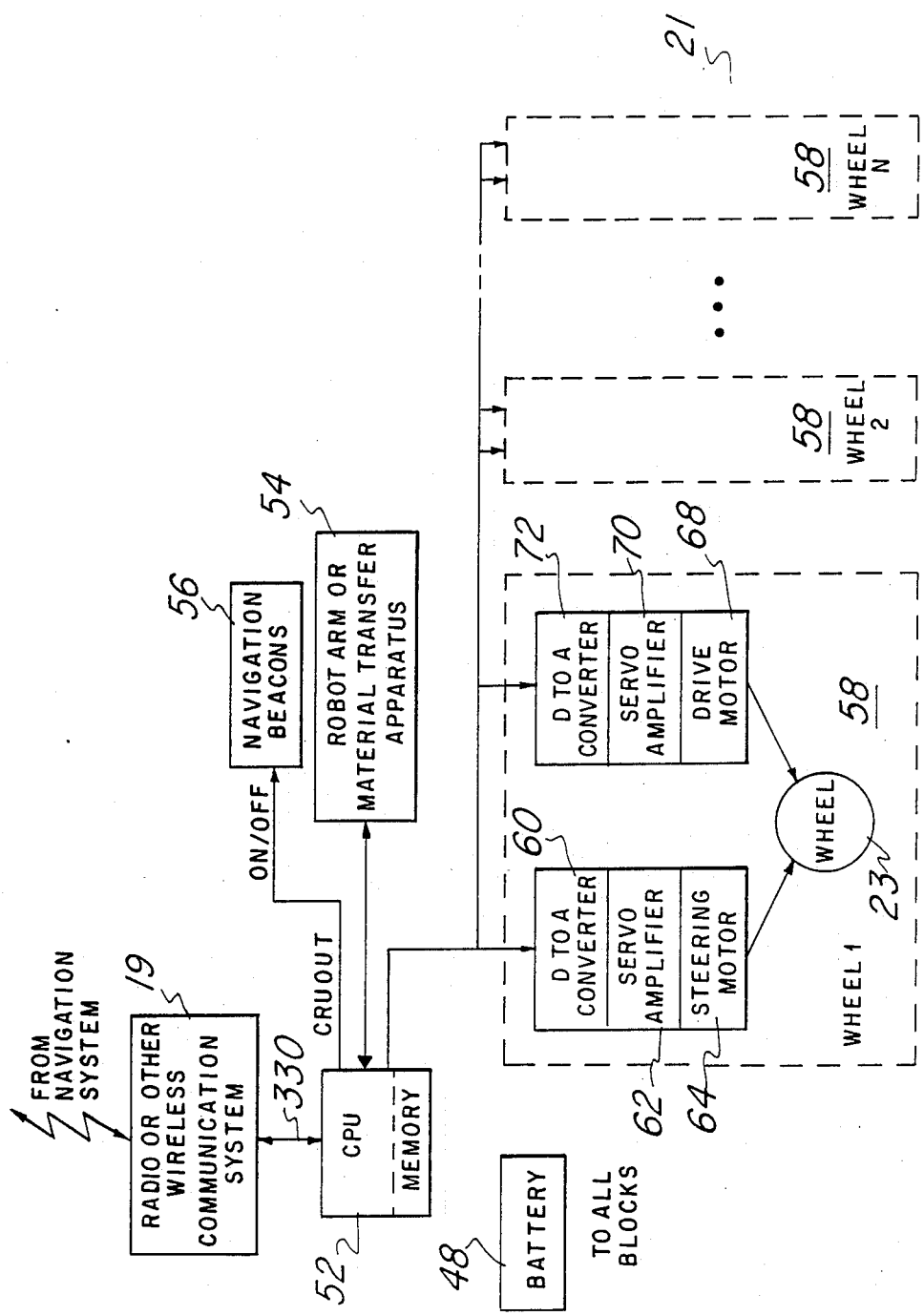
FIG. 18 is a block diagram of a mobile robot according to the invention.

FIG. 18 is a block diagram of the mobile apparatus 21 according to the invention as illustrated in FIG. 1. A radio or other wireless communication system 19 such as infrared diodes receives position data and commands from the navigation CPU and memory 37a and transfers that to the heart of the mobile apparatus 21, a CPU and memory 52. The CPU and memory 52 transfers instructions to a robot arm or material handling apparatus such as that illustrated in FIG. 1 as a robot arm 25 and also provides commands to the navigation beacons such as "turn on", "turn off", "flash" or other functions. Additionally, the CPU and memory 52 provides steering, start, stop and rotation instructions to a plurality of wheel assemblies 58. Each wheel assembly includes a first D to A converter 60, a steering servo amplifier 62, a steering motor 64 which is responsive to commands from the steering servo amplifier 62, a second D to A converter 72, a drive servo amplifier 70 and a drive motor 68 which causes the wheel 23 to rotate. Both the drive servo amplifier 70 and the steering servo amplifier 62 are illustrated as servo amplifier 371 in FIG. 19. Both the first D to A converter 60 and second D to A converter 72 are illustrated as D to A converter 372 in FIG. 19. Both steering motor 64 and drive motor 68 are illustrated as motor 376 in FIG. 19. A battery 48 provides power to the mobile apparatus assembly 21.

CPU/Memory Combination's 52 Program Sequence

The sequence of events that is executed within the CPU and memory 52 of the mobile apparatus 21 begins when the mobile apparatus 21 via the radio or wireless communication system 19 receives a go to goal command and verification of the receipt of that command is provided. The navigation system initially provides the positioning information to the mobile apparatus 21 and a comparison is made to ascertain if the current position is equal to the goal position. If it is, then the CPU and memory 52 wilol cause the mobile apparatus 21 to stop and to wait until a new go to goal command is received. If it is not the same, then the directions, and displacements to the goal position are ascertained and an update of the steering angles and velocity towards the goal position are implemented that will steer the mobile apparatus toward the goal position.

Mobile Apparatus Guidance and Servo Control Sytem

Figure 19:
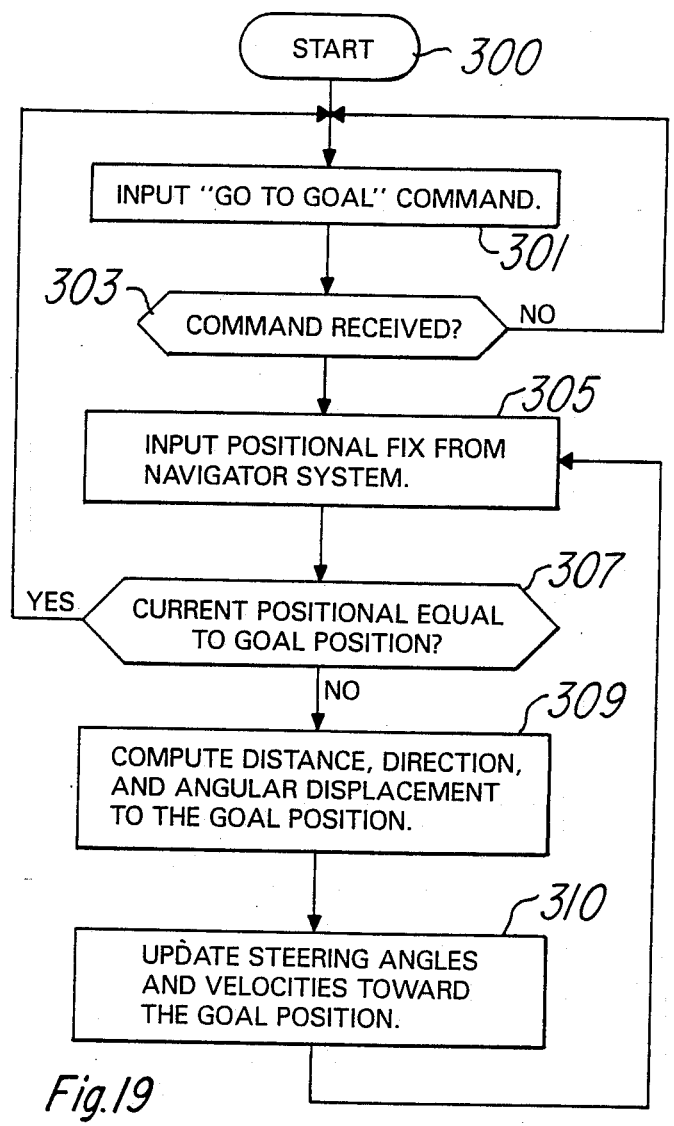
FIG. 19 is a block diagram of a servo control loop according to the invention.

In FIG. 19 there is shown a simplified circuit diagram of a servo control loop 320 that is contained within the mobile apparatus 21 for each wheel assembly 58 and is used to control the mobile apparatus 21. The servo control loop 320 includes the CPU and memory 52. The CPU and memory 52 provides in the form of digital signals speed and direction data to the servo amplifier 371 via the D to A converter 372. The D to A converter 372 converts the digital signals that are provided from the CPU and memory 52 to an analog voltage or command voltage that is applied to the servo amplifier 371. The servo amplifier 371 provides buffering to the D to A converter 372 and amplifies the command voltage which is applied to a motor 376 and is used to cause the motor 376 to rotate a shaft 374 which causes the load 23, such as a wheel or a steering wheel, to rotate the number of degrees as represented by the amplified command voltage that is applied to a motor 376 from the servo amplifier 371. A shaft encoder 333 encodes the degrees of rotations and provides this information via conductor bundle 375 to an encoder interface 370 which converts the output of the shaft encoder to signals that are acceptable by the CPU and memory 52.

Dead Reckoning Guidance System

Figure 20:
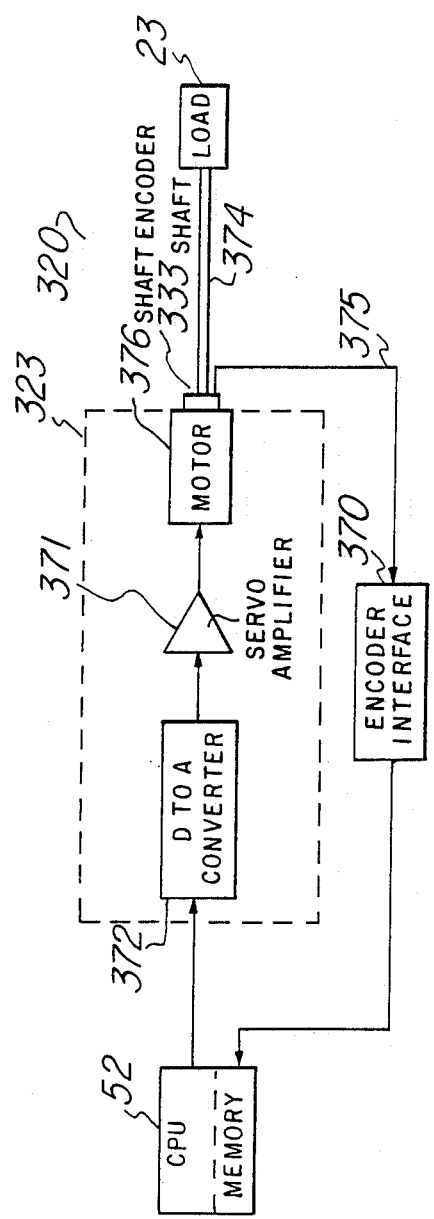
FIG. 20 is a block diagram of a dead reckoning navigation system implemented by the mobile apparatus of FIG. 18.

The mobile apparatus 21 is permitted to be free roaming and as such the steering angles and drive velocities of each wheel must be coordinated. Refering to FIG. 20 which should be used in conjunction with FIGS. 18 through 19 there is shown the implementation of a dead reckoning guidance system for the mobile apparatus 21. The CPU and memory 52 receives a commanded trajectory from the control and navigation circuits 15 via the wireless communication system 19 and implements a position comparison at block 331. The results of the comparison are used to formulate a wheel position error that is used by the CPU and memory 52 for developing of trajectory control and wheel coordination commands at block 328 for application to the wheel assemblies 58 in the form of digital signals that was described in conjunction with FIG. 19. The digital signals are applied to the servo control at block 327 which generates commands for the servo amp and mechanism 323 which includes the D to A converter 372, servo amplifier 371 and the motor 376. After the conversion to analog signals by the D to A converter 372, the analog command voltage is applied to the servo amplifier 371 for amplification. The servo control 327 receives an angle via an angle sensor 325 and uses this information to adjust the amplitude of the command voltage that is applied to the servo amplifier and mechanism 323. Additionally, the sensed angle as measured by the angle sensor 325 on each motor 376 is applied to a position estimator 329. The angle sensor 325 includes shaft encoder 333, conductor bundle 375 and encoder interface 370. The position estimator 329 also receives a total of 6 position datas from 6 angle sensors 325 and is directed to a 3 wheel mobile apparatus 21 with each wheel assembly 58 being used for both drive and steering functions. The position estimator provides the position of the mobile apparatus 21 to the position comparator 331 which generates commands to adjust the position of the mobile apparatus 21 until the commanded position is achieved. Periodically the mobile apparatus 21 receives measured position from the control and navigation circuit 15 and corrects the dead reckoning position accordingly. The equation of motion for each wheel is provided by equation 1; equation 2 provides the wheel coordination and equation 3 provides the dead reckoning determination. All of the equations are found in the table of equations.

Figure 21:
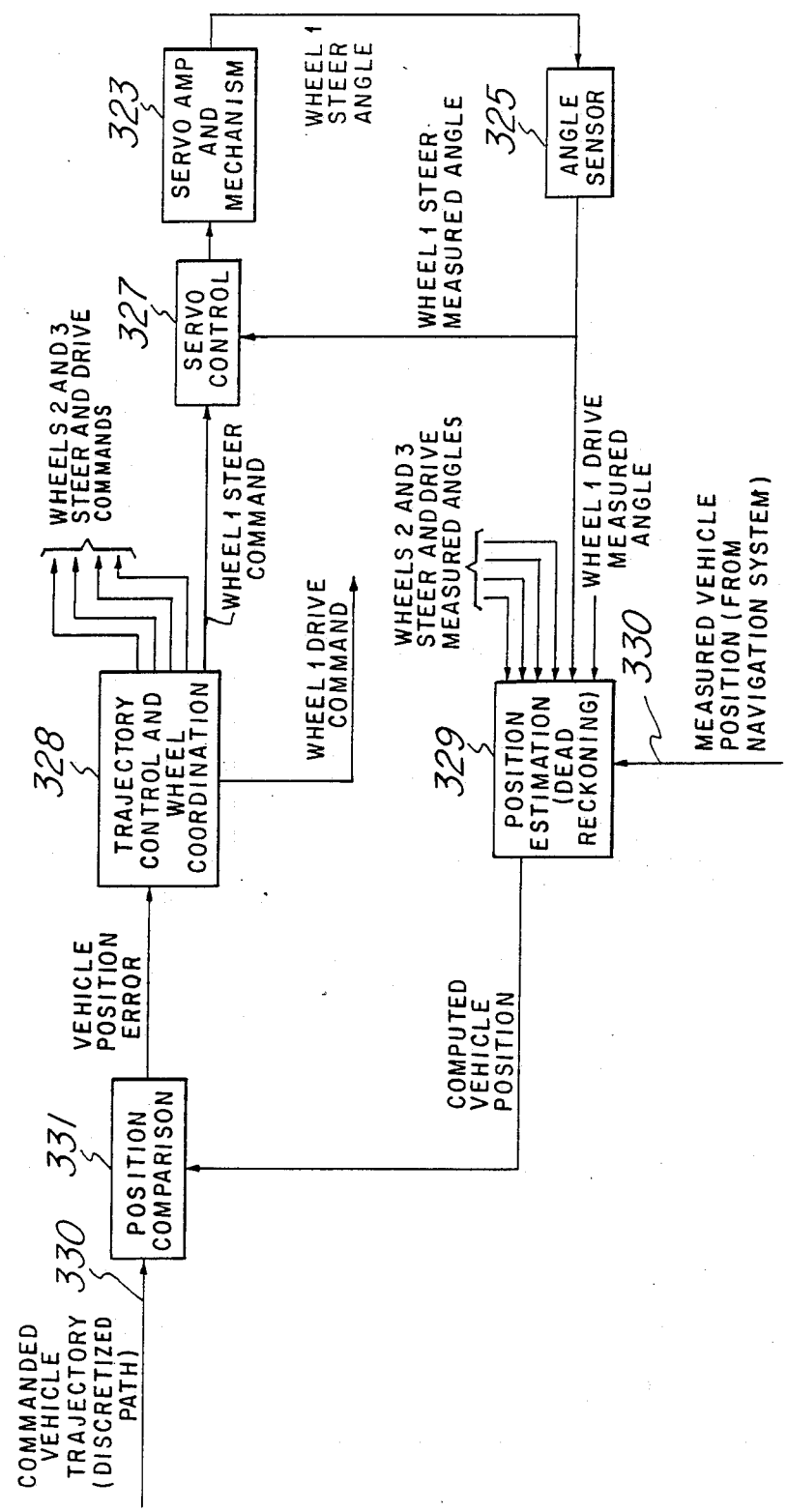
FIGS. 21A-21C are flow diagrams of the dead reckoning navigation system according to the invention.

FIG. 21 are a flow diagram of the software implementation for guidance of the mobile apparatus 21 of FIG. 1 in which the control and navigation circuit 15 transmits to the mobile apparatus 21 command instructions to command the mobile apparatus 21 to traverse a predetermined commanded path. Additionally, the control and navigation circuit 15 periodically provides to the mobile apparatus 21 position data which the mobile apparatus 21 uses to correct for errors that are present in navigation commands that are contained within a dead reckoning navigation procedure that is executed by the mobile apparatus 21.

The CPU and memory 52 executes within the CPU section the dead reckoning program that is stored within the memory of the CPU and memory 52 and is represented by the flow diagram contained within FIG. 21. At block 350 the control and navigation system 2A formulates the absolute position of the mobile apparatus 21 and transmits it via the radio or other wireless communication system 19 to the mobile apparatus 21. The mobile apparatus as indicated at block 351 is at a stop position where it waits for the absolute position data to be provided from the control and navigation system 2A which is used in the embodiment of FIG. 1 as a sensor rather than a controller. At block 353 the vehicle, mobile apparatus 21, begins motion in a command direction that is provided from the control and navigation circuit 15 and stores extrapolated positions and vehicle reference time stamped after each time period. At block 355 the vehicle, mobile apparatus 21, receives absolute position data with sensor reference time stamp from the control and navigation circuit 15, and the CPU and memory 52 searches stored extrapolated data for the closest match between the absolute data position and the extrapolated radial move from the stop position at block 351 to the current position at block 357.

The CPU and memory 52 then determines the offset between the time stamp of the closest match position from block 357 and the absolute position sensor data at block 359. The mobile apparatus 21 proceeds in the commanded direction continually storing the extrapolated position and generating the reference time stamp after each time period at block 361.

Once the mobile apparatus 21 receives absolute position data with time stamp from the control and navigation circuit 15 then a comparison is made to see if a preselected time limit between data points is exceeded. If so, then line 363 is taken from block 365, and a failure of synchronization in timing between the control and navigation circuit 15 and the mobile apparatus 21 occurs at block 367. Therefore, the mobile apparatus 21 must stop and wait and return to block 350 until it receives its absolute position. If the time limit between the data points is not exceeded, then the CPU and memory 52 proceeds to block 369 where the CPU and memory 52 determines extrapolated position at the time when the absolute position was measured using known offset from block 359 and the stored position in the memory portion of the CPU and memory 52. At block 371 errors in the extrapolated position when absolute position was measured are subtracted from the current extrapolated position.

If the errors are greater than expected, such as 6 inches in radial distance or 5 degrees, then the assumption at block 367 that there is a synchronization time failure is made, and the CPU and memory 52 commands the mobile apparatus 21 to stop. If not, line 373 is taken and the controllable mobile apparatus 21 proceeds in the commanded direction.

In the discussion of the hidden image subroutine that was discussed in conjunction with FIGS. 13 through 17, it was shown that when one of the images is blocked that it is possible to know the position and heading of the mobile apparatus 21. However, in reflective environments or other combination of environmental vision conditions, the hidden image subroutine may be inaccurate. Therefore, the mobile apparatus will override an erroneous command that is provided it from the control and navigation circuit 15 of FIG. 1. This override ability is illustrated in FIG. 21C to which reference should now be made.

Within the execution of blocks 351, 355 and 365 of FIGS. 21A and 21B, the CPU and memory 52 leaves the start block 352 and waits for position data from the control and navigation circuit 15. Contained in the position data is an indication of when there is a hidden image. This data is checked at block 356. If there is no hidden image indication, the program is exited via block 364. If there is a hidden image indication, then blocks 358 and 360 compare the angle from the control and navigation circuit 15 with the dead reckoning angle. The angle as determined by the dead reckoning guidance will be the dominate angle if the two angles are 180 degrees different indicating an error in the hidden image routine data, and at block 362 the data from the control and navigation circuit 15 is adjusted based on light geometry and information comtained in the position data indicating which image was hidden and thus incorrectly synthesized. This route of FIG. 21C is executed whenever position data is received from the control and navigation circuit 15.

Velocity Filter for a Servo System

Figure 22A:
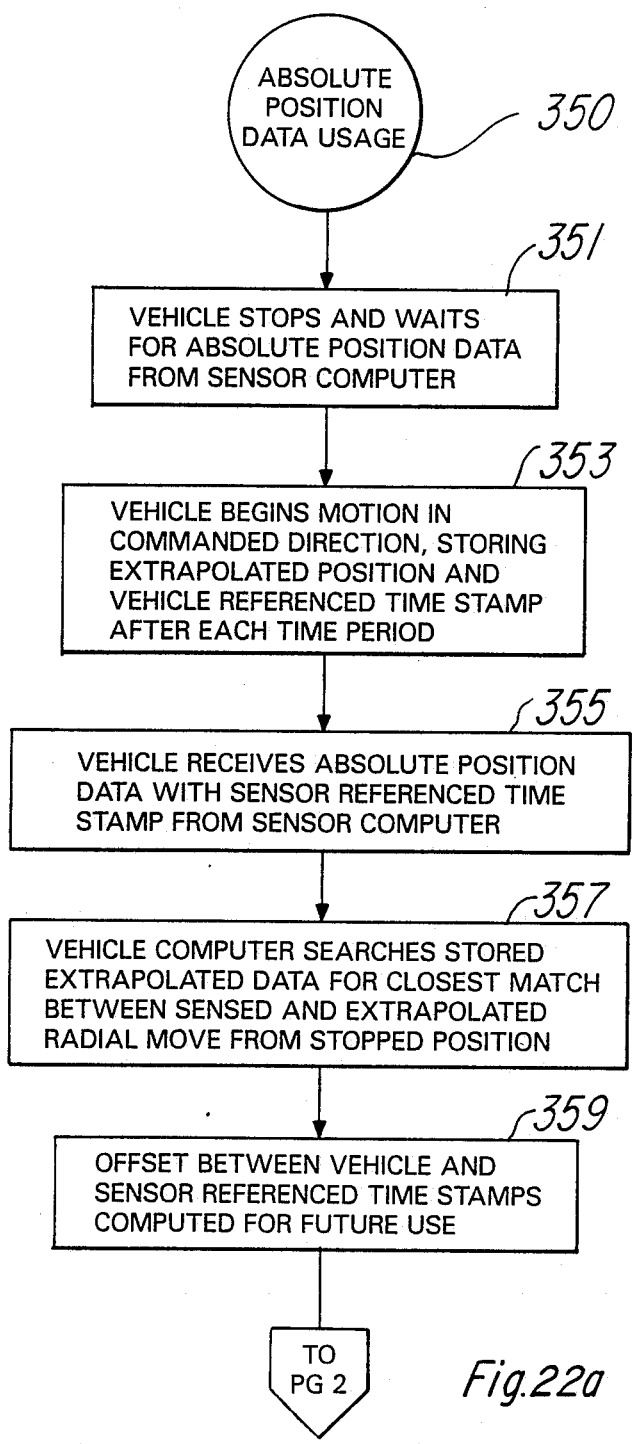
FIG. 22 is a flow diagram of the execution of a servo filter according to the invention.
Figure 22B:
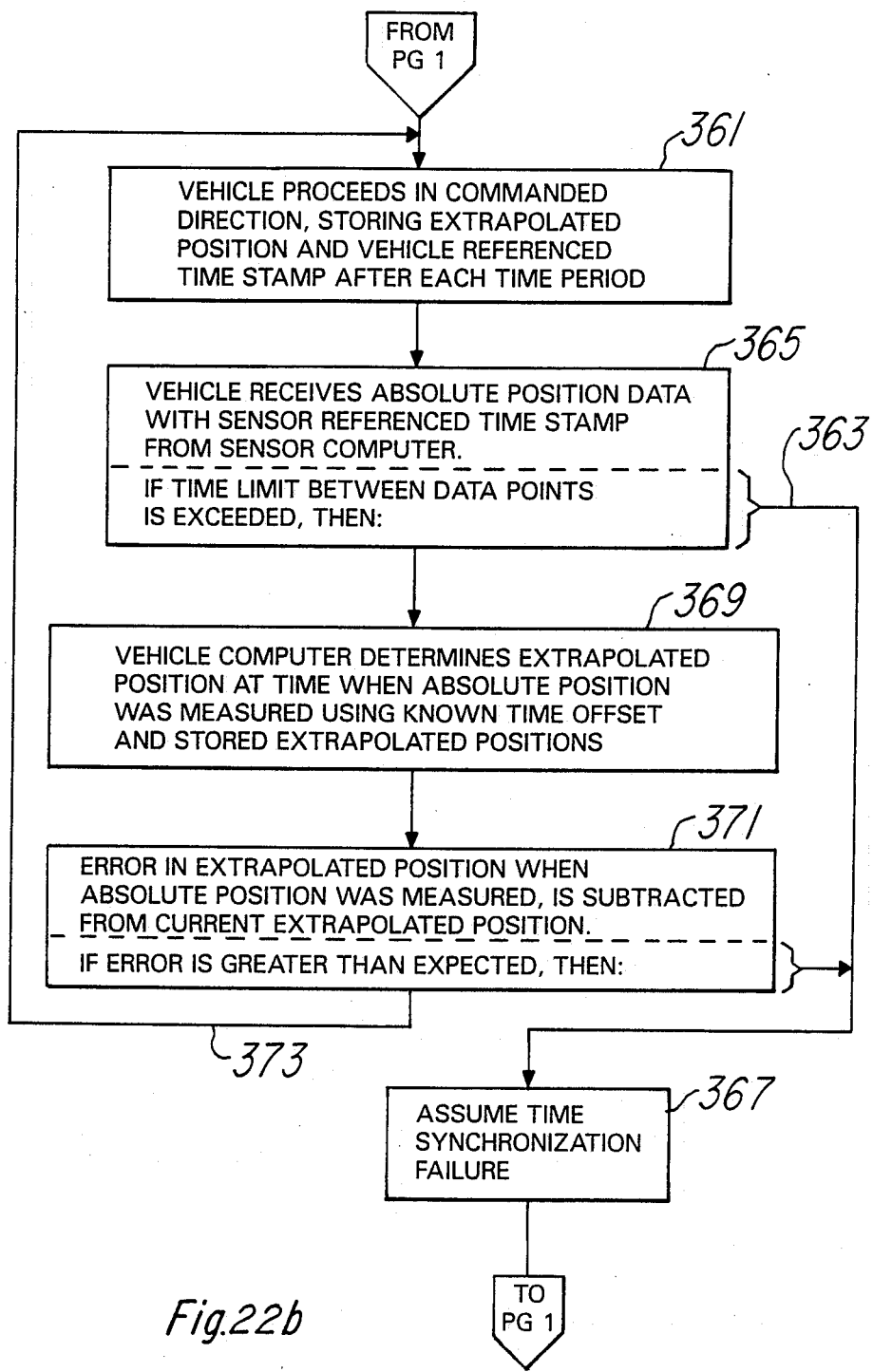
Figure 22C:
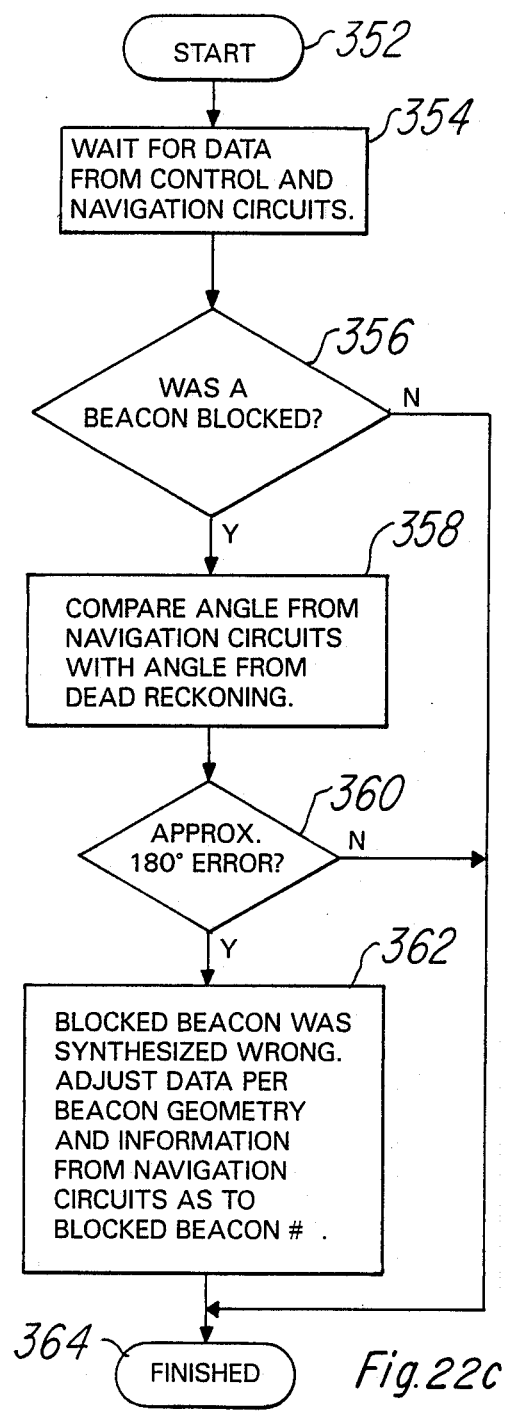

The CPU and memory 52 of FIG. 19 executes a servo filter program that is illustrated by the flow diagram in FIG. 22 to which reference should now be made. In FIG. 22 at block 376 the CPU and memory 52 calls the velocity filter into play and the motor position or shaft position that is determined by the shaft encoder 333 is read at block 377. The unfiltered velocity is determined at block 374 based upon the degree of rotation of the shaft encoder between reading times and the time between readings. The CPU and memory 52 as does most microprocessors, operates on a cycle time basis so these periodic readings can be performed every n cycles where n is a positive number that can be from 1 to infinity. At block 375, the filtered velocity is obtained by summing the previously filtered velocity times a constant K1 with the unfiltered velocity times a constant K2. The sum will equal the filtered velocity.

K1 and K2 have the limitation of the summation of which must be equal to 1 and are determined by experimentally adjusting the value of the ratio of K1/K2 based on the dynamic performance of the servo system especially at low or slow velocities when the data from the shaft encoder 333 is changing at a very slow rate. For example in the embodiment of FIG. 19 it is possible for the shaft to be rotating at one quarter of an increment per sample period that is performed by the CPU and memory 52. The velocity without filtering is 0 degrees per sample, for three samples and 1 degree per sample, for the fourth sample. This of course will cause the servo system to lunge every fourth sample and thus possibly damage any delicate material being handled by the mobile apparatus 21. The selecting of the constant K1 and K2 and utilization of the velocity filter will eliminate the problem by smoothing out the velocity over all four samples.

Before returning to FIG. 22 at block 376, it should be noted that the input and output of digital servo systems is quantized. In the example of FIG. 19, the incremental shaft encoder 333 has a quantization of ± one count. There are thus a maximum and a minimum value allowed for velocity. This information is determined by the resolution of the shaft encoder. Thus at block 376 the filtered velocity is bounded by the minimum and maximum velocity based on the quantization of the shaft encoder 333.

Procedure for Selecting of the Constants K1 and K2

Set the ratio of K1 to K2 equal to a constant such as 1 and increase the value if the servo system twitches or decrease the value of the ratio if the servo system is unstable and oscillatory.

Apparatus Braking System

Figure 23:
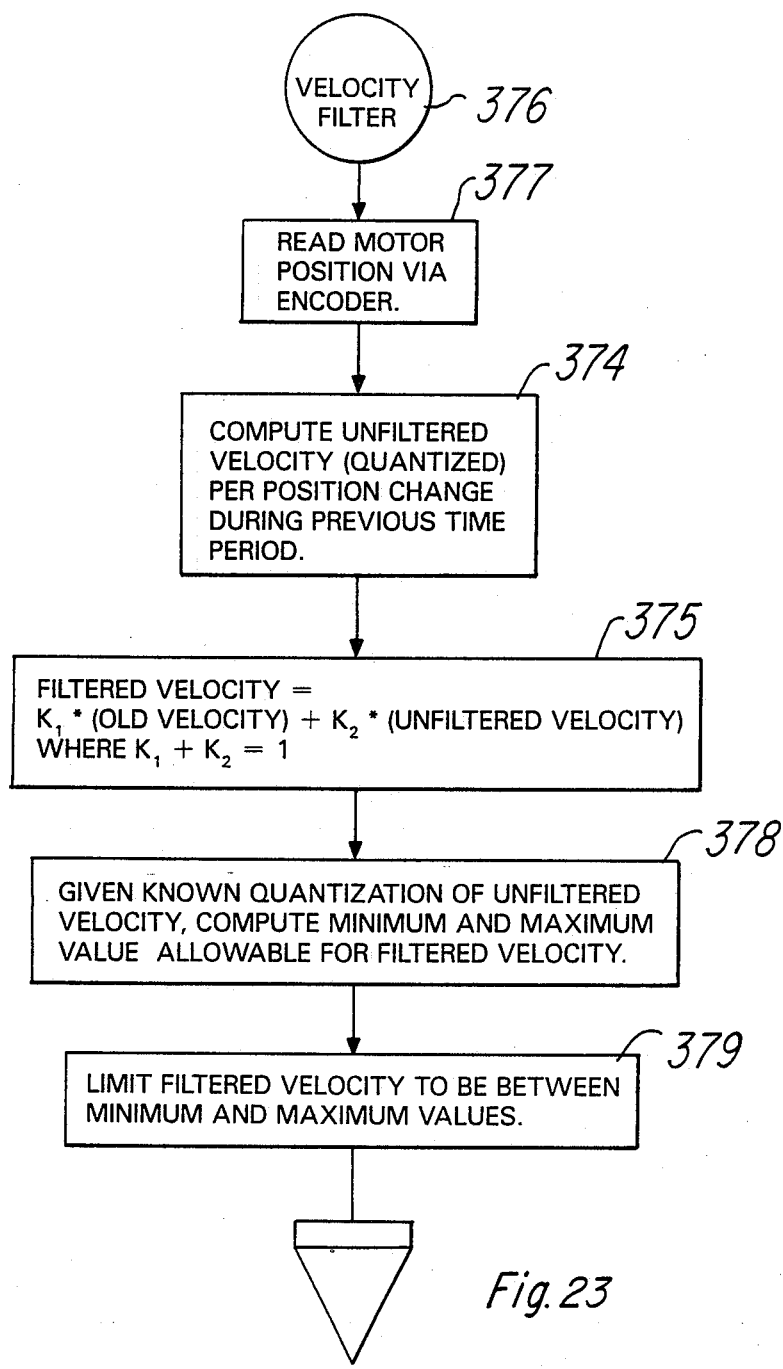
Figure 24:
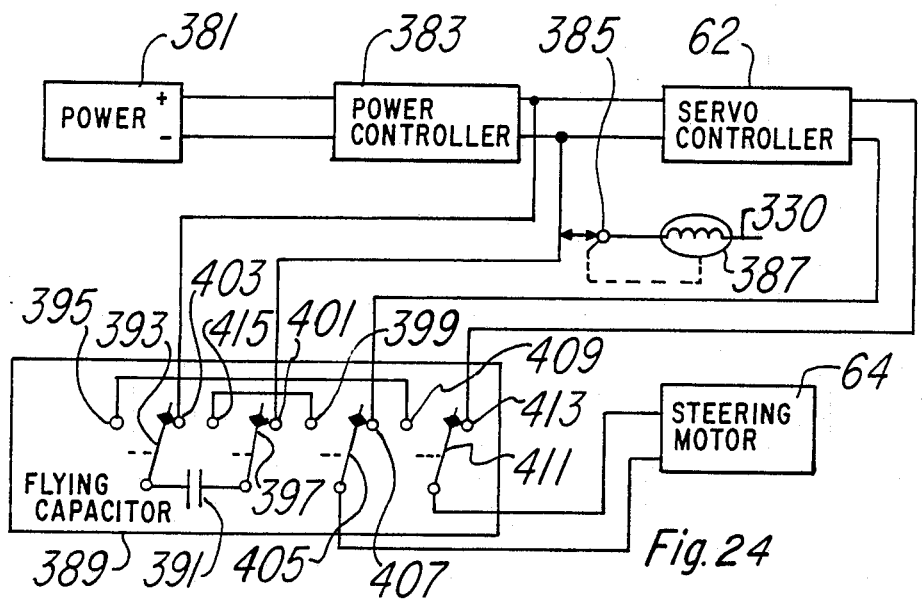

In FIG. 23 to which reference should be made there is shown a simplified diagram of a steering servo control system incorporating the embodiments of the invention. Power is provided from a power source 381 to a power controller which controls the power that is applied to the servo amplifier 62 and the steering motor 64. A flying capacitor circuit 389 applies the power from the servo amplifier 62 to the steering motor 64 via relay contacts 407 to 405 and 411 to 413. Additionally, power is applied to a capacitor 391, which is the heart of the circuit, from the power source via relay contacts 393 and 403 and relay contact 401 to 397. In the event of loss of power, then coil 385 will become de-energized causing contact 411 to engage contact 409 and contact 405 to engage contact 399 and similarly causing contact 397 to engage contact 415 and contact 393 to engage contact 395, applying thereby, the charge that is stored in capacitor 391 to the steering motor 64 uncoordinating the steering of the mobile apparatus 21. Additionally, a braking command may be applied to coil 387 which will cause coil 385 to be de-energized, once again applying the voltage stored in capacitor 391 to steering motor 64. The application of the charge on capacitor 391 to the steering motor 64 as discussed aboved is illustrated in FIG. 24.

Figure 25:
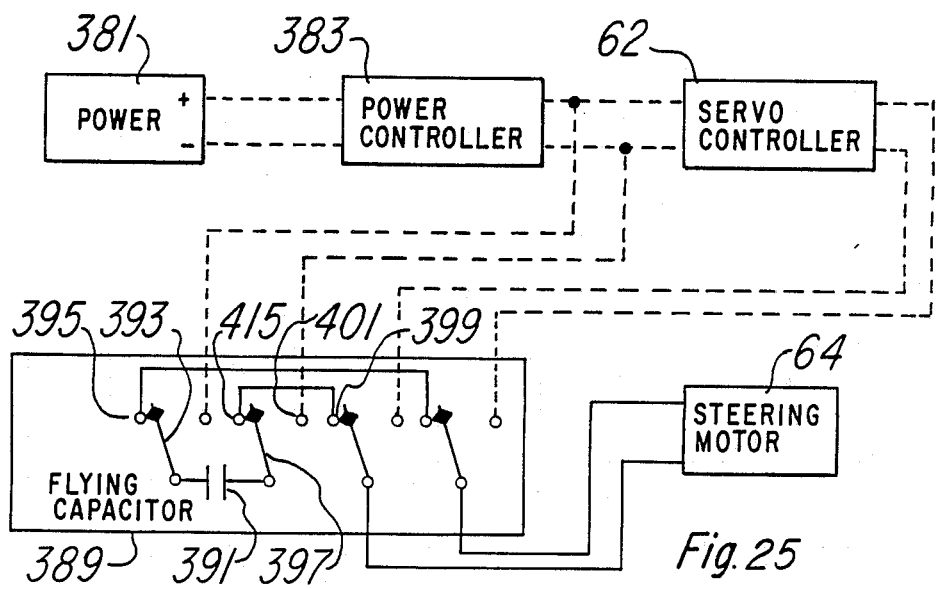

FIG. 25 shows a four wheel embodiment of the mobile apparatus 21 in which wheels 23A and B are used to steer the mobile apparatus 21 by varying the angle 417 and 418 that the wheels make with the mobile apparatus 21. Notice that in the steering mode that the angle that is represented by dimension line 417 is approximately equal to the angle that is represented by dimension lines 418. In the uncoordinated mode of operation, or braking operations then the wheels 23A and 23B are driven in the direction to oppose the motion of the mobile apparatus 21 and consequently the angle that is represented by dimension lines 419 is uncoordinated and unrelated to the angle that is represented by dimension lines 420. Ideally, the angles should be equal, but in opposite direction of the center lines 425 and 426 of the axis of the wheels 23A and 23C, and 23B and 23D.

FIG. 26 is another embodiment of the invention in which there are only three wheels with the steering being implemented by wheels 23C and 23D. Dimension lines 421 and 422 represent the coordinated steering of the controllable mobile apparatus 21 and in FIG. 26B there is represented the braking operation in which the angles that are represented by dimension line 423 and 424 are such to oppose the forward motion of the controllable mobile apparatus 21.

A Wireless Communication System

In FIG. 27 to which reference should now be made, there is shown a block diagram of the communication and navigation systems according to the invention. As in the case of FIG. 1, a terminal 17 is provided so that an operator may communicate with the control and navigation circuit 15 that include as discussed earlier, the command circuits necessary to generate command signals for communicating of commands to the mobile apparatus 21. The command signals communicate via a fixed command pod 19A which transmits through blinking lights to the mobile apparatus 21 and in particular to the mobile combined communication and navigation pod 19B which is contained within each beacon 3, 5 and 7 of FIG. 1.

The mobile combined communication and navigation pod 19B converts the blinking lights into digital data that is applied to a modem controller 19C which demodulates the data for application to the CPU and memory 52. The navigation circuits then work as was previously discussed in conjunction with FIGS. 18 through 22. In the embodiment of FIG. 27, data is additionally modulated by the modem controller 19C for communicating to the operator via the mobile combined communication and navigation pod 19D and a fixed communication pod 19A where the control and navigation circuit 15 includes a modem controller not shown, however it is identical to that illustrated at 19C for demodulating of the data.

Figure 28:
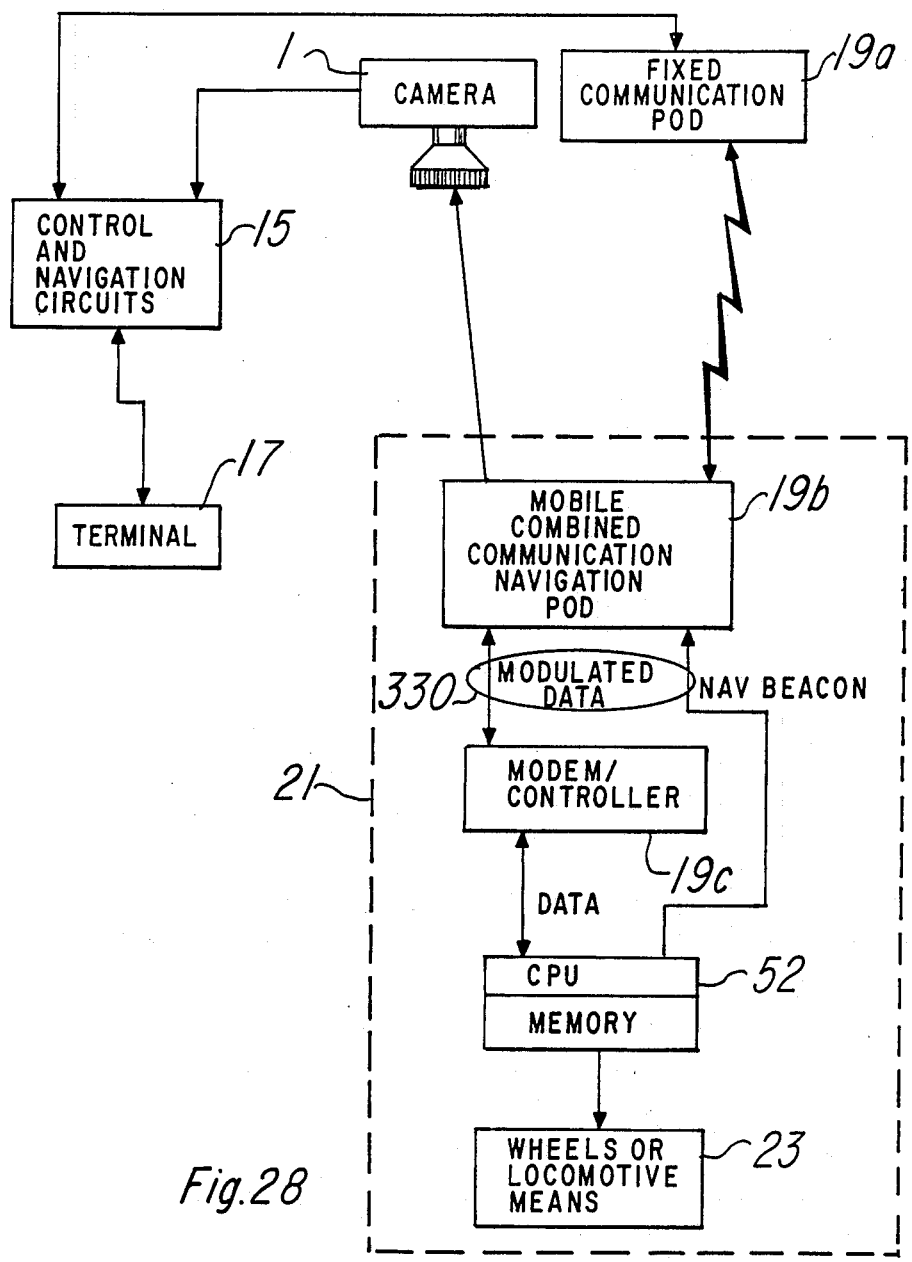
FIG. 28 is a waveform of the wireless communication system of FIG. 28.

FIG. 28 to which reference should now be made, is a waveform diagram of the transmission between the mobile apparatus 21 and the control and navigation circuit 15 via the fixed communication pod 19A which in the embodiment shown is mounted next to the TV camera 1. The navigation beacon controls are designed to blink as is illustrated in waveform 433 at blink points 434 and 435. The data from the modem controller 19C is illustrated by waveform 440 where FSK modulated data is provided in burst at points 436, 437 and 438. The actual transmission of data is illustrated by waveform 439 and can be visually preceived as waveform 440 being combined with waveform 433 to obtain waveform 439 that includes the FSK modulated data at areas 442, 443 and 445 which is transmitted via the mobile combined communication pod 19B. Additionally, waveform 441 provides in the form of an illustration the reception of data as it is transmitted to the mobile apparatus 21 from the fixed communication pod 19A in which the navigation beacon controls as illustrated by waveform 433 are not required and thus not a part of the data that is transmitted from the base station.

Navigation Pods

Figure 29:
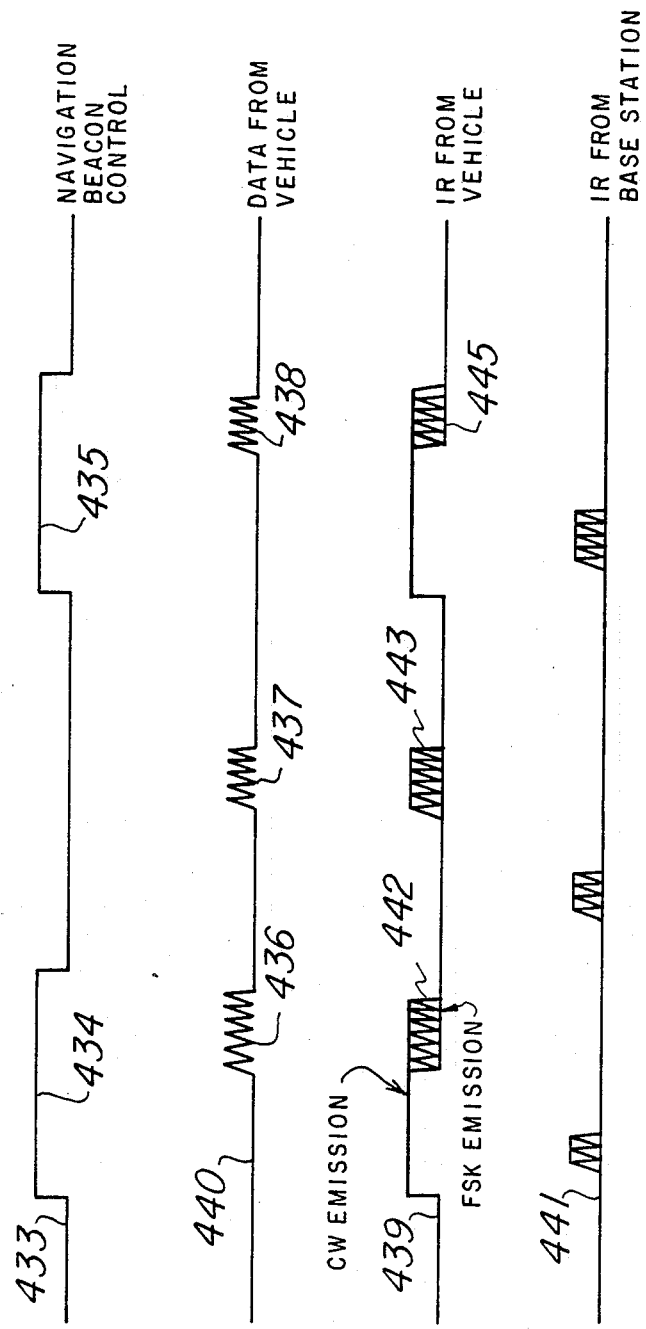
FIG. 29 is a top view of a beacon according to the invention.

FIG. 29 is a top view of the mobile combined communication and navigation pod 19B which are mounted on top of each of the beacons 3, 5 and 7 of FIG. 1. A plurality of light emitting diodes 447 are arranged in a parabolic shape for providing a concentration of light which in the embodiment shown is in the infrared region for transmitting communications and position information to a receiving station. Additionally mounted on the rim of the communication and navigation pod 19B is a light receiving diode 449.

Figure 30:
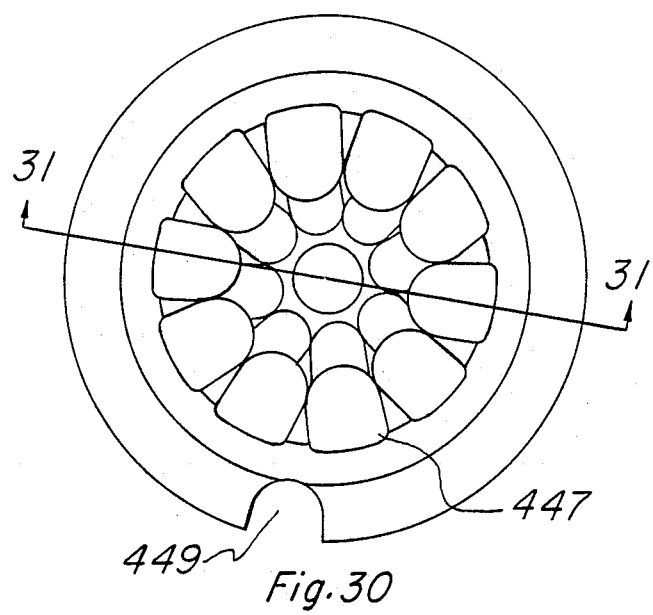
FIG. 30 is a sectional view of a navigation beacon according to the invention.

FIG. 30 is a sectional view of the communication and navigation pod 19B as seen from section lines 31 and illustrates the parabolic shape 450 of the arrangement of the light emitting diodes 447 that are used to transmit both the data and beacon positioning from the mobile apparatus and just the data from the base station as is illustrated in waveforms 439 and 441 respectively.

Predicting Tracking Cameras for Free Roaming Robots

Figure 31:
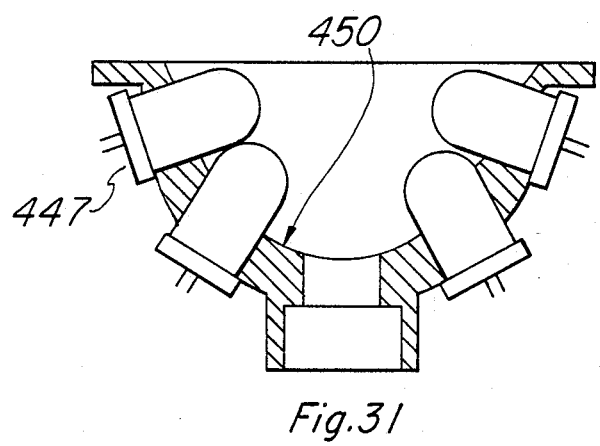
FIG. 31 is a top view of a manufacturing facility according to the invention.

FIG. 31 illustrates a plan view of a factory floor or manufacturing environment in which four camera zones, a first camera zone 451, a second camera zone 453, a third camera zone 452 and a fourth camera zone 454, are illustrated which represents the viewing cameras of selected members of the plurality of cameras 1 of FIG. 1. Dashed line 461 represents a possible path for the mobile apparatus 21 which begins in the first camera zone 451 and ends in the third camera zone 452. As long as the mobile apparatus 21 remains in zone 1, navigation contact is maintained by the overhead camera whose viewing angle coincides with the first camera zone 451. For some period of time after the mobile apparatus leaves the viewing angle or the first camera zone 451, the mobile apparatus 21 will not be visible to any camera. This blind zone is illustrated as area 463. Sometime later, the mobile apparatus 21 in the embodiment of FIG. 31 will enter the third camera zone 452 and a normal navigation control will be established as was discussed in conjunction with in FIGS. 18 through 22.

However, for the period of time when navigation contact is lost in blind area 463, there is uncertainty about the precise location of the mobile apparatus 21 and about the direction in which it is heading. In FIG. 31 the mobile apparatus 21 makes a sharp turn as indicated by dotted line 461 but it may actually make a number of turns during this time as illustrated by dashed line 456 in FIG. 32.

As the mobile apparatus 21 navigates its position and heading in the visible zones 451, 452, 453, or 454, that information is acquired and stored within the memory portion of the navigation CPU and memory 37a of FIG. 2. When the controllable mobile apparatus moves out of the zone of visibility, a radius of uncertainty is established around the stored position. This radius is proportional to and at least equal to the distance that the mobile apparatus 21 can achieve travelling at its maximum velocity. The area enclosed by the circles drawn around this radius of uncertainty such as illustrated at 455 is compared with the zone of visibility of each of the effected cameras whose zone of visibility corresponds to the third camera zone 452 and the second camera zone 453. If there is an overlap between the two areas, then it is judged possible that the mobile 21 apparatus has entered the camera zone such as at area 465. If this is the case, then the vision interface module 31 selects the input from that camera and analyzes the visual information in search for the image of the mobile apparatus 21.

In the situation where there is no overlap between the camera zones of visibility such as at area 463 then the region of uncertainty surrounds the last known mobile apparatus's 21 position. The uncertainty radius is periodically incremented over time to keep it accurately representative of the mobile apparatus 21 escape distance until the radius has grown to equal the maximum diameter of the factory. The efficiency of the scanning is reduced to a minimum since no cameras will then be excluded from consideration. However, for short lapses of visibility which makes up the vast majority of the case in a typical factory the procedure illustrated in FIG. 33 results in a significant savings in time.

Figure 32:
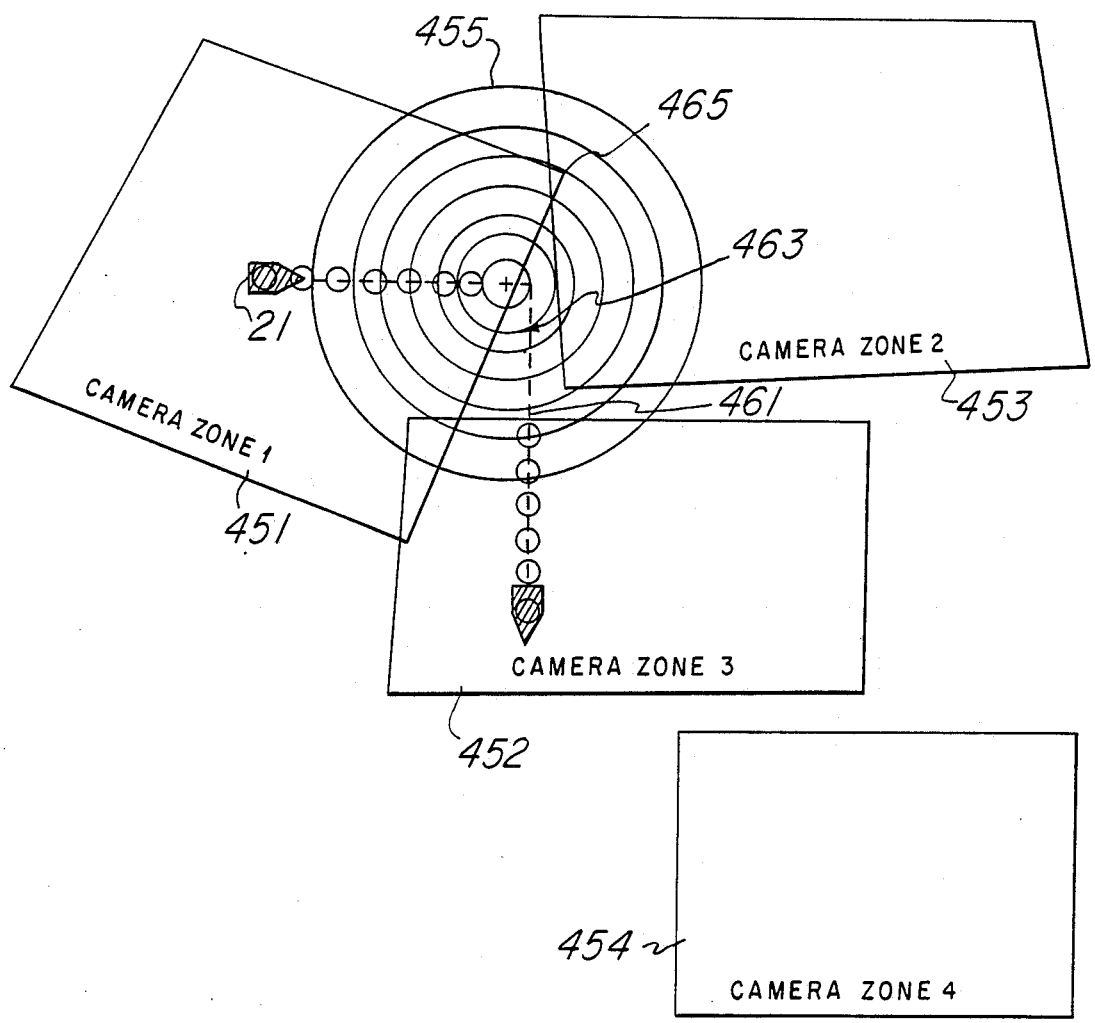
FIG. 32 is an isometric view of the manufacturing facility of FIG. 31.
Figure 33:
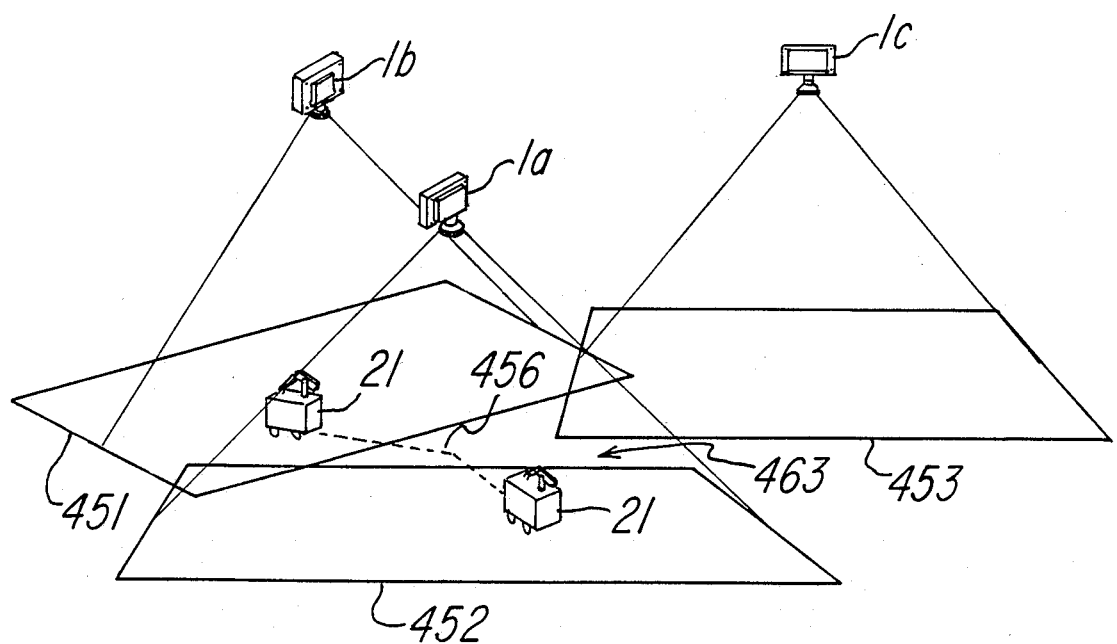
FIG. 33A-33B are a flow diagram of a program used to determine the position of a mobile apparatus when it is out of the view of the camera according to the invention.

The navigation CPU and memory 37a in implementing the illustrations of FIGS. 31 and 32 utilizes the procedures shown by the flow diagram illustrated in FIG. 33 in which at the start position 457 the position algorithm is implemented and at decision block 458, the mobile apparatus's 21 position is determined to be previously defined or not. If it is not, then tie point P3 is taken. If it has been, then the first camera is selected by setting "n" the camera number, equal to 1 at block 467. A decision is then made at block 469 to ascertain if the selected camera's zone of view overlaps the blind area or "region of uncertainty". If it does not then a jump is made to block 475. However, if the selected camera's zone of view does overlap then the position subroutine proceeds to block 471. The selected camera zone is searched for the mobile apparatus 21 and then at block 473 a decision is made whether or not the mobile apparatus 21 is located. If the mobile apparatus 21 was located in the selected camera zone of view, then the position subroutine proceeds to tie point P2. If not, then at decision block 475, a decision is made as to whether or not all of the cameras have been searched. In the adverse case, then the navigation CPU and memory 37a proceeds to increment "n" to the next camera zone at 477 and tie point P1 ties back into the input to block 469.

If all the members of the plurality of cameras 1 have been searched, then the rings of uncertainty 455 are incremented at block 479 and the mobile apparatus 21 is labeled invisible at block 480 and then the routine proceeds to the end of the subroutine via tie point P4.

Tie point P3 which is the "No" route taken after a decision is made at block 458 provides for linearly scanning each camera zone of the plurality of cameras 1 once in search of the mobile apparatus 21 at block 481. Then at block 483, a query is made, "was the mobile apparatus 21 or robot located?". If the answer is no, then tie point P5 ties back into labeling the mobile apparatus 21 invisible at block 480. Block 485, which is taken if the mobile apparatus 21 is located either at block 483 or at block 473, labels the mobile apparatus 21 as being visible and the zone of uncertainty 455 is reduced to zero at block 487. The proper camera zone and the mobile apparatus's 21 position is identified at decision block 489 and the subroutine ends at block 491.

Network for the Control of a Mobile Robot System

In FIG. 1, there is shown a mobile apparatus system for controlling a single mobile apparatus 21. However, in many practical applications, there are more than one mobile apparatus 21 in a single factory environment.

Figure 34A:
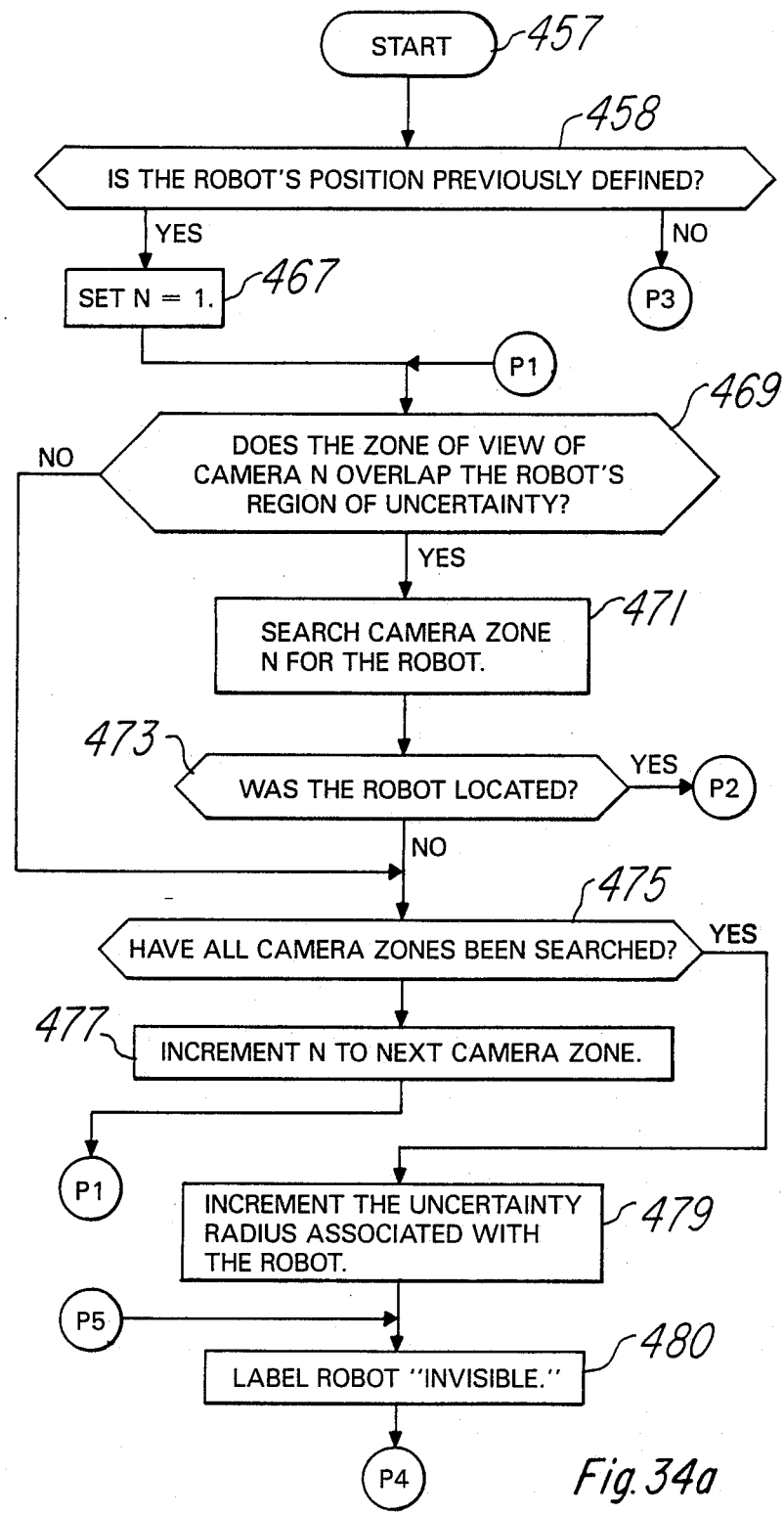
FIG. 34 is a block diagram of a manufacturing facility having a multi apparatus system according to the invention.
Figure 34B:
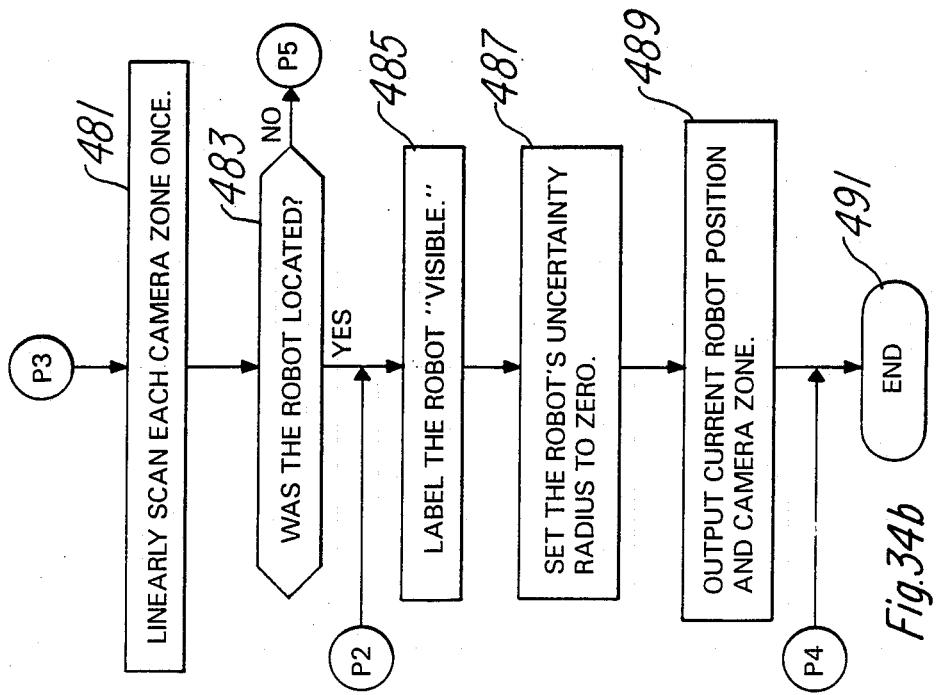

FIG. 34 illustrates the operation of a computer network for control of a mobile apparatus system in which there are more than one mobile apparatus 21 operating. In FIG. 34, the terminal 17 interfaces with the control and navigation circuit 15.

In particular, the terminal 17 interfaces to an operator interface controller 501 which communicates to a communication processor 517. Also in communication with the communication processor 517 is a factory controller 503, a planner scheduler 505 and a navigation controller 507. Because the mobile apparatuses 21 are battery powered periodically they need to report in to a battery station for recharging. Therefore, there can be a battery station controller 515 within the host CPU and memory 37. Communications from the communication processor 517 communicate with the controllers that are stored within each mobile apparatus 21 and in particular in the CPU and memory 52. Therefore, there is a first mobile apparatus controller 509, a second mobile apparatus controller 511 and an nth. mobile apparatus controller 513.

Figure 35:
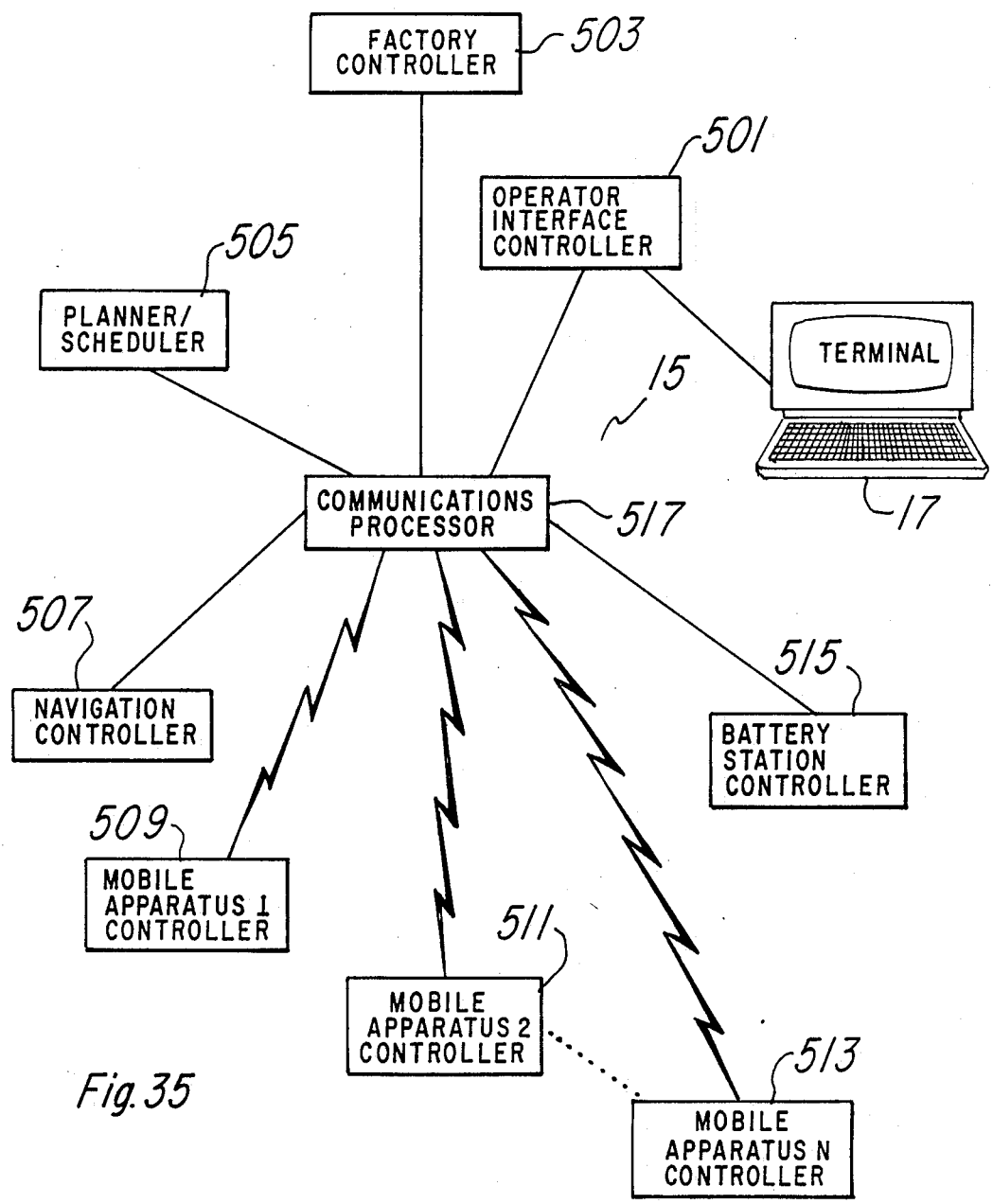
FIG. 35 is a flow diagram of the operator interface of FIG. 34.

FIG. 35 is a flow diagram of the operator interface 501 in which at start position 1515 the operator interface waits and continuously monitors for any messages being received at 1517. If a message has been received, then the message is processed and an update of the system status is implemented at block 519. If no messages have been received from the communication processor at block 517, then a check is made to see if any keyboard commands have been received at block 521. If no keyboard messages have been received, then the update of the display that is on the terminal 17 is implemented at block 523. If a keyboard input has been received, then that information is processed at block 525 and the operator interface controllers proceeds then to block 523 for updating of the display on terminal 17. At block 527 the operator interface controller returns to the start position 1515 where it monitors to see if any new status messages have arrived at block 1517.

Figure 36:
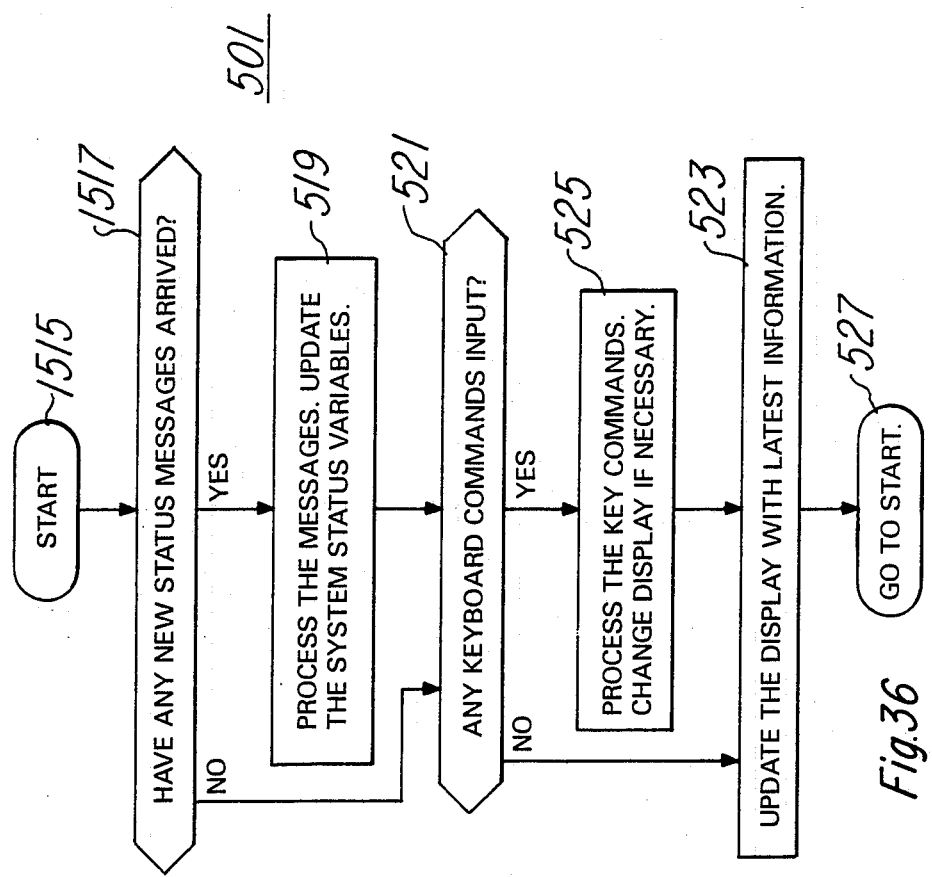
FIG. 36 is a flow diagram of the communication logic of FIG. 35.

FIG. 36 is the logic necessary to implement the communication processor program that is stored within the navigation CPU and memory 37a. At the start block 529 the communication processor 517 is at rest and inputs a message at block 531. If the message has multiple destinations, then at block 533 this will be determined and the communication processor 517 will proceed to block 535 to transmit the messages to all the requested output queues or in the case where the message has only a single destination then the message is placed in the appropriate queue at block 537 and then the outgoing messages are transmitted at block 539. The communication logic then returns to the start position at block 529 to input a message.

Figure 37:
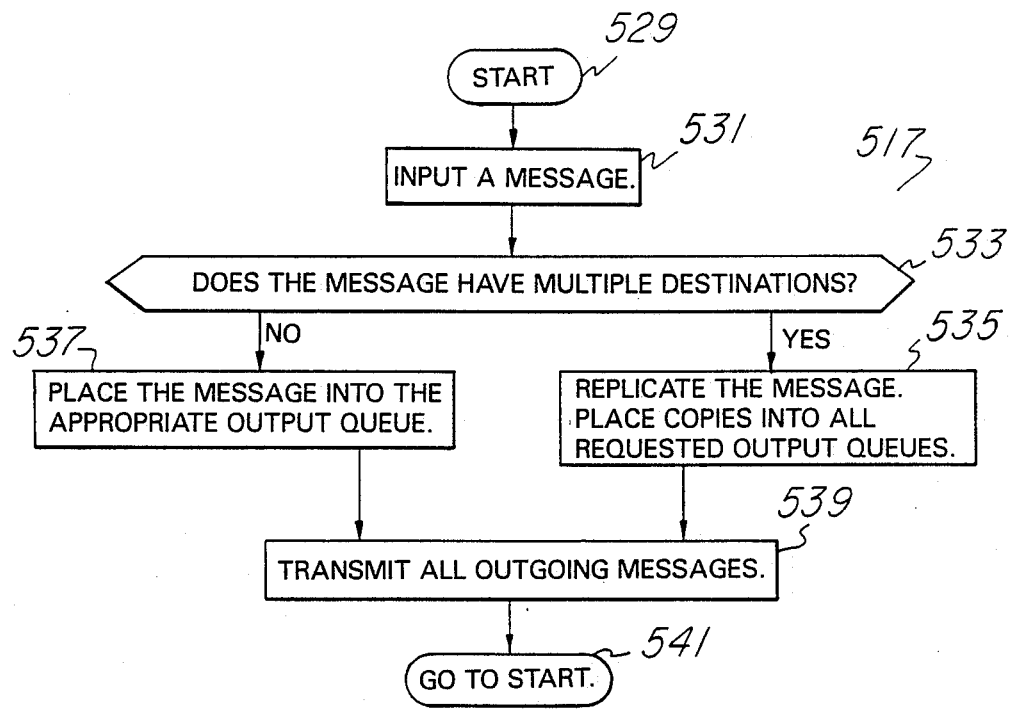
FIG. 37 is a flow diagram illustrating the operation of the navigation logic of FIG. 34.

The navigation logic 507 is implemented in FIG. 37. The mobile apparatus 21 uses an onboard dead reckoning circuit to provide its navigation. However, periodically its absolute position is provided so that any discrepancies between the dead reckoning position and the actual position may be compensated for. This process is implemented in FIG. 37 where at block 543 the navigation controller 507 is at the start position and it implements the search routine to recognize and locate a mobile apparatus at block 545. Once the mobile apparatus 21 has been located, then at block 547 its position is transmitted to the mobile apparatus 21 and the navigation controller 507 returns to the start position at block 543.

Figure 38:
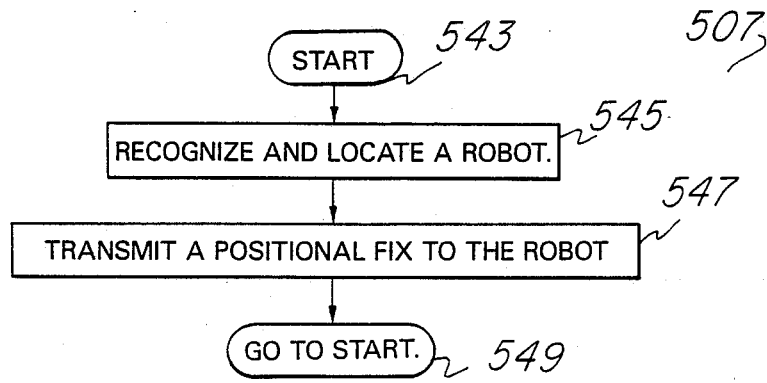
FIG. 38 is a flow diagram illustrating the operation of the factory controller of FIG. 34.

FIG. 38 is the block diagram of the factory controller logic in which the factory control computer 503 is at rest at block 551. Decision block 553 ascertains if any incoming material has arrived. If so, then a command is generated and transmitted to the planner scheduler 505 to transport the material to first processing station and a work order is generated at block 555. The factory controller monitors whether or not a mobile apparatus 21 has arrived at block 557 at a designated station regardless if any material is expected to arrive at block 553 or if the work order has been processed at block 555. If a mobile apparatus 21 has arrived at a station, then at decision block 557, the station in which the mobile apparatus 21 has arrived is signaled to begin processing at block 559. If not, or the processing has begun at block 559, the factory controller ascertains if any stations have indicated that their process is complete at block 561. If the process is complete, then the planner scheduler 505 is commanded to transport the partially finished material to the next sequential processing station or transport the fully finished material to the output dock where the work order is then completed at block 563 and the factory controller at block 565 returns to the start position 551. If the process is not complete the factory controller takes the "no" route to block 565 from block 561.

Figure 39:
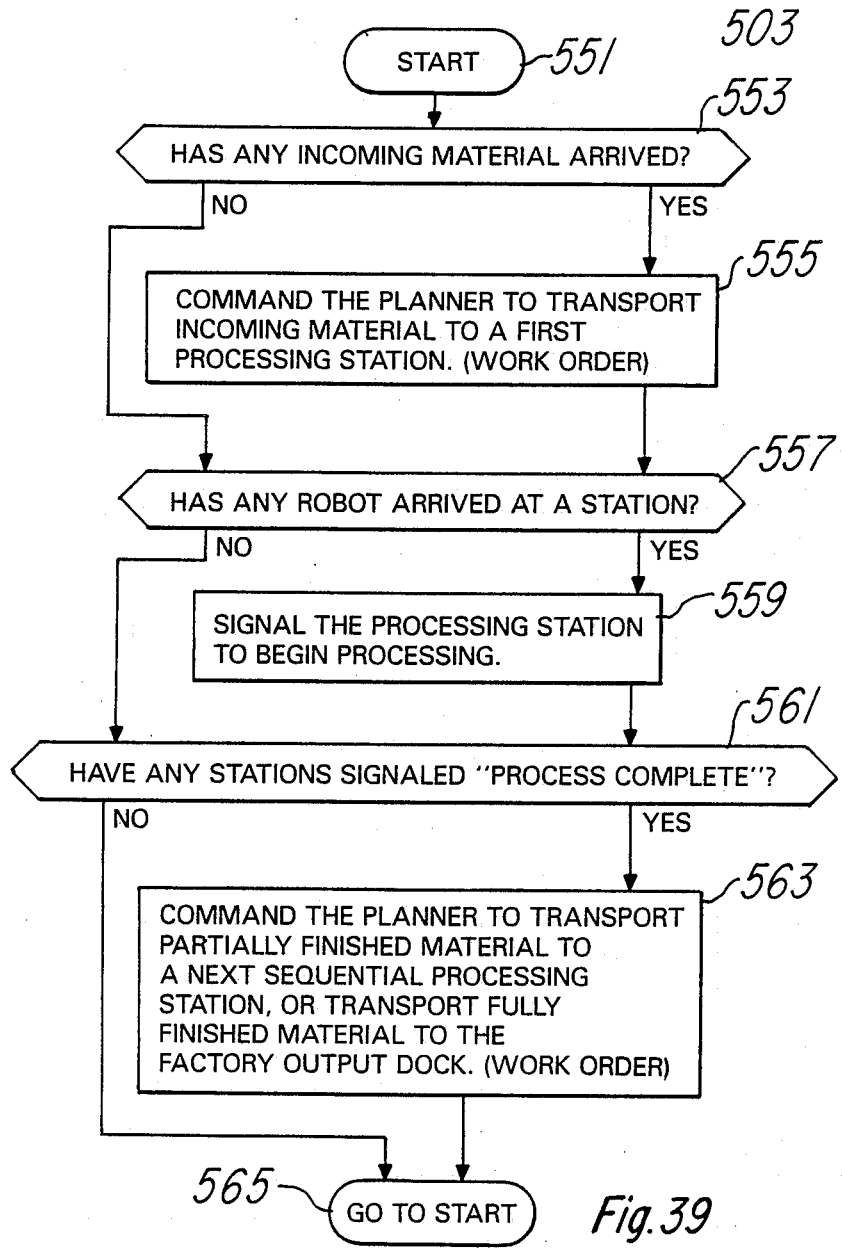
FIG. 39 is a flow diagram illustrating the operation of the planner scheduler of FIG. 34.

A flow diagram for the planner scheduler 505 is provided in FIG. 39 in which at the start position 567 the planner scheduler 505 proceeds to check for any new work orders being received at decision block 569. If no new work order has been received, then the planner scheduler 505 ascertains if any robots or mobile apparatuses 21 are available at block 571. If a new work order is in the queue, then that work order is entered at block 573. The planner scheduler 505 then assigns additional work orders to the mobile apparatus 21 which can best do the work at block 575 and the work plans are transmitted to the mobile apparatus 21 at block 576 after which the planner scheduler 505 then returns to the start position at block 577. The planner scheduler 505 continues to monitor for work orders or the availability of mobile apparatuses 21 as indicated by path 579.

Figure 40:
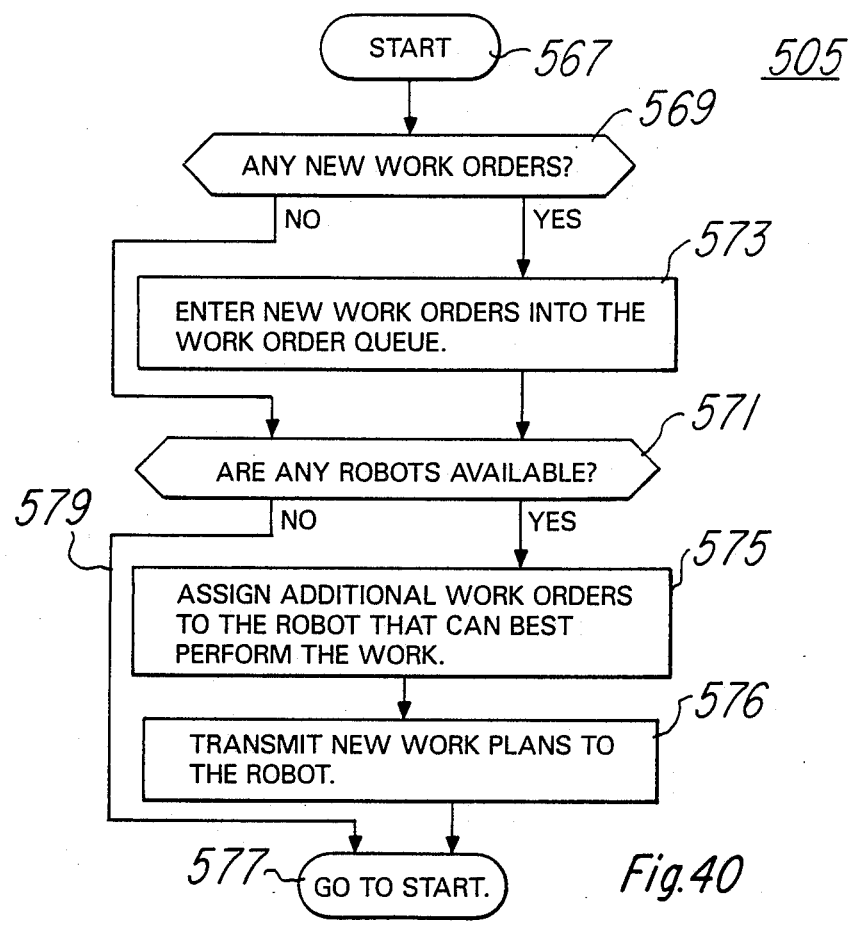
FIG. 40 is a flow diagram illustrating the operation of the battery station logic of FIG. 34.

FIG. 40 is the logic for the battery station controller 515 in which at block 579 the battery station controller 515 is at initial position and it monitors the batteries currently being recharged at block 581. At decision block 583, it ascertains if any new commands have been received and if so, then at block 585, it processes a new command to have the batteries removed, inserted, recharged, etc. and returns to the start position at block 587.

Controller for a Mobile Robot System

As was discussed in conjunction with FIG. 34, the planner scheduler 505 schedules the movement of the plurality of mobile apparatuses 509, 511-513. The system that is illustrated in FIG. 34 must coordinate together so as to minimize activities and distance traveled.

Figure 41:
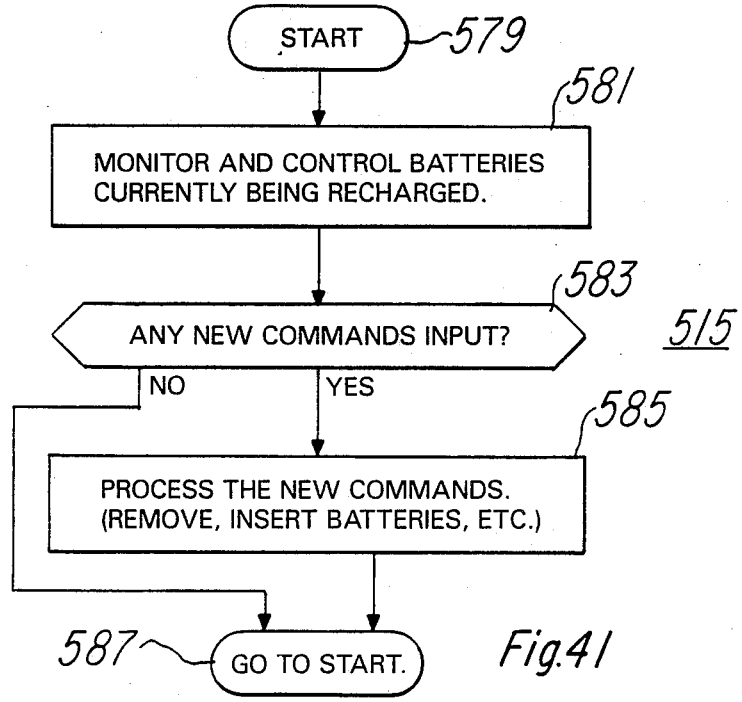
FIG. 41A-41G provides a flow diagram of the control of a mobile apparatus system such as that illustrated in FIG. 34.

The planner scheduler 505 is implemented by the apparatus illustrated in FIG. 1 and includes a software program that is contained within the host CPU and memory 37. In FIG. 41A there are six possible requests that the planner scheduler 505 may implement when instructed to do so. These requests include, start up (block 601), material transfer (block 603), battery change (block 605), parking (block 607), location transfer (block 609), and transfer from system (block 611). The planner scheduler 505 continuously cycles from the start block 600 through the six blocks looking for requests to implement.

Beginning with the rest or start position 600 the planner scheduler 505 initiates a process in which at the first decision block 601 the planner scheduler 505 ascertains if there is a request for a start up of a mobile apparatus 21 such as a robot. If there is a request or a "yes" answer then subroutine A is taken on FIG. 4B and if there is not a request for a mobile apparatus 21 start up or a "no" answer then the planner scheduler 505 proceeds to the next decision block at 603.

Decision block 603 ascertains if a request for material transfer has been received. If a request has been received, then the "yes" line is taken and the planner scheduler 505 proceeds to tie point B located on FIG. 41C. In the event no request has been received, then the no line is taken and the planner scheduler 505 proceeds to block 605 which ascertains if a request for battery change has been received. If a request for a battery change has been received, then the yes line is taken and the subroutine C indicated in FIG. 41D is implemented or if the no line is taken (no request), the planner scheduler 505 proceeds to decision block 607.

Decision block 607 ascertains if a request to transfer the mobile apparatus 21 to a parking location has been received. Of course if it has, the "yes" path taken and the subroutine D illustrated in FIG. 41E is implemented and if not the "no" path is taken and the planner scheduler 505 proceeds to decision block 609. At decision block 609 the planner scheduler 505 ascertains if a request has been received to transfer the mobile apparatus 21 to another factory location. If "yes", then the subroutine at tie point E is implemented on FIG. 41F. If "no", the planner scheduler 505 proceeds to decision block 611.

The mobile apparatus 21 may be removed from the manufacturing environment at decision block 611 where a decision is made if there has been a request to remove the mobile apparatus 21 from the floor of the manufacturing facility. If "no", then the planner scheduler 505 cycles back to the start position 600. If "yes" the planner scheduler 505 proceeds to tie point F implemented on FIG. 41G.

It can be seen that this program can include a plurality of multiple requests that the planner scheduler 505 can implement by stringing together the decision blocks and then implementing the routines to execute those decisions.

At tie point A in FIG. 41B, the planner scheduler 505 initiates communications with the mobile apparatus 21 at block 613. This communication, of course, is conducted by the communication processor 517 of FIG. 34. If the addressed mobile apparatus 21 fails to respond, then at decision block 615 a decision is made to go back to the start position 613 meaning there is no response and to reinitiate the communications with the mobile apparatus 21. After a certain number of tries at block 64 then the planner scheduler 505 will return to the start position at block 600 to verify if another request has been received. If the mobile apparatus 21 responds, then at block 617 the navigation CPU and memory 37A is commanded to begin to track the controllable mobile apparatus 21. A determination is made of the location upon the floor of the facility in which the controllable mobile apparatus 21 is used at block 619 and then at block 621 the controllable mobile apparatus 21 is moved to the closest available destination point. At the completion of block 621, the planner scheduler 505 returns to block 603 for the next decision.

At block 603 a decision is made to ascertain if a request for a material transfer has been received. If it has, then the planner scheduler 505 implements the material transfer subroutine via tie point B. In FIG. 41C, the subroutine implemented at tie point B includes an attempt to schedule a material transfer at block 623. If the planner scheduler 505 ascertains that it is not possible to attempt a transfer, then the planner scheduler 505 returns to block 605 and proceeds through the loop that is illustrated in FIG. 41A. If a material transfer is possible, then a path is generated through the factory for the controllable mobile apparatus 21 to follow at block 625. The mobile apparatus 21 is instructed to move through the manufacturing facility at block 627, according to the path information that is provided by the planner scheduler 505 and will do so according to its navigation generation program including its dead reckoning program that was discussed in conjunction with FIGS. 18 through 22. Upon reaching its final destination, the factory controller 503 and the operator interface controller 501 are notified by the planner scheduler 505 that the mobile apparatus 21 has reached its final position at block 629.

A decision is made at block 631 to ascertain if the material transfer mechanism is on board the mobile apparatus 21. If it is, then the material is transferred at block 633. If not, at block 635 the unit waits for the material transfer to complete after which the subroutine is finished and the process returns to tie point B until all the material has been transferred after which it returns to the block 605 of FIG. 41A.

Tie point C is implemented in FIG. 41D, and it is only used when there is a battery changing apparatus available and includes a decision block 637 to ascertain that a battery changer is available and if so, it is available for use. If the battery changer is unavailable, then the planner scheduler 505 returns to block 607 and proceeds through the loop that is illustrated in FIG. 41A. If it is, then the planner scheduler 505 at block 639 generates a path through the manufacturing facility for the mobile apparatus 21 to follow.

Figure 42A:
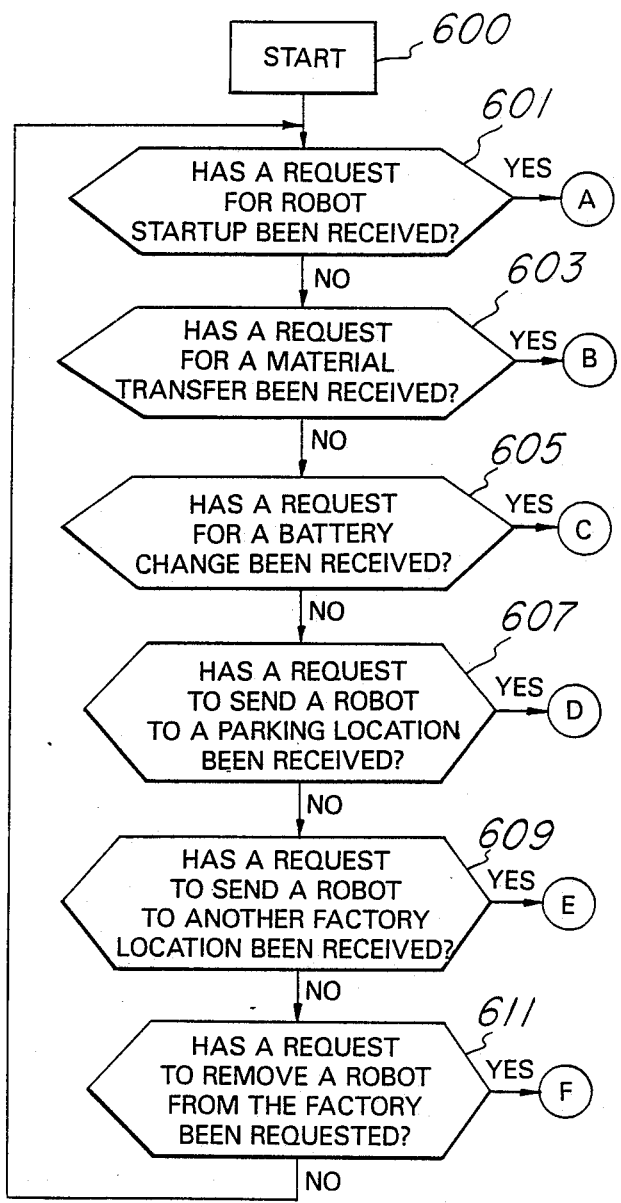
Figure 42B:
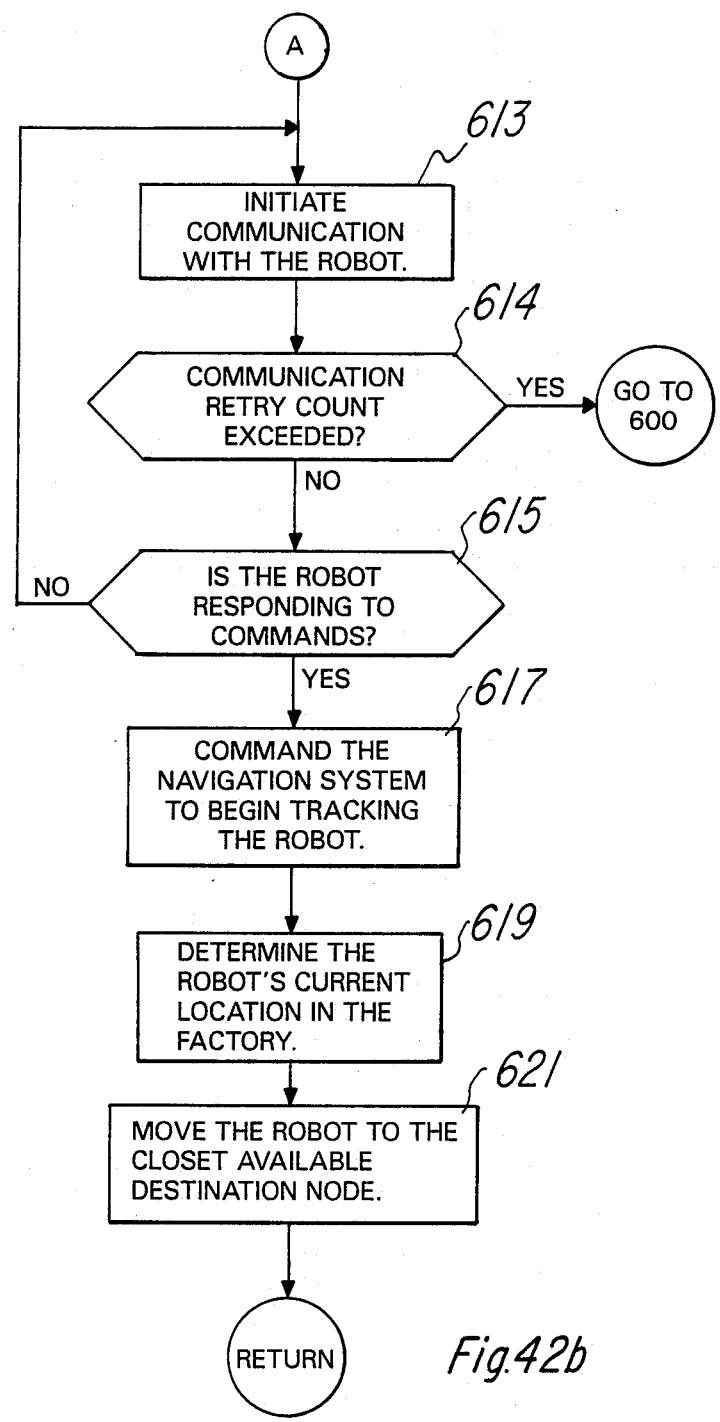
Figure 42C:
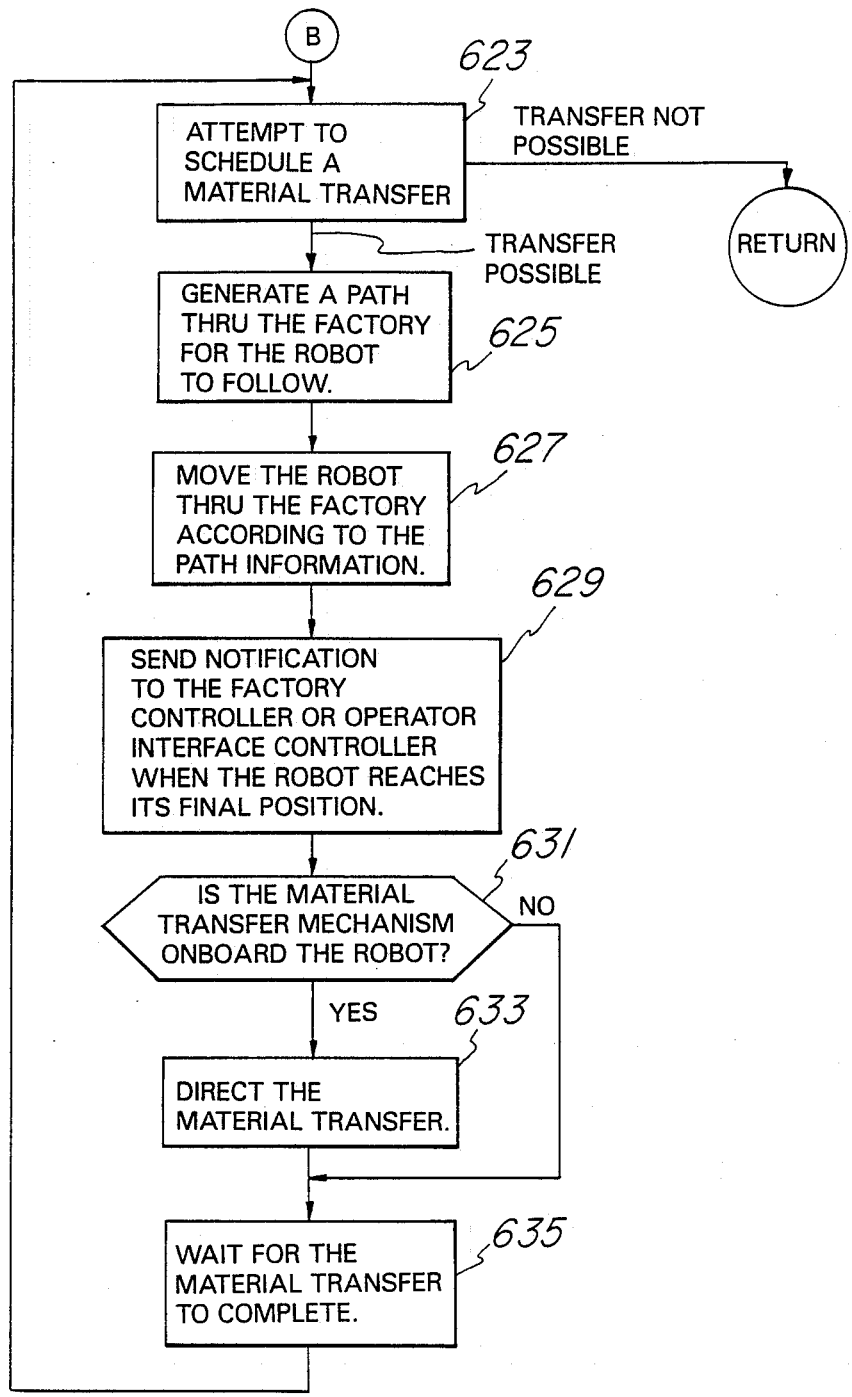
Figure 42D:
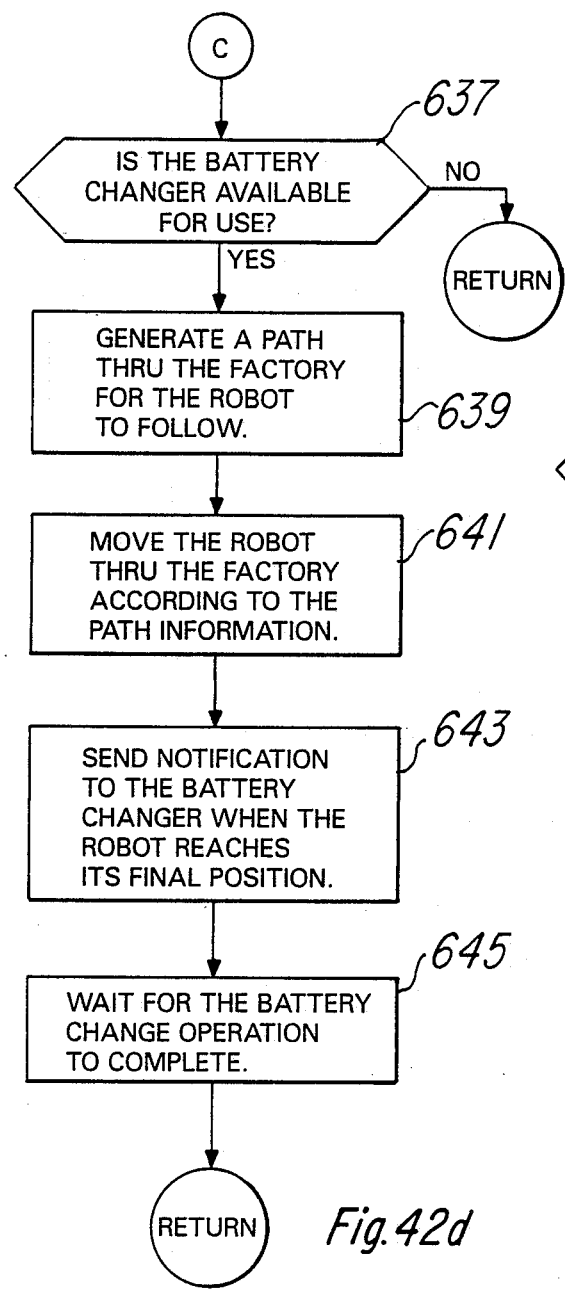
Figure 42E:
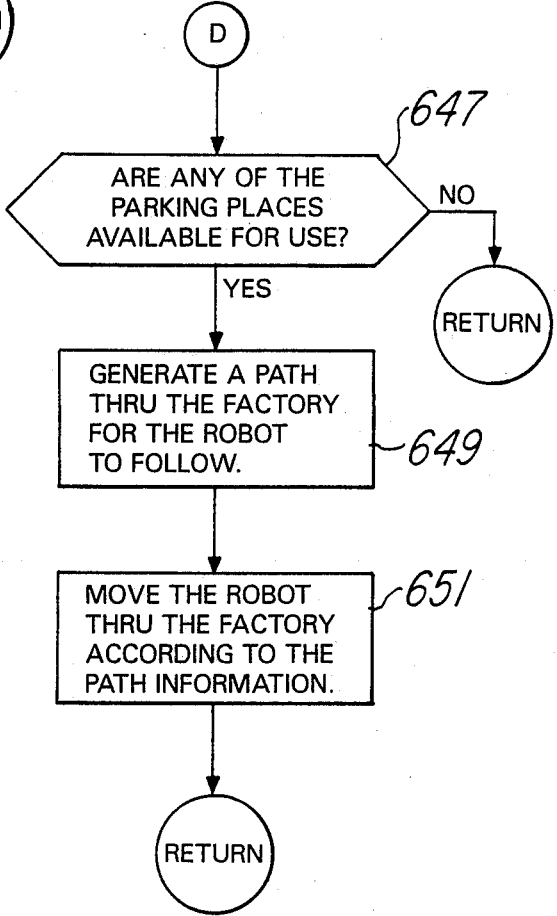
Figure 42F:
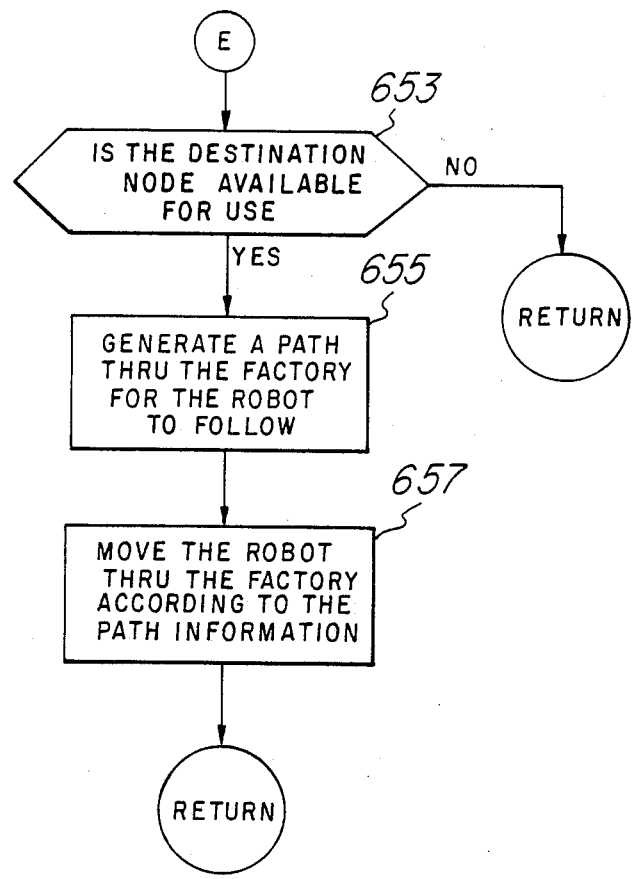
Figure 42G:
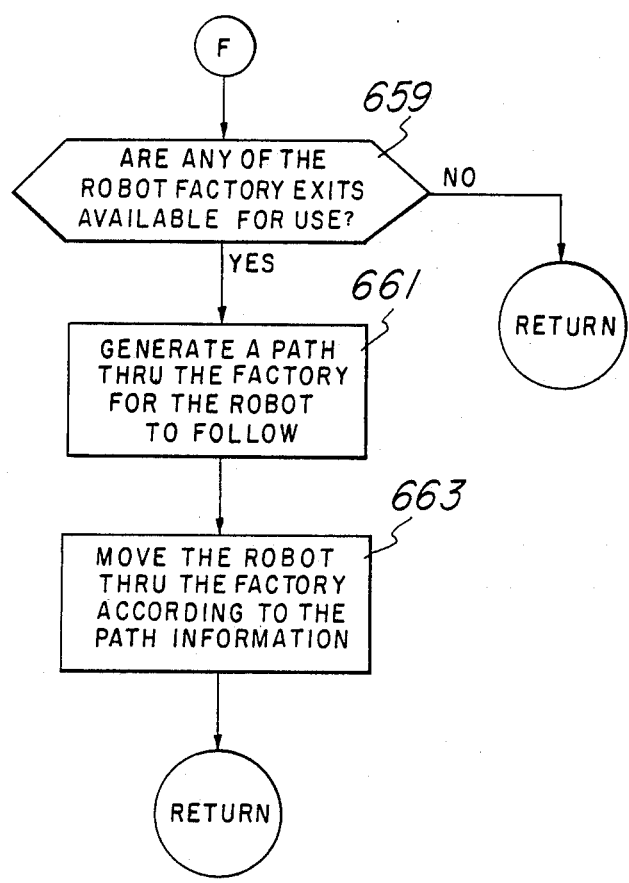

The mobile apparatus 21 navigates through the manufacturing facility according to the path information at block 641. The planner scheduler 505 notifies the battery changing apparatus at block 643 that the mobile apparatus 21 has reached its final destination. The battery is then changed at block 645 and the planner scheduler 505 returns to block 607 and proceeds through the loop that is illustrated in FIG. 42A. The subroutine that is connected to tie point D is illustrated in FIG. 41E to which reference should now be made. It implements the parking of the controllable mobile apparatus 21. Block 647 ascertains if there are any parking places available for use. If not, then the subroutine returns to block 609 in FIG. 41A. If there is, then a path is generated at block 649 and the mobile apparatus 21 is moved through the manufacturing facility to the parking space at block 651 after which the subroutine returns to block 609 in FIG. 41A. FIG. 41F illustrates a subroutine that implements a request to send a mobile apparatus 21 to another location within the manufacturing facility. If this route is taken, then as shown in FIG. 41F, a decision is made to ascertain if a destination is available for use at decision block 653. If it is not, the subroutine returns to block 611 in FIG. 41A. If it is, a path is generated at block 655 and the mobile apparatus 21 is instructed to move there and provide the notification of its completion of the move at block 657.

Subroutine F exits the mobile apparatus 21 from the manufacturing facility. It must be determined as shown at decision block 659 of FIG. 41G if the exit is available. If it is not available, the subroutine returns to block 601 in FIG. 41A. If it is, then a path is generated at block 661 and the mobile apparatus 21 is instructed to move and notify the planner scheduler 505 of the completion of this move at block 663.

Coordinating the Interaction of Multiple Robots

FIG. 42 to which reference should now be made is a schematic floor plan of a manufacturing facility 700. Points 701 through 708 are possible destination points for the mobile apparatus 21 and hereinafter will be referred to as nodes. Lines 709 through 716 are permissible path segments between the nodes 701 through 708 along which the controllable mobile apparatus 21 may travel in the direction indicated by the arrows. All other regions of the manufacturing facility 700 are off limits to the controllable mobile apparatus 21. Boxes 717 through 720 are locations within the manufacturing facility 700 where the mobile apparatus 21 will perform a service. The mobile apparatus 21 may travel from one location to another location provided a set of continuous path segments exist between the two locations.

When multiple mobile apparatuses 21 are allowed to travel along the same path, each mobile apparatus's 21 arrival at a node 701 through 708 must be coordinated in time with the arrival and departure of other mobile apparatus 21 to avoid deadlocks and collisions. To coordinate the mobile apparatuses' 21 travel through the manufacturing facility 700, a set of rules which control the arrival and departure of the mobile apparatus 21 at each node along a defined path are generated. In the event multiple mobile apparatuses 21 must visit the same node, then these rules determine which mobile apparatus 21 is allowed to visit the node first. Once a set of rules is generated, then these rules are followed until a mobile apparatus 21 visits a node which will not be occupied by another mobile apparatus 21.

Figure 43:
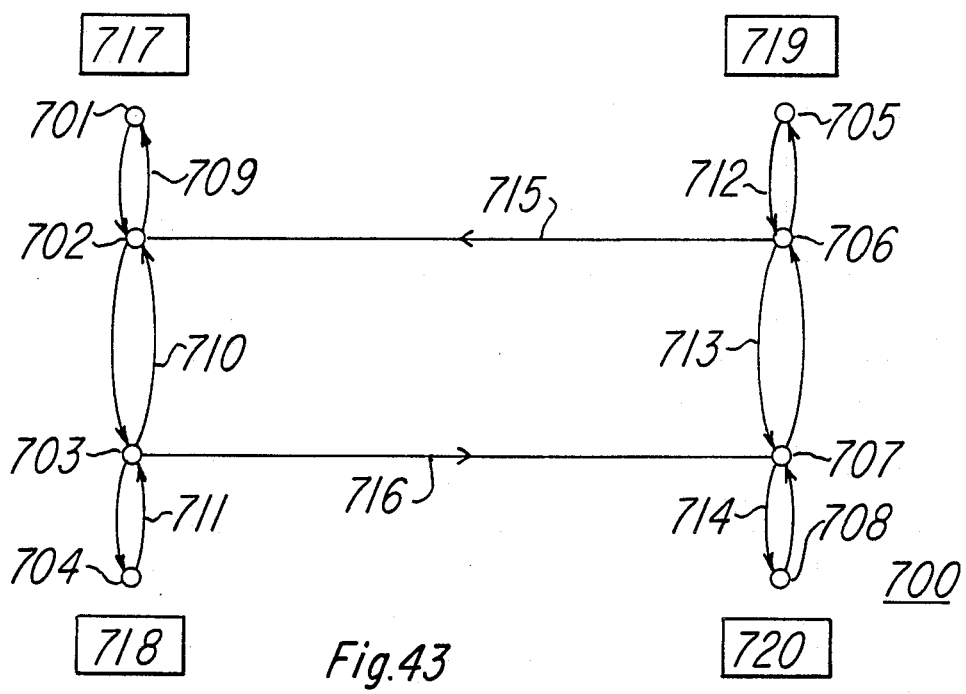
Figure 44:
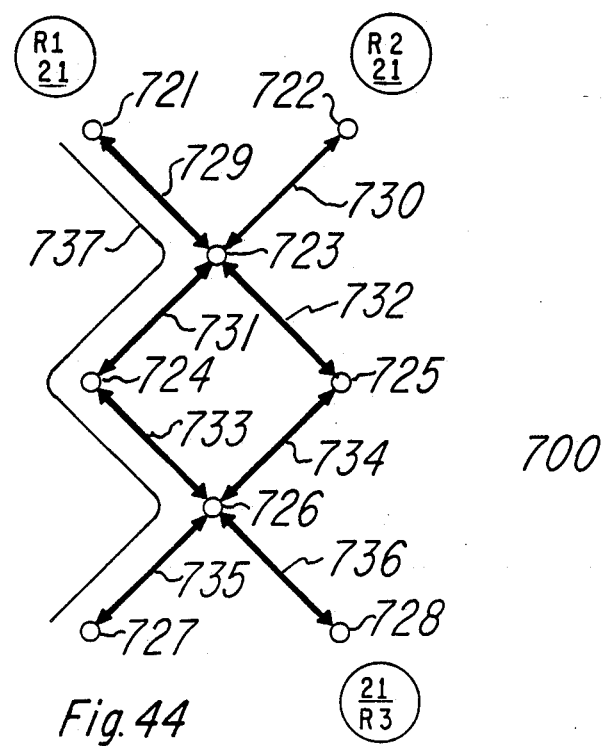
Figure 45:
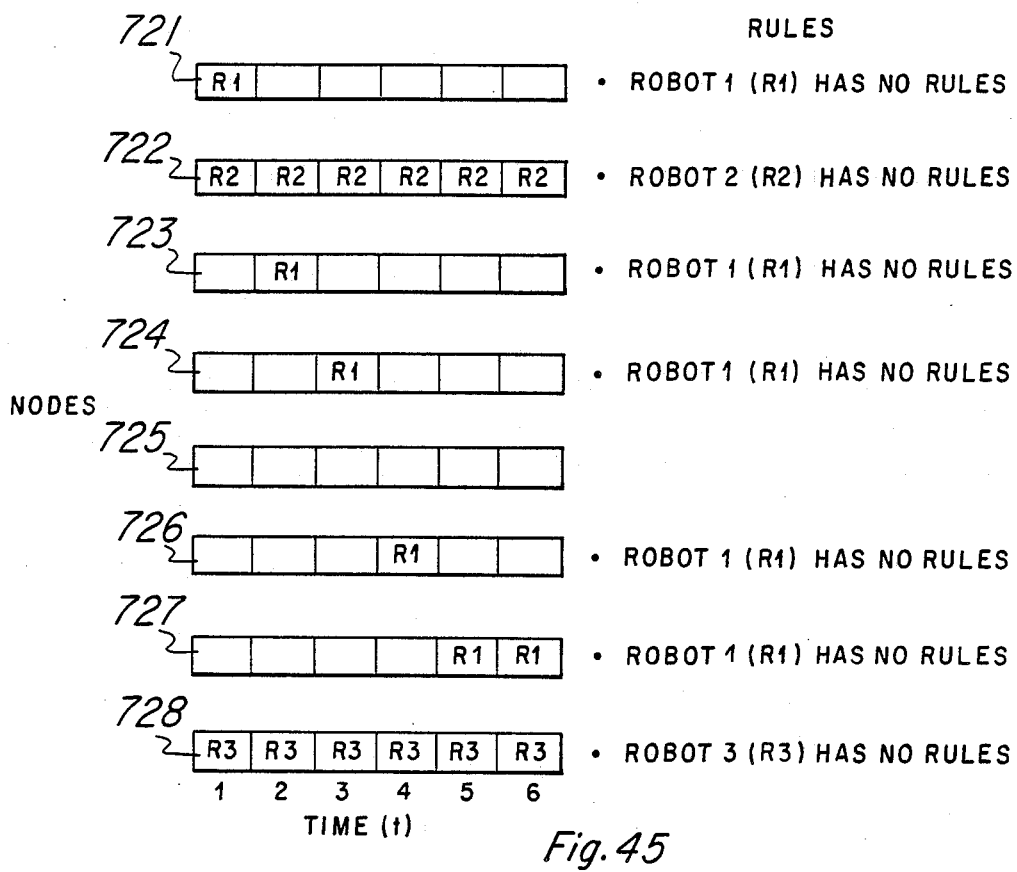
Figure 48:
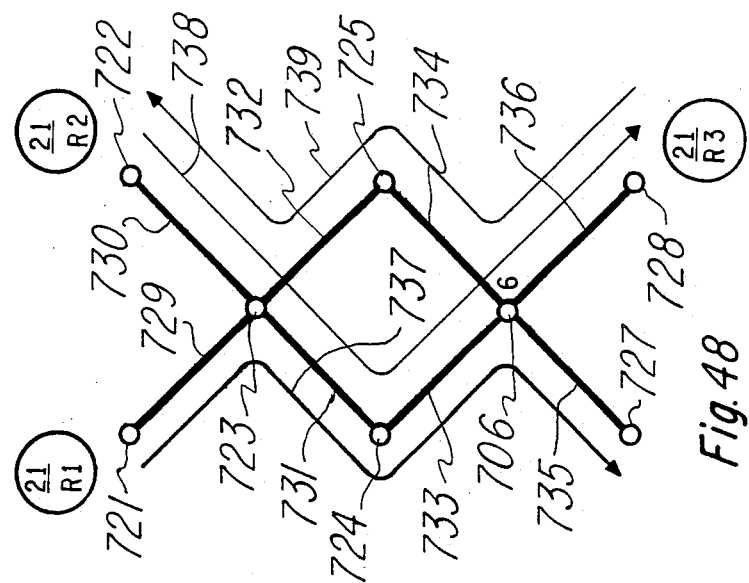
Figure 46:
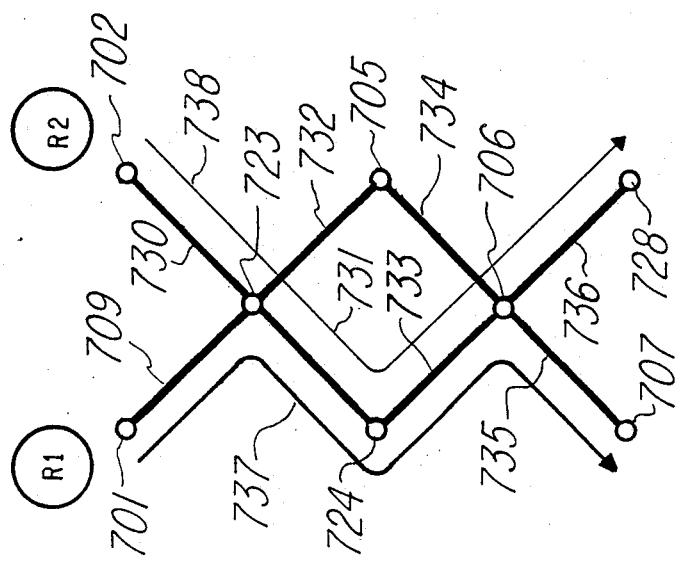

FIGS. 43 through 48 are used to illustrate the creation of rules which control the arrival and departure of the mobile apparatuses 21. FIGS. 43, 45 and 47 show the path of the mobile apparatus 21 which in the case of the figures are apparatuses R1, R2 and R3 and FIGS. 44, 46 and 48 show the nodes where the apparatuses R1, R2 and R3 will be for a specific time interval.

Referring to FIG. 43 is a set of path segments for a plurality of mobile apparatuses 21 designated R1, R2 and R3 to follow through a typical manufacturing facility 700. Point 721 through 728 are destination nodes and lines 729 through 736 are permissible path segments between the nodes. In FIG. 43 only the path 737 for the mobile apparatus 21 that is designated as R1 has been generated. The mobile apparatus 21 will start moving from node 721, will pass through node 723, 724, and 726 and then stop at node 727. The nodal position of the mobile apparatus 21 that is designated R1 for each of the six time intervals is indicated in FIG. 44.

In FIG. 44 the rules that control the movements of the mobile apparatuses R1, R2 and R3 are defined. Because the apparatus designated R1 for apparatus 1 will not visit any node where another mobile apparatus 21 will visit, there are no rules set for the path at this time. In FIG. 43, however, as in the embodiment of FIGS. 45 and 47 the apparatus R1's first node is 721 and its last node is 727.

In FIGS. 45 and 46 the mobile apparatus 21 as designated Robot 1 or R1 is at the node 721 and it is to travel to 727. The path nodes that it will traverse on this route to node 727 includes the starting node 721 and nodes 723, 724, 726 and 727. Additionally, in the embodiment of FIG. 45, the second mobile apparatus 21 that is designated R2 is at a starting node 722 and its last node is node 728 and it is to travel the path 738. This path includes the nodes 722, 723, 724, 726 and 728.

In FIG. 46 the nodal positions are illustrated with respect to time for both mobile apparatuses 21 that are designated R1 and R2 respectfully. FIG. 46 also provides the rules that coordinate each apparatus's R1 and R2 visit to the nodes in the manufacturing facility 700. As was shown in FIG. 43, the mobile apparatus 21 that is designated R1 has already selected a path through nodes 723, 724 and 726. Therefore, the second mobile apparatus 21 as designated R2 has to move from node 722 to node 728. A path is generated without changing the path for R1.

During the first time interval R2 will attempt to move to node 723. However, R1 has priority on the occupation of node 723 and will move there during the second time interval. Therefore, the rules are that R1 must arrive at node 723 before R2 and R2 must arrive after R1. During the second time interval, R2 must wait before moving to node 723. R2 can occupy node 723 in the third time interval. Because R2 must arrive at node 723 after R1, the rules for R2 change to arrive after departing of R1. The rules for R1 also change to arrive before the arrival of R2. Because the rules have now been set, they are applied to nodes 724 and 726. However, there are not conflicts between R1 and R2 at nodes 727 and 728 thus the rules no longer apply.

FIGS. 47 and 48 illustrate the paths for a third mobile apparatus 21 or R3 with the previous paths for the controllable mobile apparatuses 21 that are designated R1 and R2. R3 will move from node 728 along path 739 and pass through nodes 726, 725 and 723, stopping finally at node 722. Nodes 726 and 723 are common to all three mobile apparatuses 21 that are designated in FIG. 47 as R1, R2 and R3.

FIG. 48 shows the nodal positions with respect to time for all three mobile apparatus's 21. In FIG. 48 the rules which coordinate each apparatus 21 visits to the nodes in the manufacturing facility are illustrated. As shown in FIG. 46, R1 and R2 have already selected a path through nodes 723 and 726, therefore, for R3 to move from node 728 to node 722 a new path is generated without changing the previous paths for R1 and R2.

R3 will first move to node 726. In view of the fact that neither R1 nor R2 occupy node 726 during the second time interval R3 will be allowed to occupy node 726. R3 will arrive at node 726 before the other mobile apparatuses 21 and therefore the rules for R3 are defined as arrival before R1. The rules, of course, for R1 and R2 will not change.

The third time interval will be the time for R3 to move to node 724 or node 725. The earliest possible time that R3 can occupy node 724 is at the fifth time interval due to the prior establishment of paths that were discussed in conduction with FIGS. 45 and 46. R3 must arrive at node 724 after R1. The rules further state that R3 must arrive at all nodes before R1, therefore, the rules will be violated for R3 to move to node 724. Because neither R1 nor R2 will occupy node 725 at any time, R3 can occupy node 725 during the third time interval.

When one of the plurality of mobile apparatuses 21 that are in the example of FIG. 47 designated R1, R2 or R3 visit a node that will not be occupied by another mobile apparatus 21, the rules for the mobile apparatus 21 are reset, therefore R3 has no rules to control its movement to node 725. R3 then will move to node 723 at the fourth time interval. R3 will arrive at node 723 after R1 and R2 have departed and therefore the rule for R3 is to arrive after the departure of R2. Because the rules have been set for R3 they are also applicable to node 722. Thus, by generation of rules based upon each move of a mobile apparatus 21, no mobile apparatus 21 will occupy a node at the same time that a second mobile apparatus 21 is destined to occupy the node.

FIGS. 49 provide a flow diagram for implementing the coordination of a multiple apparatus system in a manufacturing facility as was discussed in conjunction with FIGS. 42–48. In particular, in FIG. 49A the start position is at point 750. Leaving point 750 there is a first decision block, block 751, which decides if there are more nodes connected by a path segment to the current node. If the answer is "no", then tie point H is used and connects over to FIG. 49C. If the answer is "yes", the planner scheduler 505 will retrieve the next node connected to the path segment at block 755 and at block 753 will compute the arrival and departure time at the next node. The program then proceeds to block 757 where the arrival time at the next node is compared to determine if it is greater than the lowest travel time to the final destination. If the answer is "no", tie point C is taken to FIG. 49B, if the answer is "yes", then tie point H is taken to FIG. 49C.

Following the "no" path and proceeding to FIG. 49B at decision block 758 a query ascertains, "Will the current mobile apparatus 21 arrive at the next mode after another mobile apparatus 21 departs from the node?". If the answer is "no", then tie point D is taking to FIG. 49C at the start of block 763. If the answer is "yes" then the next step in the sequence is, "According to the predefined rules should the current mobile apparatus 21 arrive at the next node before the other mobile apparatus 21 arrives at that node (block 759)?". If the answer is "yes", then tie point H which is located on FIG. 49G is taken. However, taking the "no" path, then at block 761 the visit rules for the next nodes are generated. The rules state that the current mobile apparatus 21 must arrive at the next node after the other mobile apparatus 21 departs from that node, then proceeding to tie point F which is located on FIG. 49E. However, FIG. 49C is the D path that is taken from block 758 and will be discussed at this time.

At the first decision block, (block 763) a query ascertains, "Will the current mobile apparatus arrive at the next node before the other mobile apparatus departs from that node?" If the answer is "no", then the path via tie point E is taken which goes to FIG. 49D. If the answer is "yes", then the planner scheduler 505 proceeds to block 765 which makes a decision, "According to the rules should the current mobile apparatus arrive at the next node after the other mobile apparatus departs that node?". The "yes" path will increase the current arrival time at block 767 and then proceeds to tie point B which is prior to block 757 on FIG. 49A. If the answer is "no", then the decision is made, "Is the other mobile apparatus currently located at the next node?", at decision block 769. The "yes" path will result in the program jumping to implement the blocks that follow the path H that is illustrated in FIG. 49G. If the answer is "no", then the planner scheduler 505 will generate the visit rules for the next node at block 781.

The rules state at block 781 that the current mobile apparatus must arrive at the next node before the other mobile apparatus departs that node and then the program proceeds to subroutine F which is located in FIG. 49E.

The E subroutine or E path from block 763 is illustrated in FIG. 49D and after it has been determined that the current mobile apparatus will not arrive at the node before another mobile apparatus departs that node then at block 783 a decision is made that according to the rules should the current mobile apparatus arrive at the next node before another mobile apparatus arrives at that node. If the answer is "no", then the current mobile apparatus' arrival time is incremented at block 785 and it proceeds to tie point B which is located in FIG. 49A just prior to decision block 757. If the answer is "yes" then tie point H is taken which is in FIG. 49G.

After the completion of block 781 of FIG. 49C, the planner scheduler 505 takes path F which is illustrated in FIG. 49E and has a first decision block at 787 which ascertains whether all the mobile apparatuses have been checked for conflicts at the next node. If the answer is "no", then path C is taken which is illustrated in FIG. 49B and will continue the generation of rules for resolving of conflicts. If the answer is "yes", then the planner scheduler 505 will proceed to block 788 which determines if any mobile apparatus will visit the next node. If the answer is "no", then the rules for the current mobile apparatus at the next node are reset. If the answer is "yes", then the program proceeds to path B which is illustrated in FIG. 49A.

However, taking the "no", the rules are reset for the next node at block 789 and then at block 790 all the node visit parameters are saved which were generated for the next node and then the next node is now the current node at block 791.

The program then proceeds to tie point G which is illustrated in FIG. 49F which at block 792 makes a decision, "Is the next node the final destination for the mobile apparatus?". If the answer is "no", the program proceeds to the start of block 751 that is illustrated on FIG. 49A. I the answer is "yes", "Is the current arrival time the lowest arrival time?" is then asked at block 793. If the answer is "no", the program proceeds to block H, which is illustrated in FIG. 49G. If the answer is "yes", then all the parameters are saved for the node which is being visited and for all the nodes in the current path at block 794. The planner scheduler 505 proceeds to tie point H which is illustrated in FIG. 49G.

FIG. 49G makes a decision at block 795, "Are any more path assignments defined for the current node?". If the answer is "no", then the program proceeds to tie point A on FIG. 49A which is essentially the start position. If the answer is "yes", then it proceeds to block 797 where it implements a step of backing up one node in the current path. At decision block 799 a decision is made, "Is this node the first node in the path?". If the answer is "yes", then it proceeds to step 800. If the answer is "no", then it proceeds to tie point A which is prior to block 751, FIG. 49A.

Taking the "yes" path from block 799 to block 800 which questions, "Was a possible path identified for the mobile apparatus 21 to follow?", the yes path will cause the unit to proceed to block 801. If the answer is "no", the no path will cause the system to exit at block 803. All the node visit parameters which were saved into the final path table are copied at block 801 and after which the commands are generated to direct the mobile apparatus 21 to move along the final path.

Controlling Movements of Robots in a Multi-Node Environment

As was discussed in conjunction with FIG. 34, the planner scheduler 505 is responsible for generating move commands to the individual apparatuses 509 through 513, however many are being used in the manufacturing facility 700. The communication processor 517 is responsible for sending move commands to the mobile apparatuses 21 over the wireless communication system 19 of FIG. 1. Each CPU and memory 52 that is contained within each controllable mobile apparatus 21 is responsible for executing the move commands.

As was discussed in conjunction with FIG. 34 which is a schematic of a typical manufacturing floor plan, nodes 701 thorugh 708 are possible destination points for the mobile apparatus 21 along paths 709 through 716. The arrows on the lines indicate the possible directions of travel for the mobile apparatus 21. All other regions of the manufacturing facility 700 are designated as being off limits. To move a mobile apparatus 21 through the manufacturing facility 700 the planner scheduler 505 must first allocate nodes from a previously generated path to a mobile apparatus 21 and then command the mobile apparatus 21 to move the nodes. At any one time the mobile apparatus 21 may be moved into a node and have several subsequent move commands buffered in its memory that is a part of CPU and memory 52. As a mobile apparatus 21 moves from node to node, the mobile apparatus 21 informs the planner scheduler 505 of each node it has passed. When the planner scheduler 505 has been informed that a node has been passed, the node is then deallocated and becomes available for other mobile apparatus 21.

Figure 50A:
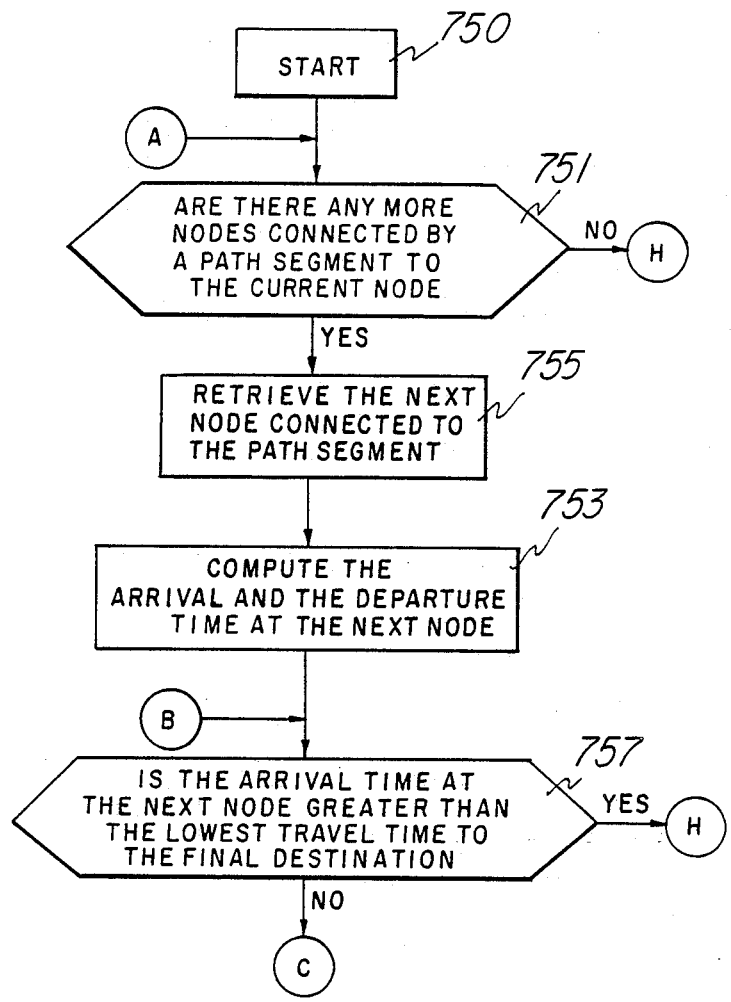
FIGS. 50A-50C through 52 illustrate a method of controlling the movements of a mobile apparatus in a multiple node factory environment.

FIGS. 50 illustrate the a implementation of the above discussed process and FIG. 50A is a flow diagram of the transmission of instructions and commands between the planner scheduler 505 and mobile apparatus 21. The process begins at block 805. Decision block 806 ascertains if the mobile apparatus 21 has arrived at the final destination node. If it has then the exit is taken at block 809. If it hasn't then the planner scheduler 505 proceeds to block 807 where a decision is made that determines if the maximum number of nodes are already allocated to the mobile apparatus 21.

Figure 50B:
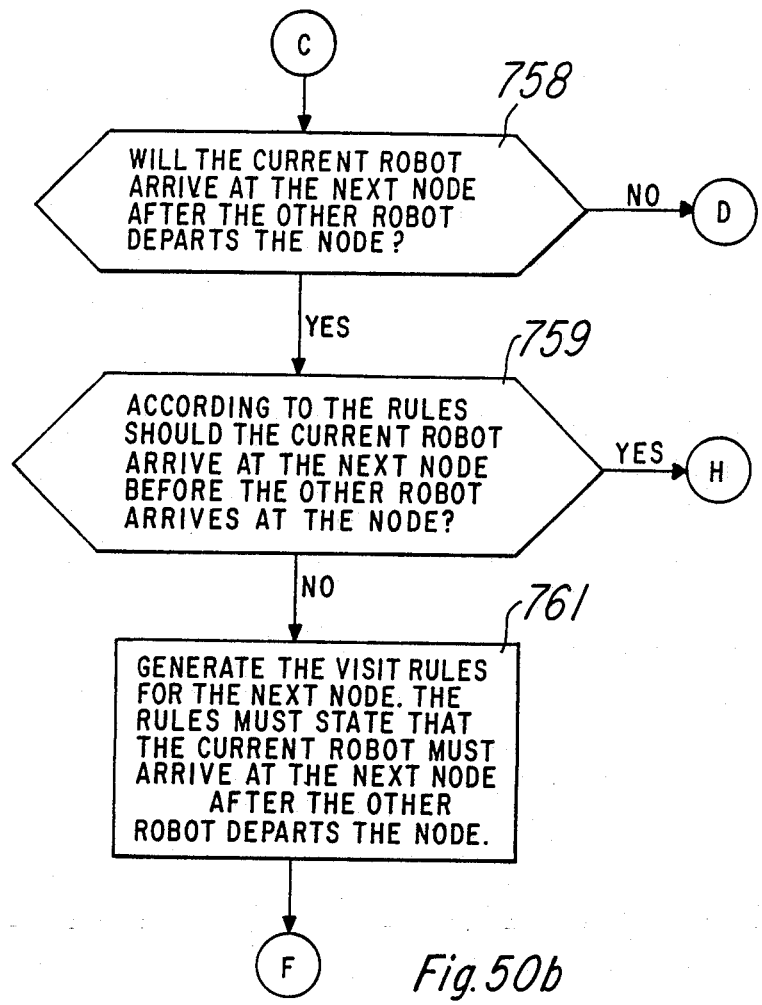
Figure 50C:
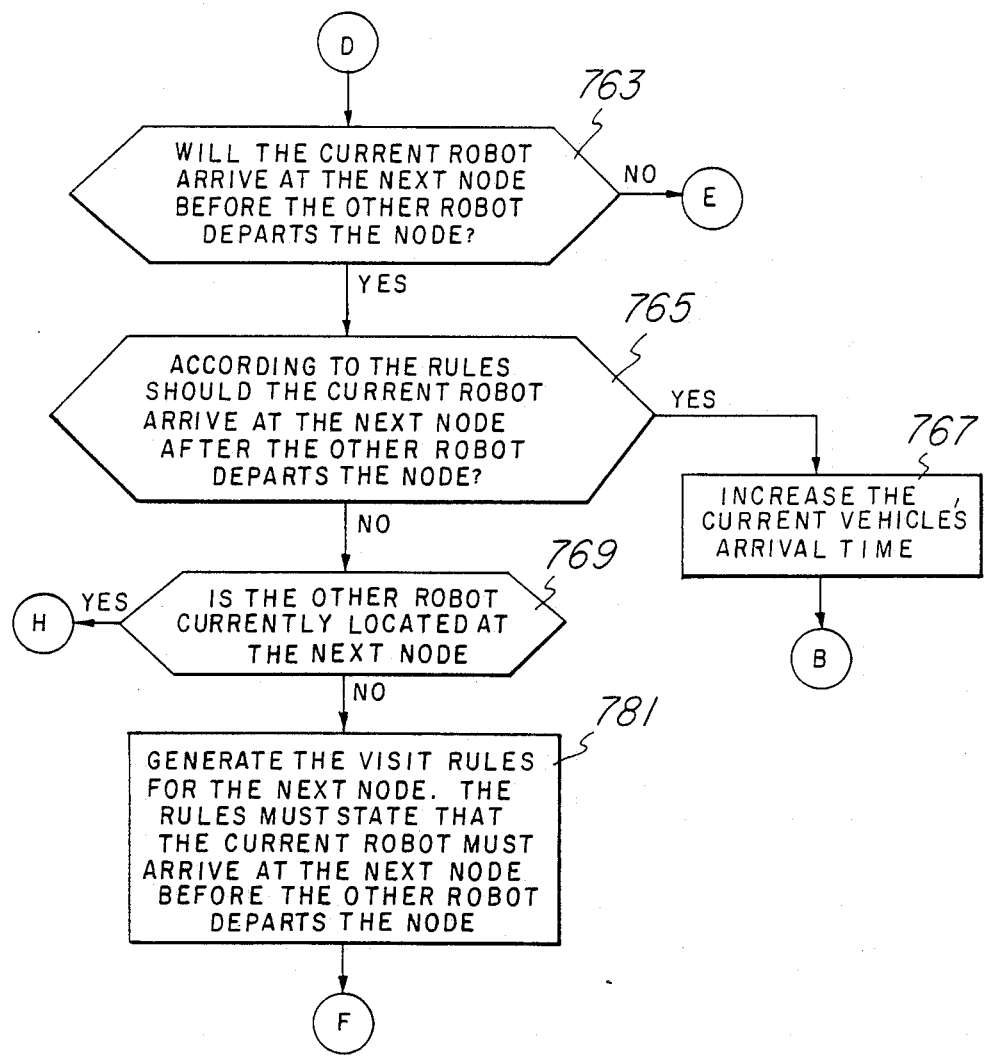
Figure 50E:
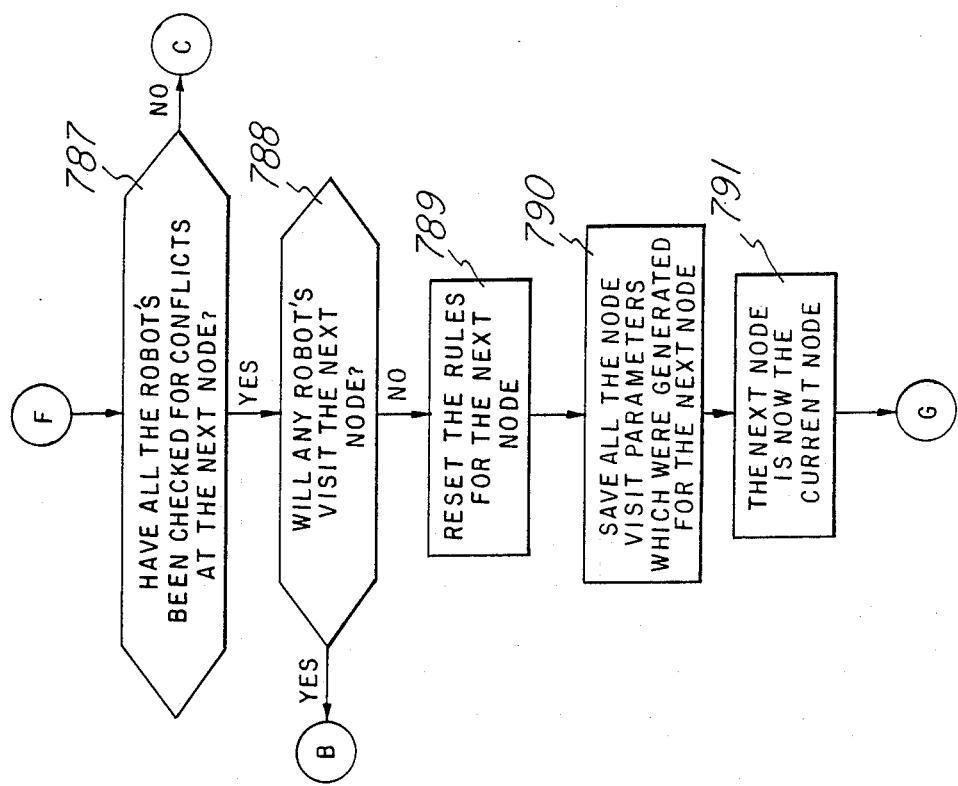
Figure 50D:
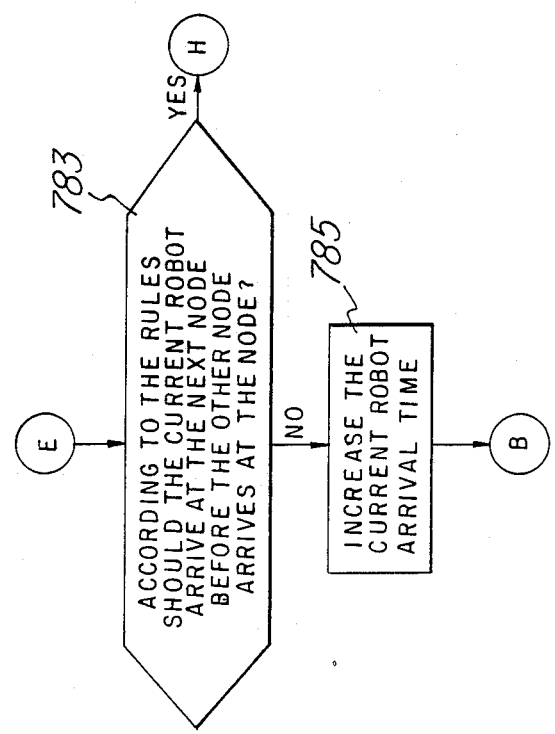
Figure 50G:
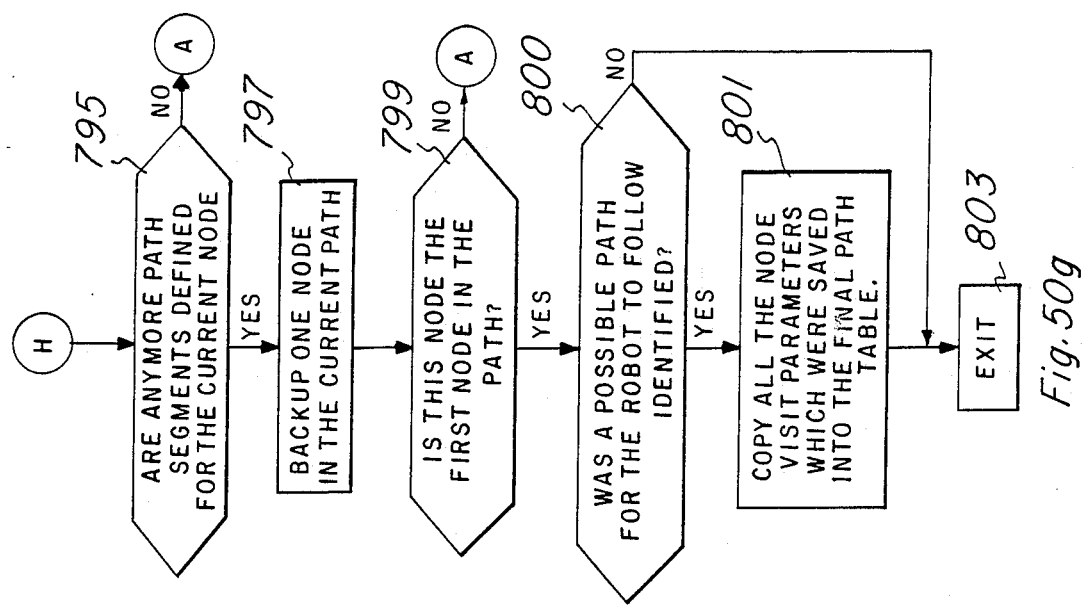
Figure 50F:
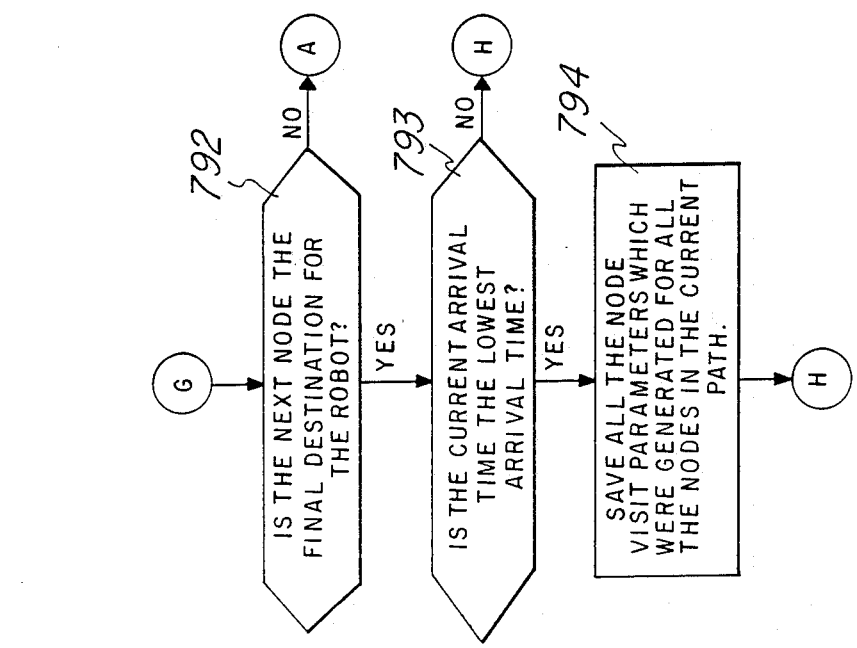
Figure 5I:
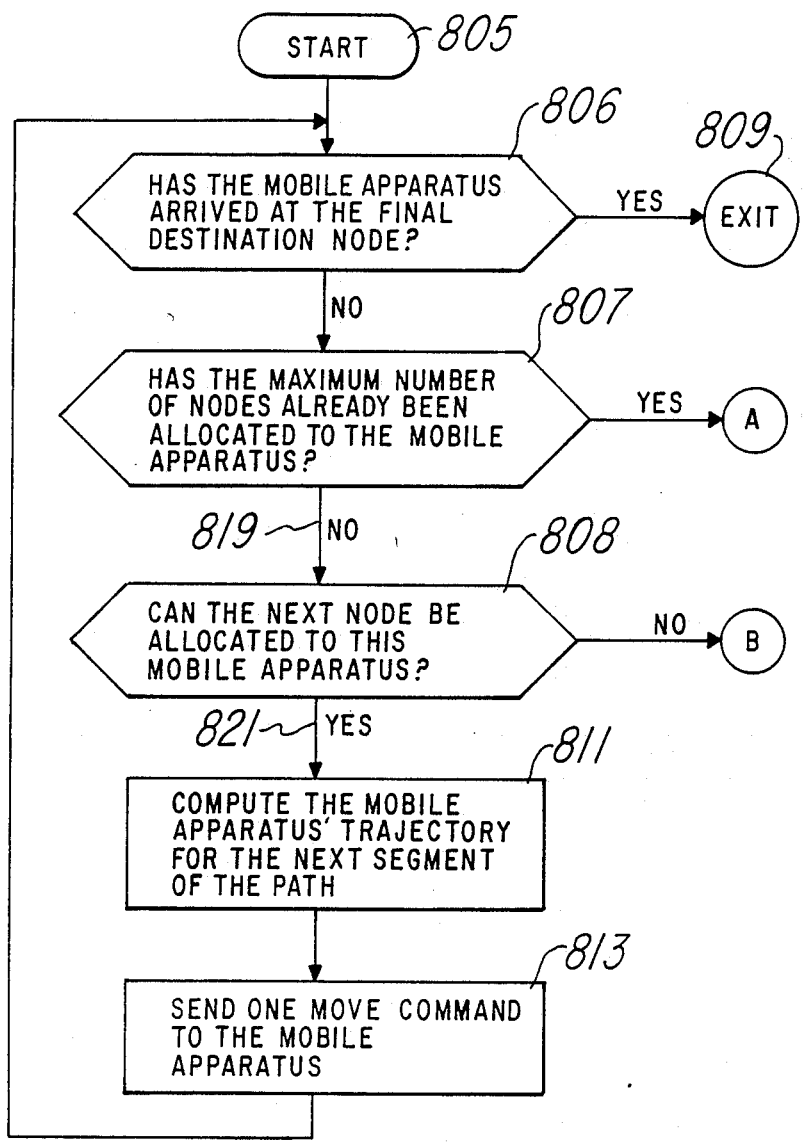

If the maximum number of nodes has been allocated, then path A is taken to FIG. 50B which at block 815 waits for the mobile apparatus 21 to complet the next move. The system at block 817 deallocates all nodes which the mobile apparatus 21 has passed and returns via tie point 819 to FIG. 50A.

At block 808 of FIG. 50A the query, "Can the next node be allocated to the mobile apparatus 21?" is asked. If the answer is "no" then tie point B is taken to FIG. 50C where at block 818 the system waits for the node to be deallocated by another mobile apparatus. At the completion of the step at block 818 the system returns to FIG. 50A via tie point 821.

At block 811 the mobile apparatus's 21 trajectory for the next segment is determined as is illustrated in FIG. 42. Then at block 813 the move command is transmitted to the mobile apparatus 21 to be executed. This process continues until the mobile apparatus 21 arrives at the final destination node as is defined in block 806.

The Mobile Robot's Executive Program

There are two major sequences that are implemented by the CPU and memory 52 that is contained within each mobile apparatus 21. These are the executive and control command structures. The executive command structure runs continuously to provide system services support for communications, options and command decoding and formatting of messages that are transmitted between each mobile apparatus 21 and the communication processor 517. The control sequence is interrupt driven and is responsible for the dead reckoning, navigation and control systems that have been previously discussed. The mobile apparatus 21 movement through a manufacturing facility 700 utilizes all of these systems. A command from the host CPU and memory 37 is transmitted via the communication system 19 to the mobile apparatus 21. The executive sequence receives and decodes these commands. For a move command, it is formatted and placed in the execution queue for the control sequence to execute. The executive sequence then checks for a change in the state of the mobile apparatus 21 caused by a command completion or a change in the status of the mobile apparatus 21. If necessary, the executive will transmit a message to the navigation CPU and memory 37 detailing the state change before returning to receive another command from the host CPU and memory 37. This loop is executed continuously.

When a timer interrupt occurs, the control program sequence will command the steering and drive servo for each move. It then calculates the current mobile apparatus 21 position using the data from the control and navigation circuit 15 which was previously discussed and performs the dead reckoning and navigation requirements.

Depending on its current position and state it is possible that the currently executing command has been completed. If so, the next command in the queue is selected for execution. The executive program notes this fact and builds the state change message for transmission to the host CPU and memory 37. The mobile apparatus 21 control software then becomes idle waiting for the next timer interrupt.

Figure 51B:
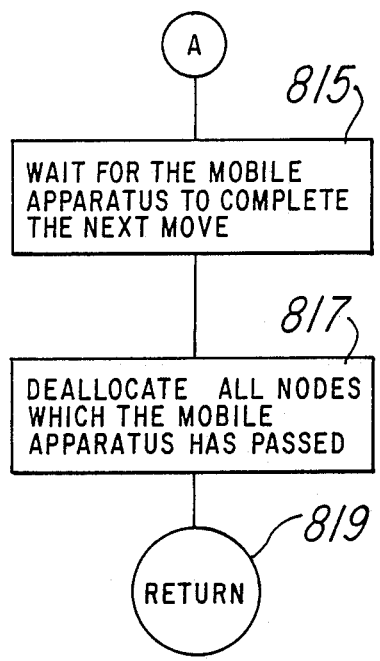
Figure 51C:
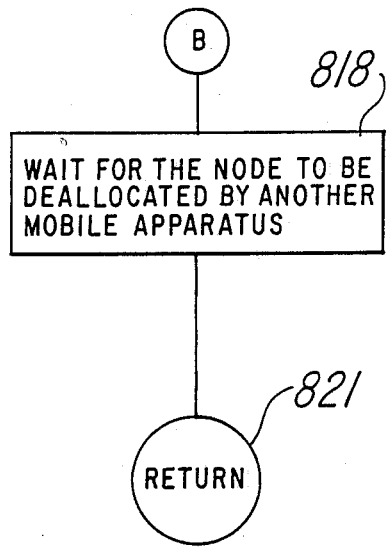

Referring to FIG. 51 which describes the executive program which at block 850 is continuously monitoring for a message being received over the communication system 19. If no message is being received, then path 827 is taken and if a message is being received, then the CPU and memory 52 proceeds to block 826 where the message is placed on the mobile apparatus 21 queue if required. Options support is then provided at block 829. Decision block 831 decides whether or not a command pointer has changed. If "not", then the program proceeds to block 850. If the command pointer has changed then the mobile apparatus 21 informs the host CPU and memory 37 of a command completion and mobile apparatus 21 position at block 833. At the completion of the step indicated at block 833, the program returns to the input of block 850.

The Mobile Robot's Control Program

Figure 52:
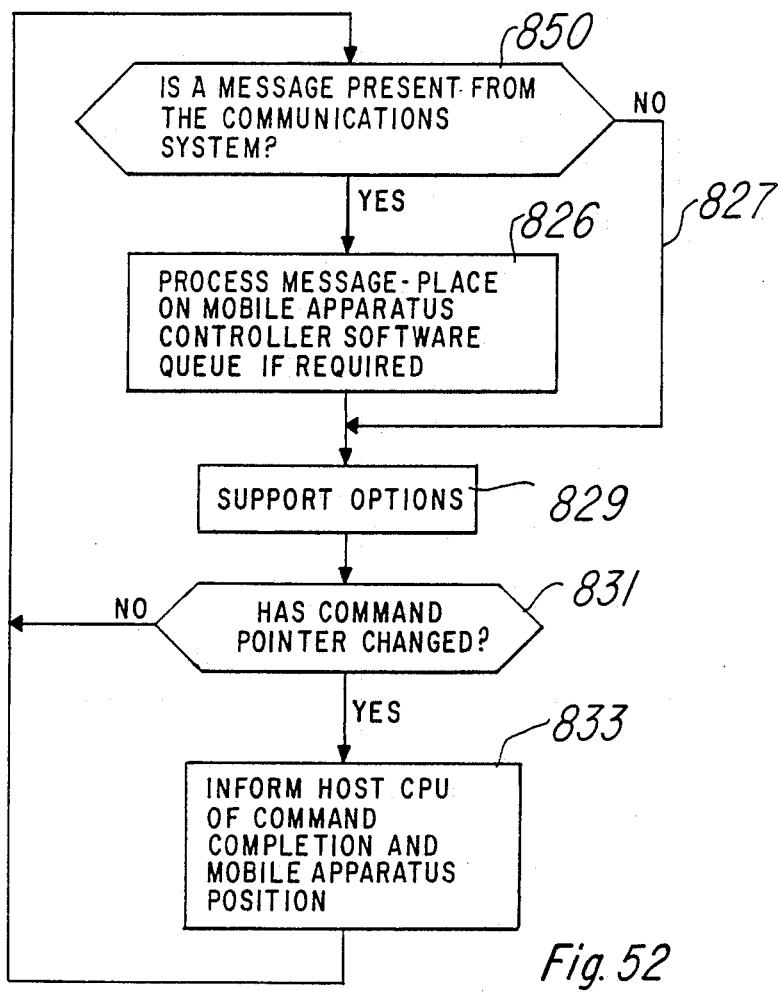

As was discussed previously, the control program sequence is implemented in FIG. 52 where at block 835 each of the steering and drive servos are commanded. The mobile apparatus 21 position is calculated at block 837, this was previously discussed, and the dead reckoning commands are generated at block 839. Decision block 841 determines if the command pointer or path needs to be updated. If it does, then it is updated at block 843, and if it doesn't the control program proceeds to additional processing to build a status table for placing and transferring to the mobile apparatus 21 executive sequence at block 845. Which, by the way, is also implemented if there is no need to update the command position via path 847. The control program then proceeds back to the input of block 835 via path 849.

Navigation System for Multiple Robots

Figure 53:
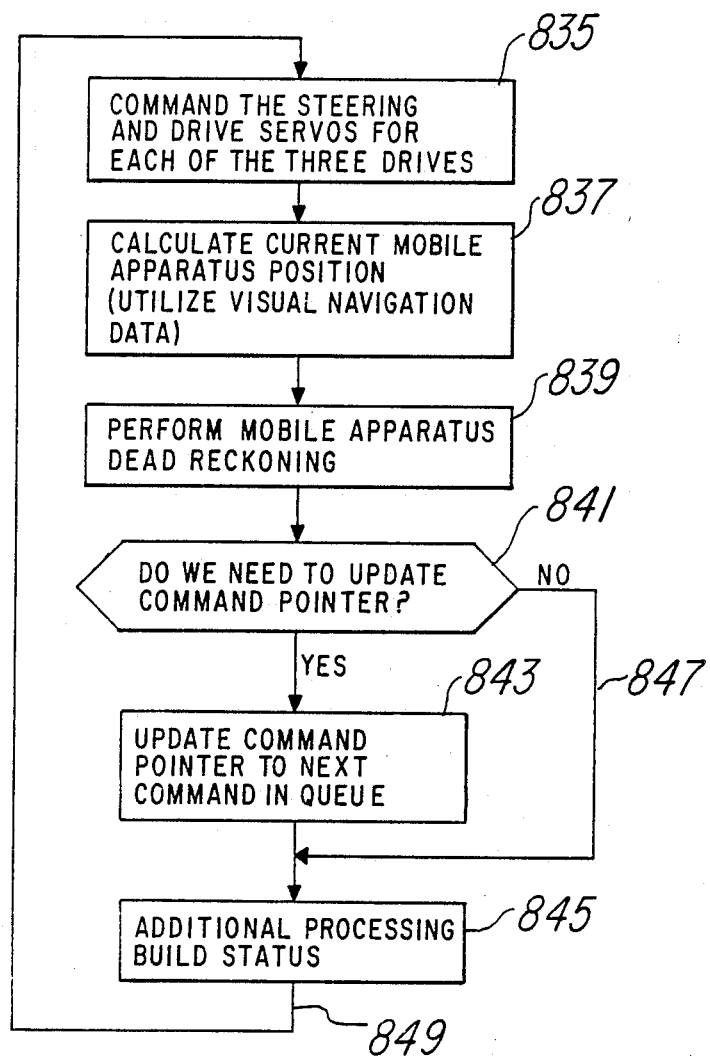
FIGS. 53A-53B are flow diagrams illustrating the operation of a mullti mobile apparatus system.

In the complex system of multiple mobile apparatuses 21 moving across the manufacturing facility as is illustrated in FIG. 42, the navigation CPU and memory 37a is continuously predicting the mobile apparatus that needs a position fix. Referring to FIG. 53A, at block 851 the mobile apparatus with the greatest need for a position fix is identified. A message is broadcast to all mobile apparatus via the communication processor 517 to turn on the proper navigation beacons and turn off all other beacons and suspend all communications at block 853. The next step inputs all the messages from the communication processor at block 855. A decision is made at decision block 857 if the message is a navigation acknowledgment. If it is not, then the message is processed at block 859. If it is, then the control and vision navigation circuit 15 acquire a video image at block 860 after which a release is transmitted to the mobile apparatuses 21 to continue their infrared communications at block 861.

The image from the selected member of the plurality of cameras 1 is analyzed at block 863. After the analysis of the input image from the selected camera 1S, the navigation CPU and memory 37a proceeds via tie point P2 to block 864 of FIG. 53B where the mobile apparatus' 21 image is analyzed and ascertained if it is recognized at block 864. This process has been previously discussed in conjunction with the control and navigation circuit 15. If the answer is "no" then a decision is made to ascertain if all the cameras that are members of the plurality of cameras 1 have been searched at block 865. If that answer is "no", then a prediction is made for the next most likely camera at block 867 and the program proceeds to tie point P3 which is on fIG. 53A just prior to implementing the step contained in block 853.

If all the likely cameras have been searched, then tie point P1 is taken just prior to block 851. If the apparatus's image is recognized, then its position and heading is ascertained at block 854 and this position is transmitted to the mobile apparatus 21 at block 866 after which the unit returns to the tie point P1 for the start of the process.

The Communication Processor

Figure 54A:
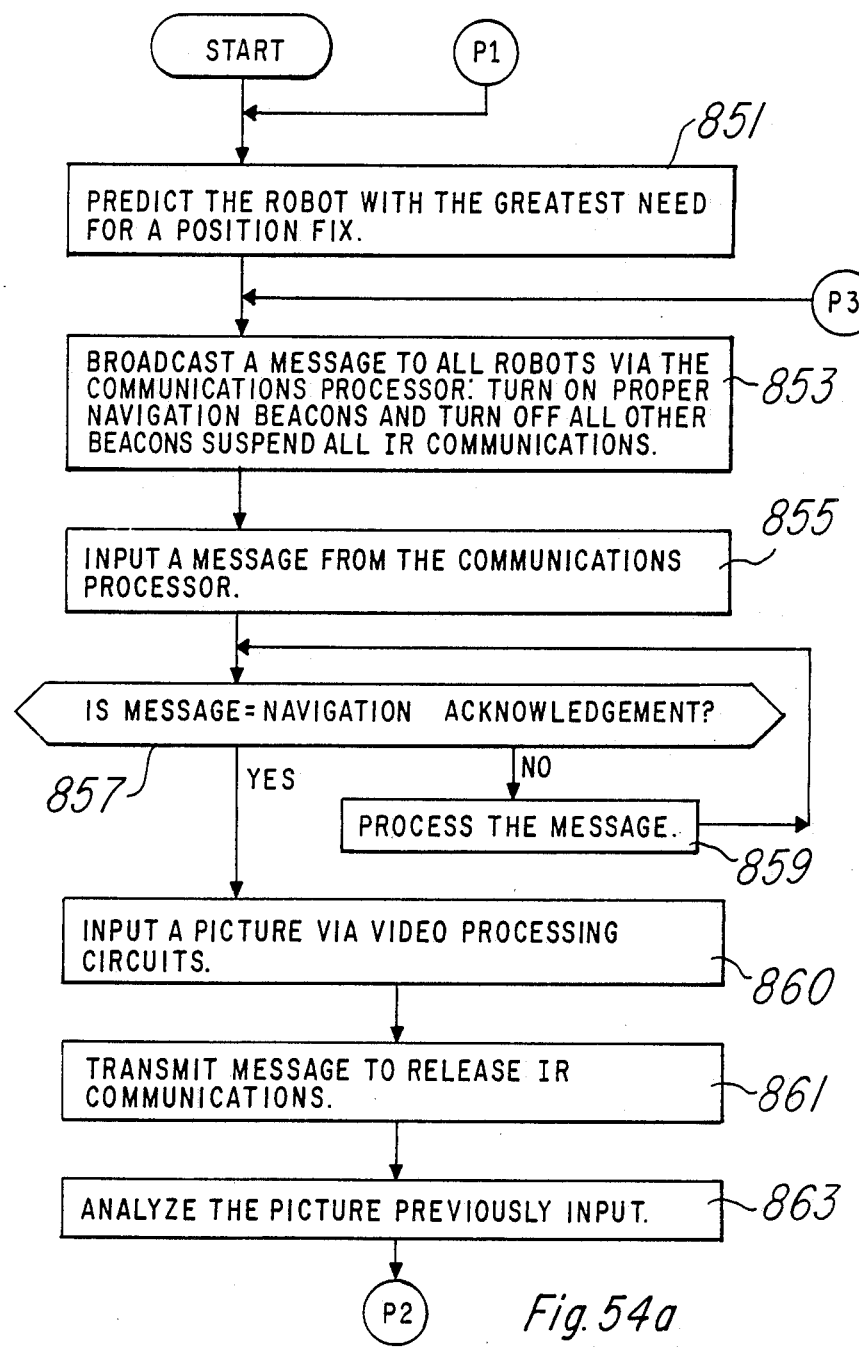

The communication processor 517 and in particular the interface is implemented in FIG. 54A which should be used in conjunction with FIGS. 1 and 34. At block 510 the communication processor 517 will start the process and wait for a navigation request from the navigation controller 507. The communication processor 517 enters the navigation request (block 868) and broadcasts the message into the output queue for transmission via the wireless communication system 19 (block 869). The communication processor 517 transmits the outgoing message via a wireless communication system such as an infrared system until it recognizes the navigation, "NAV", request message at block 870. The communication processor 517 broadcasts the "NAV" request to all the mobile apparatus controllers 509 through 513 and sends a navigation acknowledgment to the navigation controller 507 and shuts off communications to all mobile apparatus controllers at step 871. The communication processor continues to queue all incoming messages but does not send any messages via the wireless communication link at block 871.

Figure 54B:
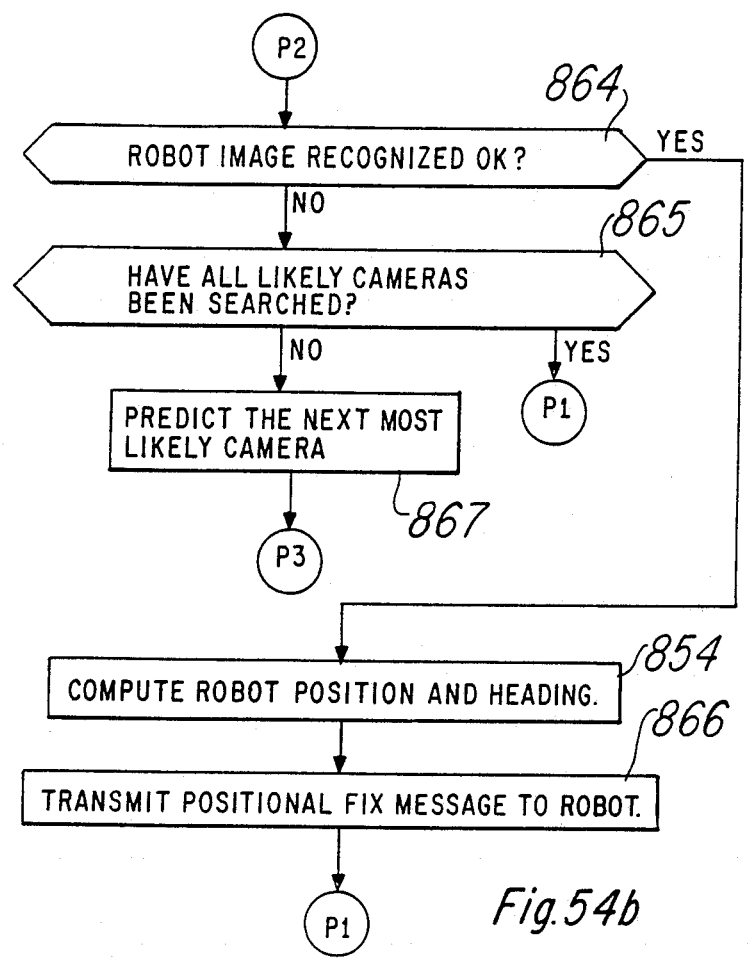

At block 872 the communication processor 517 waits for a synchronization message from the navigation controller 507. The communication processor 517 in FIG. 54B then recognizes the synchronization message and enables the communications system 19 to transmit all messages in its output queue at block 873. At block 874 the position fix message is received from the navigation controller 507 and placed in the communication output queue connecting to the communication system 19. The position fix messages are transmitted to mobile apparatus controllers 509 through 513 at block 875 and the program then returns to the start position at block 510.

The Message Output Process of the Communication Processor

Figure 55A:
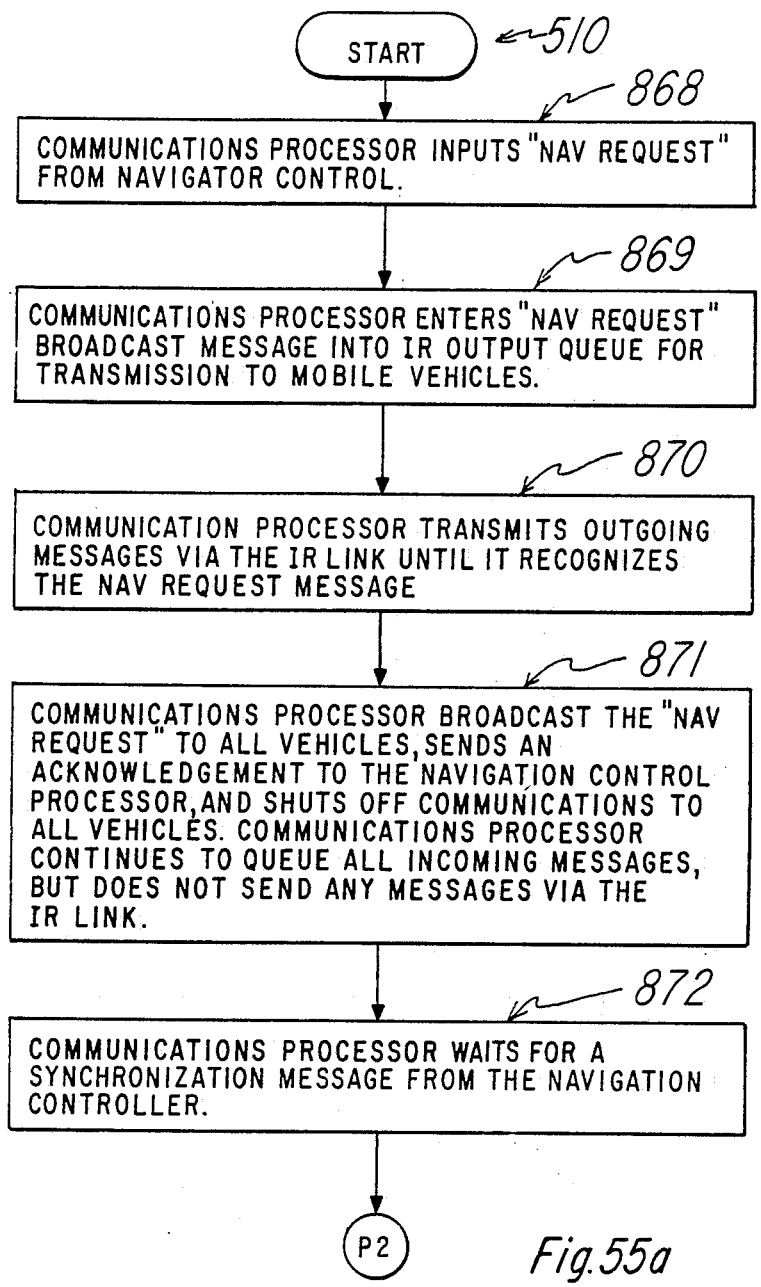
Figure 55B:
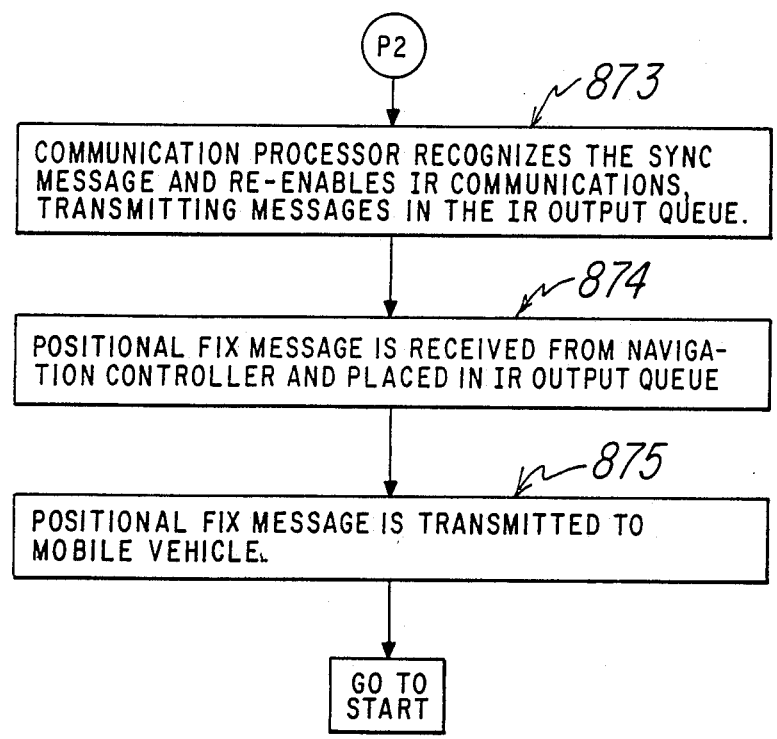

The communication output process is illustrated in FIG. 55 where at block 876 the output queue is stopped from emptying its messages i.e. the output port is halted. The message is sent to the mobile apparatus (device) at block 877 and at block 878 the communication processor 517 waits for a navigation request. If none is received it returns to the start of block 876. If one is received, it halts the communication output process at block 879 and then proceeds to the port halted block at block 876.

The Message Input Process of the Communication Processor

In FIG. 56 the communication processor 517 monitors it's input queue for the receipt of messages at block 881. It ascertains whether a message is from the navigation controller 507 at block 882. If is is "not", it puts the message in the correct output queue at block 883 then returns to block 881. If it is, it checks to see if the message is a navigation synchronization message at block 884. If it is not, the communication processor 517 proceeds to block 883. If it is, it restarts the mobile apparatus output process at block 885 and proceeds to block 883.

Collision Avoidance

When the mobile apparatus 21 moves along a path in a manufacturing facility 700, a certain amount of deviation due to the dead reckoning system from a commanded path can be expected and is tolerated. As the plurality of mobile apparatus controllers 509 through 513 move in a system, a window is projected around the current path of each mobile apparatus 21. FIG. 57 illustrates the first step in building the window around a mobile apparatus's 21 path. The window, between points 891 and 887 is along the mobile apparatus's 21 path and is used to define a straight line 893 that the mobile appartus's 21 path should follow. The mobile apparatus's 21 allowable deviation from the straight line 893 is defined by a specified distance as indicated by dimension line 894.

Figure 58:
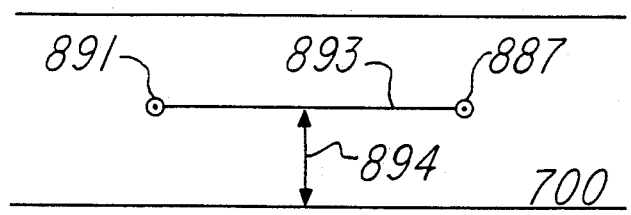

FIG. 58 illustrates the second step in building the window around the mobile apparatus's 21 path. The distance from the straight line 893 defines the size of the window but does not control the distance the mobile apparatus 21 may travel from the end points of the line 893. The distance from each end point is used to completely close the window. A radius 901 of a circle 1200 formed around each end point 891 and 887 is the distance of the path segment 893 plus a constant 904 to allow for deviations in the path of the mobile apparatuses 21.

Figure 59:
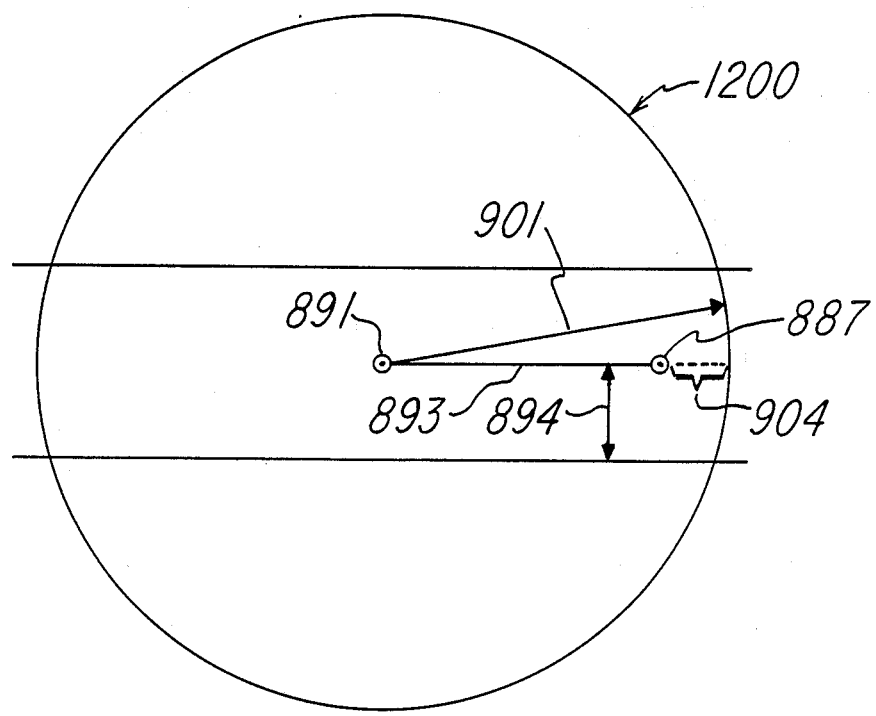

In FIG. 59 the shaded area 905 is the mobile apparatus's 21 window that is established by dimension lines 894 plus the two circles drawn around the end points 887 and 891. If the mobile apparatus's 21 position is not within the window, then the mobile apparatus 21 is stopped.

Figure 60:
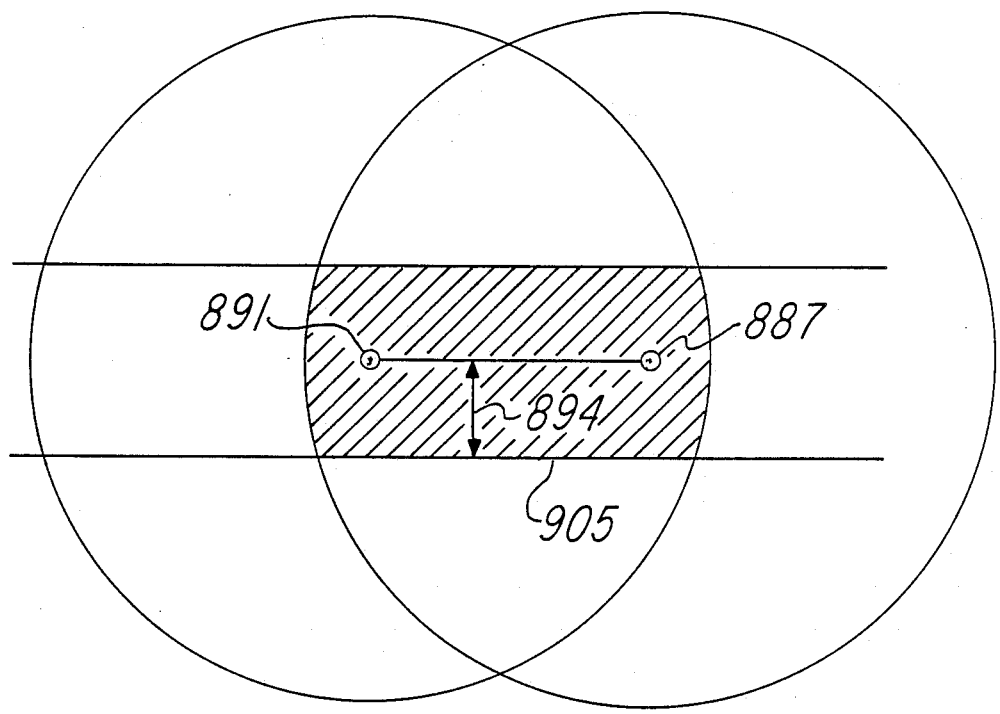
Figure 61:
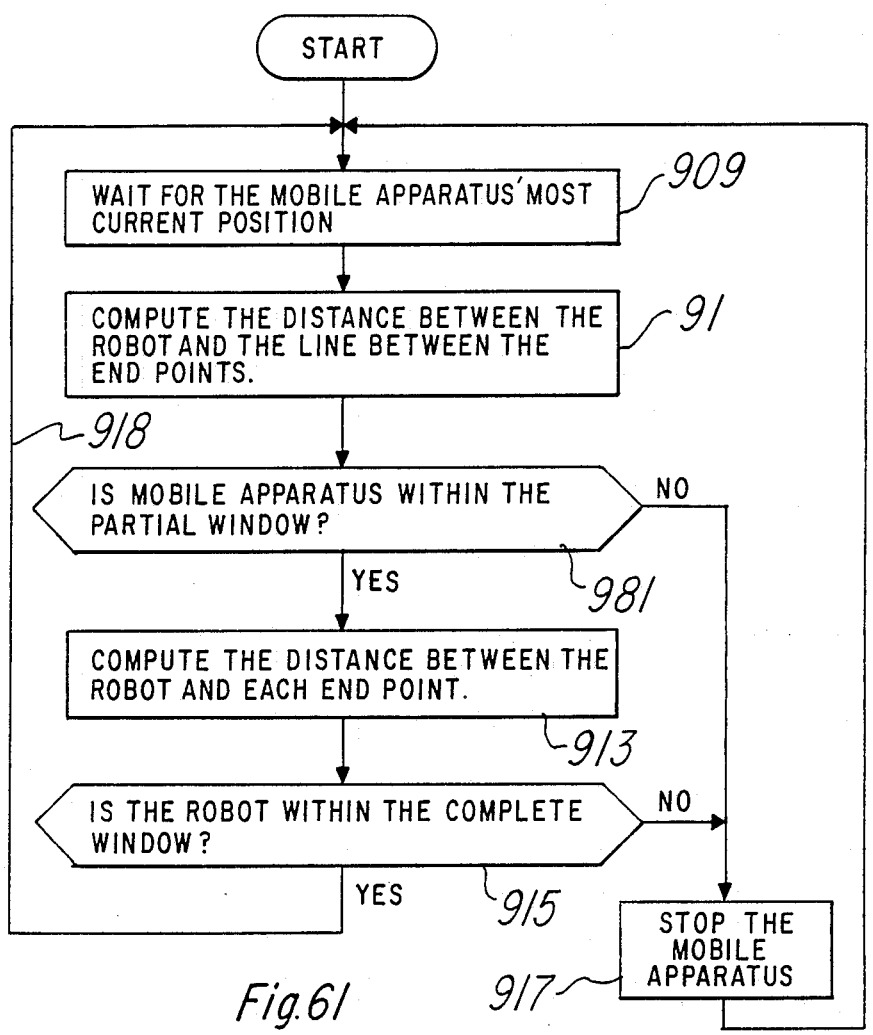
FIGS. 61A-61C are the table of equations.

FIG. 60 illustrates a control sequence for implementing this function. The system begins at block 907 and proceeds to block 909 where it waits for the mobile apparatus' 21 most current position. At block 911, the distance between the mobile apparatus 21 and the line between the end points is ascertained and then a decision at block 981 is made based upon the visual position of the mobile apparatus 21 and if that position is within the partial window of FIG. 57.

If the mobile apparatus 21 is not within the partial window of FIG. 57, then the mobile apparatus is stopped at block 917 and the control sequence returns to the start positions.

If the mobile apparatus 21 is within the partial window, then the distance between the mobile apparatus 21 and each end point is computed at block 913. At block 915 a decision is made to determine if the mobile apparatus 21 is within the computed distance. If it is, then line 918 is taken back to the start position.

The distance of the mobile apparatus 21 from line 893 of FIG. 57 is determined by equation 4 wherein $R_x$ is equal to the x coordinate of the mobile apparatus 21, $R_y$ is equal to the y coordinate of the mobile apparatus 21, $P_x$ is equal to the x coordinate of the end point, $P_y$ is equal to the y coordinate of the end point. $V_x$ is equal to the distance between the end points along the x axis and $V_y$ is equal to the distance between the end points along the y axis. Equation 5 is used to calculate the radius that is generated around each end point. The radius is equal to the square root of $(V_x^2+V_y^2)$ + the constant 904. Both equations 4 and 5 are in the table of equations.

I claim:

1. A video control system comprising:
    a vision interface module for converting analog video data to digital video data;
    a visual histogram processor module for generating video histograms of at least a portion of the digital video data output by the vision interface module;
    said histogram processor module including a window generator for reducing the quantity of video data for subsequent image processing;
    a picture memory module for storing the digital video data from the vision interface module, including means for converting said data from gray scale information to black and white coded information;
    a video bus connecting the three modules and for passing control signals and the digital video data from the vision interface module to the other two modules, wherein said control signals include a pixel clock signal for triggering the conversion in the vision interface module of analog video data to digital video data, and for use by the window generator in generating a window;
    a horizontal synch signal for use by the picture memory module in generating a horizontal address of a pixel location; and
    a vertical synch signal for use by the picture memory module in generating a vertical address of a pixel location.

2. The video control system of claim 1 wherein the reduced quantity of video data is the data generated from a window containing an area in which a set of desired images is expected to be found.

3. The video control system of claim 1 wherein the visual histogram processor module includes a row projection counter for performing a row vector summation for each row of video data.

4. The video control system of claim 3 wherein the visual histogram processor module includes a column address counter for generating memory addresses corresponding to raster column positions of the video data.

5. The video control system of claim 1 wherein the picture memory module includes a binary logic map for performing a comparison on the video data such that when the light intensity is above a predetermined threshold a first logic state is obtained and when below the threshold, a second logic state is obtained as an output of the binary logic map.

6. The video control system of claim 5 wherein the picture memory module includes a 3×3 processor for digitally filtering noise from the output of the binary logic map.

7. A video imaging system for obtaining images from a plurality for cameras, of light sources on at least one mobile robot, for the purpose of providing position information to said at least one mobile robot to enable it to navigate from one place to another, comprising:
    a vision interface module for converting analog video data from the cameras to digital video data;
    a visual histogram processor module for generating video histograms from at least a portion of the digital video data;
    a window generator for reducing the quantity of video information that must be further processed, by generating a window of data that includes only the area wherein the light sources from one of the robots is expected to be;
    a picture memory module for storing the digital video data, including means for converting said data from gray scale encoding to black and white encoding; and
    a navigation computer to receive video data from the three modules and to provide position information to the mobile robot.

8. The video imaging system of claim 7 wherein the vision interface module includes a multiplexor for selecting the video output of one of the cameras at a time.

9. The video imaging system of claim 8 including a video bus connecting the three modules and for passing control signals and the video data from the video histogram processor to the other two modules.

* * * * *